(12) United States Patent
Galitsky

(10) Patent No.: US 12,141,177 B2
(45) Date of Patent: *Nov. 12, 2024

(54) DATA LOSS PREVENTION SYSTEM FOR CLOUD SECURITY BASED ON DOCUMENT DISCOURSE ANALYSIS

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 833 days.

This patent is subject to a terminal disclaimer.

(21) Appl. No.: 17/338,295

(22) Filed: Jun. 3, 2021

(65) Prior Publication Data

US 2021/0286830 A1 Sep. 16, 2021

Related U.S. Application Data

(63) Continuation of application No. 16/010,123, filed on Jun. 15, 2018, now Pat. No. 11,100,144.

(Continued)

(51) Int. Cl.
*G06F 16/30* (2019.01)
*G06F 16/22* (2019.01)
(Continued)

(52) U.S. Cl.
CPC ........ *G06F 16/322* (2019.01); *G06F 16/2246* (2019.01); *G06F 16/36* (2019.01);
(Continued)

(58) Field of Classification Search
None
See application file for complete search history.

(56) References Cited

U.S. PATENT DOCUMENTS 5,495,605 A 2/1996 Cadot
6,112,168 A 8/2000 Corston et al.
(Continued)

FOREIGN PATENT DOCUMENTS

CN 1647070 A 7/2005
CN 102165518 A 8/2011
(Continued)

OTHER PUBLICATIONS

U.S. Appl. No. 17/690,897, "Notice of Allowance", Jun. 12, 2023, 7 pages.

(Continued)

*Primary Examiner* — Belix M Ortiz Ditren
(74) *Attorney, Agent, or Firm* — Kilpatrick Townsend & Stockton LLP

(57) ABSTRACT

Systems, devices, and methods of the present invention are related to determining a document classification. For example, a document classification application generates a set of discourse trees, each discourse tree corresponding to a sentence of a document and including a rhetorical relationship that relates two elementary discourse units. The document classification application creates one or more communicative discourse trees from the discourse trees by matching each elementary discourse unit in a discourse tree that has a verb to a verb signature. The document classification application combines the first communicative discourse tree and the second communicative discourse tree into a parse thicket and applies a classification model to the parse thicket in order to determine whether the document is public or private.

20 Claims, 21 Drawing Sheets

Related U.S. Application Data

(60) Provisional application No. 62/520,411, filed on Jun. 15, 2017.

(51) Int. Cl.

| | | |
|---|---|---|
| *G06F 16/31* | (2019.01) | |
| *G06F 16/36* | (2019.01) | |
| *G06F 16/93* | (2019.01) | |
| *G06F 21/60* | (2013.01) | |
| *G06F 21/62* | (2013.01) | |
| *G06F 40/14* | (2020.01) | |
| *G06F 40/205* | (2020.01) | |
| *G06F 40/279* | (2020.01) | |
| *G06N 5/022* | (2023.01) | |
| *G06N 7/01* | (2023.01) | |
| *G06N 20/00* | (2019.01) | |
| *G06N 20/20* | (2019.01) | |
| *G06N 5/01* | (2023.01) | |
| *G06N 5/046* | (2023.01) | |
| *G06N 20/10* | (2019.01) | |

(52) U.S. Cl.
CPC ........... *G06F 16/93* (2019.01); *G06F 21/606* (2013.01); *G06F 21/6218* (2013.01); *G06F 40/14* (2020.01); *G06F 40/205* (2020.01); *G06F 40/279* (2020.01); *G06N 5/022* (2013.01); *G06N 7/01* (2023.01); *G06N 20/00* (2019.01); *G06N 20/20* (2019.01); *G06N 5/01* (2023.01); *G06N 5/046* (2013.01); *G06N 20/10* (2019.01)

(56) References Cited

U.S. PATENT DOCUMENTS

| | | | |
|---|---|---|---|
| 6,181,909 B1 | 1/2001 | Burstein et al. | |
| 6,411,424 B1 | 6/2002 | Raj | |
| 6,731,307 B1 | 5/2004 | Strubbe et al. | |
| 6,961,692 B1 | 11/2005 | Polanyi et al. | |
| 7,013,259 B1 | 3/2006 | Polanyi et al. | |
| 7,152,031 B1 | 12/2006 | Jensen et al. | |
| 7,519,529 B1 | 4/2009 | Horvitz | |
| 7,840,556 B1 | 11/2010 | Dayal et al. | |
| 9,037,464 B1 | 5/2015 | Mikolov et al. | |
| 9,171,037 B2 | 10/2015 | Galitsky et al. | |
| 9,201,860 B1 | 12/2015 | Zhang et al. | |
| 9,201,868 B1 | 12/2015 | Zhang et al. | |
| 9,292,490 B2 | 3/2016 | Kimelfeld et al. | |
| 9,449,080 B1* | 9/2016 | Zhang | G06F 16/3346 |
| 9,559,993 B2 | 1/2017 | Palakovich et al. | |
| 9,582,501 B1 | 2/2017 | Salmon et al. | |
| 9,620,933 B1 | 4/2017 | Huang et al. | |
| 10,019,716 B1 | 7/2018 | Ainslie et al. | |
| 10,551,626 B2 | 2/2020 | Marciante | |
| 10,599,885 B2 | 3/2020 | Galitsky | |
| 10,679,011 B2 | 6/2020 | Galitsky | |
| 10,796,099 B2 | 10/2020 | Galitsky et al. | |
| 10,796,102 B2 | 10/2020 | Galitsky | |
| 10,817,670 B2 | 10/2020 | Galitsky | |
| 10,839,154 B2 | 11/2020 | Galitsky | |
| 10,853,574 B2 | 12/2020 | Galitsky | |
| 10,853,581 B2 | 12/2020 | Galitsky | |
| 10,935,802 B2 | 3/2021 | Marciante | |
| 11,100,144 B2 | 8/2021 | Galitsky | |
| 11,295,085 B2 | 4/2022 | Galitsky | |
| 11,328,016 B2 | 5/2022 | Galitsky | |
| 11,556,698 B2 | 1/2023 | Galitsky | |
| 11,580,298 B2 | 2/2023 | Galitsky | |
| 11,782,985 B2 | 10/2023 | Galitsky | |
| 11,797,773 B2 | 10/2023 | Galitsky | |
| 11,809,825 B2 | 11/2023 | Galitsky | |
| 11,880,652 B2 | 1/2024 | Galitsky | |
| 2001/0007987 A1 | 7/2001 | Igata | |
| 2001/0053968 A1 | 12/2001 | Galitsky et al. | |
| 2002/0040292 A1 | 4/2002 | Marcu | |
| 2002/0046018 A1 | 4/2002 | Marcu et al. | |
| 2002/0107851 A1 | 8/2002 | Beauchamp | |
| 2002/0176151 A1 | 11/2002 | Moon et al. | |
| 2003/0138758 A1 | 7/2003 | Burstein et al. | |
| 2004/0008416 A1 | 1/2004 | Okuno | |
| 2004/0044519 A1 | 3/2004 | Polanyi et al. | |
| 2004/0148170 A1 | 7/2004 | Acero et al. | |
| 2004/0158452 A1 | 8/2004 | Polanyi et al. | |
| 2004/0158453 A1 | 8/2004 | Polanyi et al. | |
| 2005/0086592 A1 | 4/2005 | Polanyi et al. | |
| 2005/0267871 A1 | 12/2005 | Marchisio et al. | |
| 2007/0073533 A1 | 3/2007 | Thione et al. | |
| 2007/0106499 A1 | 5/2007 | Dahlgren et al. | |
| 2007/0136284 A1 | 6/2007 | Cobb et al. | |
| 2007/0143098 A1 | 6/2007 | Van Den Berg et al. | |
| 2007/0192306 A1 | 8/2007 | Papakonstantinou et al. | |
| 2007/0294229 A1 | 12/2007 | Au | |
| 2008/0172409 A1 | 7/2008 | Botros et al. | |
| 2008/0228467 A1 | 9/2008 | Womack et al. | |
| 2009/0089252 A1 | 4/2009 | Galitsky et al. | |
| 2009/0100053 A1 | 4/2009 | Boschee et al. | |
| 2009/0248399 A1 | 10/2009 | Au | |
| 2009/0282019 A1 | 11/2009 | Galitsky et al. | |
| 2010/0169359 A1 | 7/2010 | Barrett et al. | |
| 2011/0119049 A1 | 5/2011 | Ylonen | |
| 2011/0153673 A1 | 6/2011 | Boschee et al. | |
| 2011/0216792 A1 | 9/2011 | Chann et al. | |
| 2011/0282856 A1 | 11/2011 | Ganti et al. | |
| 2012/0041950 A1 | 2/2012 | Koll et al. | |
| 2012/0078902 A1 | 3/2012 | Duboue et al. | |
| 2012/0254333 A1 | 10/2012 | Chandramouli et al. | |
| 2013/0046757 A1 | 2/2013 | Salvetti et al. | |
| 2013/0103386 A1 | 4/2013 | Zhang et al. | |
| 2013/0204611 A1 | 8/2013 | Tsuchida et al. | |
| 2014/0040288 A1 | 2/2014 | Galitsky | |
| 2014/0114649 A1 | 4/2014 | Zuev et al. | |
| 2014/0122083 A1 | 5/2014 | Xiaojiang | |
| 2014/0136188 A1 | 5/2014 | Wroczynski et al. | |
| 2015/0039294 A1 | 2/2015 | Howald et al. | |
| 2015/0039295 A1 | 2/2015 | Soschen | |
| 2015/0046492 A1 | 2/2015 | Balachandran | |
| 2015/0051900 A1 | 2/2015 | Kimelfeld et al. | |
| 2015/0081277 A1 | 3/2015 | Behi | |
| 2015/0149461 A1 | 5/2015 | Aguilar Lemarroy et al. | |
| 2015/0161200 A1 | 6/2015 | Barba et al. | |
| 2015/0161512 A1 | 6/2015 | Byron et al. | |
| 2015/0262393 A1 | 9/2015 | Bliss et al. | |
| 2015/0278198 A1 | 10/2015 | Andreev | |
| 2016/0034457 A1 | 2/2016 | Bradley et al. | |
| 2016/0055240 A1 | 2/2016 | Tur et al. | |
| 2016/0085743 A1 | 3/2016 | Haley | |
| 2016/0086601 A1 | 3/2016 | Chotimongkol et al. | |
| 2016/0098394 A1 | 4/2016 | Bruno et al. | |
| 2016/0099892 A1 | 4/2016 | Palakovich et al. | |
| 2016/0232152 A1 | 8/2016 | Mahamood | |
| 2016/0245779 A1 | 8/2016 | Khalaj Amineh et al. | |
| 2016/0246779 A1 | 8/2016 | Ho et al. | |
| 2016/0247068 A1 | 8/2016 | Lin | |
| 2016/0275573 A1 | 9/2016 | L'Huillier et al. | |
| 2016/0292153 A1 | 10/2016 | Agarwalla et al. | |
| 2016/0371321 A1 | 12/2016 | Myslinski | |
| 2017/0032053 A1 | 2/2017 | LeTourneau | |
| 2017/0060831 A1 | 3/2017 | Smythe et al. | |
| 2017/0082863 A1 | 3/2017 | Marciante | |
| 2017/0116982 A1 | 4/2017 | Gelfenbeyn et al. | |
| 2017/0228368 A1 | 8/2017 | Carter et al. | |
| 2017/0286390 A1 | 10/2017 | Yashpe et al. | |
| 2017/0358295 A1 | 12/2017 | Roux et al. | |
| 2018/0052818 A1 | 2/2018 | Bethard et al. | |
| 2018/0113939 A1 | 4/2018 | Chen et al. | |
| 2018/0181648 A1 | 6/2018 | Chen | |
| 2018/0189385 A1 | 7/2018 | Sun et al. | |
| 2018/0314689 A1 | 11/2018 | Wang et al. | |
| 2018/0329880 A1 | 11/2018 | Galitsky | |
| 2018/0357221 A1 | 12/2018 | Galitsky | |
| 2018/0365228 A1 | 12/2018 | Galitsky | |
| 2018/0365593 A1 | 12/2018 | Galitsky | |

(56) References Cited

U.S. PATENT DOCUMENTS

| | | | |
|---|---|---|---|
| 2018/0373701 | A1 | 12/2018 | McAteer et al. |
| 2019/0005027 | A1 | 1/2019 | He et al. |
| 2019/0057157 | A1 | 2/2019 | Mandal et al. |
| 2019/0095420 | A1 | 3/2019 | Galitsky |
| 2019/0103111 | A1 | 4/2019 | Tiwari et al. |
| 2019/0163756 | A1 | 5/2019 | Bull et al. |
| 2019/0295537 | A1 | 9/2019 | Sapugay et al. |
| 2019/0354544 | A1 | 11/2019 | Hertz et al. |
| 2019/0370604 | A1 | 12/2019 | Galitsky |
| 2019/0371299 | A1 | 12/2019 | Jiang et al. |
| 2020/0012720 | A1 | 1/2020 | Elson et al. |
| 2020/0151777 | A1 | 5/2020 | Casalino et al. |

FOREIGN PATENT DOCUMENTS

| | | | |
|---|---|---|---|
| CN | 105765566 | A | 7/2016 |
| CN | 106021224 | A | 10/2016 |
| CN | 106354844 | A | 1/2017 |
| CN | 106383875 | A | 2/2017 |
| JP | 2001-523019 | A | 11/2001 |
| JP | 2004139446 | A | 5/2004 |
| JP | 2004524559 | A | 8/2004 |
| JP | 2005-122743 | A | 5/2005 |
| JP | 2006260597 | A | 9/2006 |
| JP | 2015225415 | A | 12/2015 |
| JP | 2017224155 | A | 12/2017 |
| JP | 2018041336 | A | 3/2018 |
| WO | 9921104 | A1 | 4/1999 |
| WO | 2015003143 | A2 | 1/2015 |

OTHER PUBLICATIONS

EP19727786.6, "Office Action", Apr. 21, 2023, 7 pages.
U.S. Appl. No. 18/151,164, Notice of Allowance mailed on Nov. 28, 2023, 8 pages.
U.S. Appl. No. 17/235,329, Non-Final Office Action mailed on Apr. 13, 2023, 26 pages.
U.S. Appl. No. 17/652,366, Non-Final Office Action mailed on Apr. 17, 2023, 13 pages.
U.S. Appl. No. 17/690,897, Non-Final Office Action mailed on Mar. 30, 2023, 15 pages.
Chiarcos et al., Rhetorical Distance Revisited: a Parameterized Approach, Pragmatics & Beyond New Series 172, 2008, pp. 97-115.
Chinese Application No. 201880062996.5, Office Action mailed on Mar. 2, 2023, 17 pages. (9 pages of English Translation and 8 pages of Original Document).
Japanese Application No. 2022-191911, Office Action mailed on Jan. 30, 2024, 3 pages.
Data Loss Prevention & Protection, Symantec, Available Online at: http://www.symantec.com/business/theme.jsp?themeid=vontu, Accessed from Internet on Aug. 30, 2018, 6 pages.
Exploring Dialog Management for Bots, Chatbots Magazine, Available Online at: https://chatbotsmagazine.com/exploring-dialog management-for-bots-cbb8665a2fd3, Jul. 11, 2016, 7 pages.
Frase HubSpot Assistant, Available online at: https://www.frase.io/?hubspot, Accessed from Internet on Feb. 19, 2021, 12 pages.
Ignore, Deny, Downplay: Accounts of Syrians from Douma Have No Place in Western Narrative, Russia Today, Available Online at: https://www.rt.com/news/425438-douma-witnesses-gas-attack-syria/, Apr. 28, 2018, pp. 1-8.
Language Data, Yahoo Labs, Available Online at: https://webscope.sandbox.yahoo.com/catalog.php?datatype=l&guccounter=1, Accessed from Internet on Aug. 19, 2019, 5 pages.
Sense2vec: Semantic Analysis of the Reddit Hivemind, ExplosionAI, Available online at: https://explosion.ai/demos/sense2vec, 2019, 10 pages.
Start by Selecting a Make, Available Online at: https://web.archive.org/web/20170823095844/https://www.2carpros.com/, Accessed from Internet on Oct. 14, 2019, 6 pages.

Suicide Bomber Trial: Emails in Full, BBC News, Available Online at: news.bbc.co.uk/1/hi/uk/ 3825765.stm, Nov. 28, 2005, pp. 1-4.
Task Oriented Dialogue Dataset Survey, AtmaHou, Available online at https://github.com/AtmaHou/Task-Oriented-Dialogue-Dataset-Survey, Accessed from Internet on Feb. 2, 2021, 18 pages.
The bAbI Project, Facebook Babi, Available Online at: https://research.fb.com/downloads/babi/, 2019, 6 pages.
Trump Russia Affair: Key Questions Answered, BBC News, Available Online at: http://www.bbc.com/news/world-us-canada-42493918, Jul. 13, 2018, pp. 1-21.
Turku NLP Group, Available Online at: http://bionlp-www.utu.fi/wv_demo/, Accessed from Internet on Nov. 4, 2021, 2 pages.
Vietnamese Police Detain 8 Suspects in Connection with Illegal Immigration Organizing, People.cn, Available Online at: http://en.people.cn/n3/2019/1104/c90000-9629296.html, Nov. 4, 2019, 1 page.
Welcome to Apache Lucene, Apache Lucene 7.5.0 and Apache Solr 7.5.0, Available Online at: www.lucene.apache.org, Sep. 24, 2018, 38 pages.
Word to Vec JS Demo, Turbomaze, Available Online at: http://turbomaze.github.io/word2vecjson/, Accessed from Internet on Nov. 4, 2021, 1 page.
U.S. Appl. No. 16/010,123, Non-Final Office Action mailed on Feb. 8, 2021, 30 pages.
U.S. Appl. No. 16/010,123, Notice of Allowance mailed on May 19, 2021, 16 pages.
U.S. Appl. No. 16/145,644, Non-Final Office Action Mailed on Apr. 7, 2020, 17 pages.
U.S. Appl. No. 16/145,644, Notice of Allowance mailed on Jul. 16, 2020, 10 pages.
U.S. Appl. No. 16/145,702, Corrected Notice of Allowability mailed on Sep. 4, 2020, 3 pages.
U.S. Appl. No. 16/145,702, Final Office Action mailed on Sep. 10, 2019, 25 pages.
U.S. Appl. No. 16/145,702, Non-Final Office Action mailed on Feb. 5, 2020, 30 pages.
U.S. Appl. No. 16/145,777, Supplemental Notice of Allowability mailed on Sep. 2, 2020, 12 pages.
U.S. Appl. No. 16/240,23, Final Office Action mailed on Oct. 21, 2021, 13 pages.
U.S. Appl. No. 16/240,232, Non-Final Office Action mailed on Apr. 9, 2021, 13 pages.
U.S. Appl. No. 16/240,232, Non-Final Office Action mailed on Jan. 4, 2022, 15 pages.
U.S. Appl. No. 16/408,224, Notice of Allowance mailed on Jan. 7, 2022, 9 pages.
U.S. Appl. No. 16/736,517, Non-Final Office Action mailed on Dec. 8, 2021, 17 pages.
U.S. Appl. No. 16/995,302, Notice of Allowance mailed on Jan. 7, 2022, 11 pages.
Abbott et al., Internet Argument Corpus 2.0: An SQL Schema for Dialogic Social Media and the Corpora to Go with it, In Language Resources and Evaluation Conference, 2016, pp. 4445-4452.
Ajjour et al., Unit Segmentation of Argumentative Texts, Proceedings of the 4th Workshop on Argument Mining, Sep. 8, 2017, pp. 118-128.
Aker et al., What Works and What Does Not: Classifier and Feature Analysis for Argument Mining, Proceedings of the 4th Workshop on Argument Mining, Sep. 8, 2017, pp. 91-96.
Alicke et al., Hypocrisy: What counts? Philosophical Psychology, vol. 26, No. 5, Oct. 2013, 30 pages.
Allan, Automatic Hypertext Link Typing, Digital Library, vol. 778, No. 2, Mar. 1996, pp. 42-52.
Anelli et al., Knowledge-Aware and Conversational Recommender Systems, Proceedings of the 12th ACM Conference on Recommender Systems, Sep. 2018, pp. 521-522.
Appel et al., A Hybrid Approach to the Sentiment Analysis Problem at the Sentence Level, Knowledge-Based Systems, vol. 108, May 13, 2016, pp. 1-32.
Ariely, Predictably Irrational, 2008, 308 pages.
Arras et al., What is Relevant in a Text Document ?: An Interpretable Machine Learning Approach, Public Library of Science One,

(56) References Cited

OTHER PUBLICATIONS

Available Online at: https://journals.plos.org/plosone/article/fileid=10.1371/journal.pone.0181142&type=printable, Aug. 11, 2017, 23 pages.
Artooras et al., Stanford NLP-VP vs NP, Stack Overflow Website, Mar. 8-9, 2016, 2 pages.
Arya et al., One Explanation Does Not Fit All: A Toolkit and Taxonomy of AI Explainability Techniques, ArXiv abs/1909.03012, Sep. 14, 2019, 18 pages.
Auer et al., DBpedia: A Nucleus for a Web of Open Data, International Semantic Web Conference, Lecture Notes in Computer Science, vol. 4825, Nov. 11, 2007, pp. 1-14.
Banarescu et al., Abstract Meaning Representation for Sembanking, In Proceedings of the 7th Linguistic Annotation Workshop and Interoperability with Discourse., Aug. 8-9, 2013, pp. 178-186.
Banarescu et al., Abstract Meaning Representation for Sembanking, Proceedings of the 7th Linguistic Annotation Workshop & Interoperability with Discourse, Aug. 8-9, 2013, pp. 178-186.
Banchs, Movie-DiC: A Movie Dialogue Corpus for Research and Development, Proceedings of the 50th Annual Meeting of the Association for Computational Linguistics, vol. 2, Jul. 2012, pp. 203-207.
Bao et al., Knowledge-based Question Answering as Machine Translation, Association for Computational Linguistics, Jun. 23-25, 2014, pp. 967-976.
Barden et al., Saying One Thing and Doing Another: Examining the Impact of Event Order on Hypocrisy Judgments of Others, Personality and Social Psychology, vol. 31, No. 11, Dec. 2005, pp. 1463-1474.
Bar-Haim et al., Improving Claim Stance Classification with Lexical Knowledge Expansion and Context Utilization, Proceedings of the 4th Workshop on Argument Mining, Sep. 8, 2017, pp. 32-38.
Bar-Haim et al., Stance Classification of Context-Dependent Claims, Proceedings of the 15th Conference of the European Chapter of the Association for Computational Linguistics: vol. 1, Apr. 3-7, 2017, pp. 251-261.
Baroni et al., Argumentation Through a Distributed Self-Stabilizing Approach, Journal of Experimental & Theoretical Artificial Intelligence, vol. 14, No. 4, 2002, pp. 273-301.
Barzilay et al., Modeling Local Coherence: An Entity-Based Approach, Computational Linguistics, vol. 34, No. 1, Mar. 2008, pp. 1-34.
Barzilay et al., Using Lexical Chains for Text Summarization, Proceedings of the ACL/EACL'97 Workshop on Intelligent Scalable Text Summarization, Jul. 1997, pp. 10-17.
Bazinska, Explore Word Analogies, Available Online at: https://lamyiowce.github.io/word2viz/, 2017, 2 Pages.
Bedi et al., Argumentation-Enabled Interest-Based Personalized Recommender System, Journal of Experimental & Theoretical Artificial Intelligence, vol. 27, No. 2, 2015, pp. 1-45.
Bentahar et al., A Taxonomy of Argumentation Models Used for Knowledge Representation, Artificial Intelligence Review, vol. 33, No. 3, Mar. 2010, 49 pages.
Berkovsky et al., Influencing Individually: Fusing Personalization and Persuasion, ACM Transactions on Interactive Intelligent Systems, vol. 2, No. 2, Article 9, Jun. 2012, 8 pages.
Bernard et al., The Power of Well-Connected Arguments: Early Sensitivity to the Connective Because, Journal of Experimental Child Psychology, vol. 111, 2012, pp. 128-135.
Berzlanovich et al., Coherence Structure and Lexical Cohesion in Expository and Persuasive Texts, Proceedings of the Workshop on Constraints in Discourse III, 2008, 8 pages.
Biran et al., Identifying Justifications in Written Dialogs by Classifying Text as Argumentative, International Journal of Semantic Computing, vol. 5, No. 4, Dec. 2011, pp. 363-381.
Bird et al., Natural Language Processing with Python, Analyzing Text with the Natural Language Toolkit, Available Online at: http://www.nltk.org/book_1ed, 2009, 504 pages.
Biswa, Putt's Law, Peter Principle, Dilbert Principle of Incompetence & Parkinson's Law, Available Online at: http://asmilingassasin.blogspot.com/2015/06/putts-law-peter-principle-dilbert.html, 2015, 5 pages.
Boguslavsky et al., Multilinguality in ETAP-3: Reuse of Lexical Resources, Proceedings of the Workshop on Multilingual Linguistic Ressources, Aug. 28, 2004, 8 pages.
Bollacker et al., Freebase: A Collaboratively Created Graph Database for Structuring Human Knowledge, Proceedings of the 2008 ACM SIGMOD international conference on Management of data, Jun. 2008, pp. 1247-1250.
Bolshakov et al., Synonymous Paraphrasing Using WordNet and Internet, Department of Computer Science and Engineering, Chung-Ang University, Seoul, Jan. 1970, 12 pages.
Bordes et al., Learning End-To-End Goal-Oriented Dialog, Available online at: https://arxiv.org/abs/1605.07683, Mar. 2017, 15 pages.
Bordes et al., Question Answering With Subgraph Embeddings, In Proceedings of the 2014 Conference on Empirical Methods in Natural Language Processing EMNLP, Oct. 2014, pp. 615-620.
Bowman et al., Large Annotated Corpus for Learning Natural Language Inference, ArXiv preprint arXiv:1508.05326, Aug. 21, 2015, 11 pages.
Bridge, Towards Conversational Recommender Systems: A Dialogue Grammar Approach, Conference: 6th European Conference ov Case Based Reasoning, ECCBR 2002, Jan. 2002, pp. 9-22.
Britt et al., Constructing Representations of Arguments, Journal of Memory and Language, vol. 48, No. 4, 2003, pp. 794-810.
Budanitsky et al., Evaluating WordNet-Based Measures of Lexical Semantic Relatedness, Computational Linguistics, vol. 32, No. 1, Mar. 2006, pp. 13-47.
Budzianowski et al., MultiWOZ—A Large-Scale Multi-Domain Wizard-of-Oz Dataset for Task-Oriented Dialogue Modelling, Proceedings of the 2018 Conference on Empirical Methods in Natural Language Processing, Oct. 31-Nov. 4, 2018, pp. 5016-5026.
Cabrio et al., A Natural Language Bipolar Argumentation Approach to Support Users in Online Debate Interactions, Argument and Computation, vol. 4, No. 3, 2013, pp. 209-230.
Cabrio et al., Combining Textual Entailment and Argumentation Theory for Supporting Online Debates Interactions, Proceedings of the 50th Annual Meeting of the Association for Computational Linguistics, Jul. 8-14, 2012, pp. 208-212.
Camburu et al., e-snli: Natural Language Inference with Natural Language Explanations, Advances in Neural Information Processing Systems, Dec. 6, 2018, 11 pages.
Campbell, Chatbot Win Prize By Changing The Subject, New Scientist, vol. 208, No. 2785, Nov. 6, 2010, 1 page.
Carlson et al., Building a Discourse-Tagged Corpus in the Framework of Rhetorical Structure Theory, Proceedings of the Second SIGdial Workshop on Discourse and Dialogue, vol. 16, Sep. 1-2, 2001, 10 pages.
Carreyrou, Hot Startup Theranos Has Struggled with Its Blood-Test Technology, Available Online at: https://www.wsj.com/articles/theranos-has-struggled-with-blood-tests-1444881901, Oct. 16, 2015, 6 pages.
Castellucci et al., Context-Aware Models for Twitter Sentiment Analysis, Emerging Topics at the First Italian Conference on Computational Linguistics, vol. 1, No. 1, Dec. 2015, pp. 75-89.
Chali et al., Complex Question Answering: Unsupervised Learning Approaches and Experiments, Journal of Artificial Intelligence Research, vol. 35, May 2009, pp. 1-47.
Charolles, Cohesion, Coherence Et Pertinence De Discours, Travaux de Linguistique, vol. 29, 1995, pp. 125-151.
Chen et al., Critiquing-Based Recommenders: Survey and Emerging Trends, User Modeling and User-Adapted Interaction, vol. 22, Nos. 1-2, Apr. 2012, pp. 125-150.
Cheng et al., Joint Training for Pivot-Based Neural Machine Translation, Proceedings of the Twenty-Sixth International Joint Conference on Artificial Intelligence (IJCAI-17), Feb. 21, 2017, 7 pages.
Choi et al., QuAC: Question Answering in Context, Empirical Methods in Natural Language Processing., Aug. 28, 2018, pp. 2174-2184.

(56) References Cited

OTHER PUBLICATIONS

Christakopoulou et al., Towards Conversational Recommender Systems, KDD '16: Proceedings of the 22nd ACM SIGKDD International Conference on Knowledge Discovery and Data Mining, Aug. 2016, 10 pages.
Collins et al., New Ranking Algorithms for Parsing and Tagging: Kernels Over Discrete Structures, and the Voted Perceptron, Proceedings of the 40th Annual Meeting of the Association for Computational Linguistics (ACL), Jul. 2002, pp. 263-270.
Coulmance et al., Trans-Gram, Fast Cross-Lingual Word-Embeddings, Available Online at: https://arxiv.org/pdf/1601.02502.pdf, Jan. 11, 2016, 8 pages.
Craig et al., Overhearing Dialogues and Monologues in Virtual Tutoring Sessions: Effects on Questioning and Vicarious Learning, International Journal of Artificial Intelligence in Education, Jan. 2000, pp. 242-253.
Crutzen et al., An Artificially Intelligent Chat Agent That Answers Adolescents' Questions Related to Sex, Drugs, and Alcohol: An Exploratory Study, Journal of Adolescent Health, vol. 48, No. 5, May 2011, pp. 1-6.
Dagan et al., Recognizing Textual Entailment: Rational, Evaluation and Approaches, Natural Language Engineering, vol. 15, No. 4, Oct. 2009, pp. i-xvii.
Damer, Attacking Faulty Reasoning: A Practical Guide to Fallacy-Free Reasoning, Wadsworth Cengage Learning, 2009, 257 pages.
Damonte et al., An Incremental Parser for Abstract Meaning Representation, Proceedings of Equine Analytical Chemistry Laboratory, Apr. 10, 2017, 12 pages.
Damonte et al., Cross-lingual Abstract Meaning Representation Parsing, Proceedings of NAACL, Feb. 24, 2018, 10 pages.
Das et al., Frame-Semantic Parsing, Computational Linguistics, vol. 40, No. 1, Mar. 2014, pp. 9-56.
De Mori et al., Spoken Language Understanding, Institute of Electrical and Electronics Engineers Signal Processing Magazine, vol. 25, No. 3, May 2008, pp. 50-58.
Devillez, Writing: Step by Step, Kendall Hunt, 2003.
Devlin et al., BERT: Pre-Training of Deep Bidirectional Transformers for Language Understanding, In Proceedings of the Conference of the North American Chapter of the Association for Computational Linguistics: Human Language Technologies, vol. 1, May 24, 2019, 16 pages.
Dosilovic et al., Explainable Artificial Intelligence: A Survey, In Proc. MIPRO, May 2018, pp. 210-215.
Du et al., Learning to Ask: Neural Question Generation for Reading Comprehension, Proceedings of the 55th Annual Meeting of the Association for Computational Linguistics, vol. 1, Apr. 29, 2017, 11 pages.
Dung, On the Acceptability of Arguments and Its Fundamental Role in Nonmonotonic Reasoning, Logic Programming and N-Person Games, Artificial Intelligence, vol. 77, No. 2, Sep. 1995, pp. 321-357.
Dunne et al., Computational Models of Argument, Proceedings of Computational Models of Argument, IOS Press, 2006, 353 pages.
Dwivedi, NLP-Building a Question Answering Model, Towards Data Science, Available Online at: https://towardsdatascience.com/nlp-building-a-question-answering-model-ed0529a68c54, Mar. 29, 2018, 7 pages.
Eckle-Kohler et al., On the Role of Discourse Markers for Discriminating Claims and Premises in Argumentative Discourse, Proceedings of the 2015 Conference on Empirical Methods in Natural Language Processing, Sep. 17-21, 2015, pp. 2236-2242.
Egg et al., Underspecified Discourse Representation, Constraints in Discourse, 2008, pp. 117-138.
Ellsworth et al., Mutaphrase: Paraphrasing with FrameNet, Proceedings of the Workshop on Textual Entailment and Paraphrasing, Available Online at: http://www.icsi.berkeley.edu/pubs/speech/acl07.pdf, Jun. 2007, pp. 143-150.
Elsner et al., You Talking to Me? A Corpus and Algorithm for Conversation Disentanglement, Proceedings of ACL-08: HLT, Jun. 2008, pp. 834-842.
European Application No. EP18727946.8, Office Action mailed on Dec. 15, 2021, 7 pages.
Fagin et al., Reasoning About Knowledge, The MIT Press, 1996, 75 pages.
Faruqui et al., Improving Vector Space Word Representations Using Multilingual Correlation, Proceedings of the 14th Conference of the European Chapter of the Association for Computational Linguistics, Apr. 26-30, 2014, pp. 462-471.
Felfernig et al., Developing Constraint-Based Recommenders, Recommender Systems Handbook, 2010, pp. 187-215.
Feng et al., Classifying Arguments by Scheme, Proceedings of the 49th Annual Meeting of the Association for Computational Linguistics, vol. 1, Jun. 19-24, 2011, pp. 987-996.
Feng et al., Distributional Footprints of Deceptive Product Reviews, Proceedings of the Sixth International Association for the Advancement of Artificial Intelligence Conference on Weblogs and Social Media, The Association for the Advancement of Artificial Intelligence Press, Jan. 2012, pp. 98-105.
Feng et al., Syntactic Stylometry for Deception Detection, In Association for Computational Linguistics 12, Proceedings of the 50th Annual Meeting of the Association for Computational Linguistics, Jul. 8-14, 2012, pp. 171-175.
Feng et al., Text-Level Discourse Parsing with Rich Linguistic Features, Proceedings of the 50th Annual Meeting of the Association for Computational Linguistics, vol. 1, Jul. 8-14, 2012, pp. 60-68.
Feng et al., The Impact of Deep Hierarchical Discourse Structures in the Evaluation of Text Coherence, Proceedings of COLING 2014, the 25th International Conference on Computational Linguistics, Aug. 2014, 10 pages.
Ferretti et al., A Possibilistic Defeasible Logic Programming Approach to Argumentation-Based Decision-Making, Journal of Experimental & Theoretical Artificial Intelligence, vol. 26, No. 4, Jun. 10, 2014, pp. 519-550.
Finn, A Question Writing Algorithm, Journal of Reading Behavior, VII, vol. 4, 1975, pp. 341-367.
Flanigan et al., A Discriminative Graph-Based Parser for the Abstract Meaning Representation, Proceedings of the 52nd Annual Meeting of the Association for Computational Linguistics, Jun. 2014, pp. 1426-1436.
Florou et al., Argument Extraction for Supporting Public Policy Formulation, Proceedings of the 7th Workshop on Language Technology for Cultural Heritage, Social Sciences, and Humanities, Aug. 8, 2013, pp. 49-54.
Foltz et al., The Measurement of Textual Coherence with Latent Semantic Analysis, Discourse Processes, vol. 25, Nos. 2-3, 1998, 31 pages.
Fornaciari et al., Identifying Fake Amazon Reviews as Learning from Crowds, Proceedings of the 14th Conference of the European Chapter of the Association for Computational Linguistics, Apr. 26-30, 2014, pp. 279-287.
Fouad et al., Meta-agents: Using Multiagent Networks to Manage Dynamic Changes in the Internet of Things, Association for the Advancement of Artificial Intelligence Spring Symposium Series, 2019, 2 pages.
Fox, Discourse Structure and Anaphora: Written and Conversational English, Cambridge University Press, 1987, pp. 77-92.
Freeley et al., Argumentation and Debate, Critical Thinking for Reasoned Decision Making, Eleventh Edition, vol. 27, No. 3, Jun. 10, 1991, pp. 137-152.
Galitsky et al., A Chatbot Demo about a Broken Student, Available Online at: https://drive.google.com/open?id=0B-TymkYCBPsfV3JQSGU3TE9mRVk, 2018.
Galitsky, A Demo of a Chatbot for a Virtual Persuasive Dialogue, Persuasive technologies 14th International Conference, Limassol, Cyprus, Apr. 9-11, 2019.
Galitsky et al., A Novel Approach for Classifying Customer Complaints Through Graphs Similarities in Argumentative Dialogues, Decision Support Systems, vol. 46, No. 3, Nov. 4, 2008, 28 pages.
Galitsky et al., Accessing Validity of Argumentation of Agents of the Internet of Everything, Artificial Intelligence for the Internet of Everything, Chapter 11, Jan. 2019, pp. 187-216.

(56) References Cited

OTHER PUBLICATIONS

Galitsky et al., Argumentation in Text: Discourse Structure Matters, Available Online at: https://nlp.fi.muni.cz/trac/research/raw-attachment/wiki/cs/OCemSeMluvi/paper_15.pdf, 2018, 13 pages.
Galitsky, Assuring Chatbot Relevance at Syntactic Level, Developing Enterprise Chatbots, Apr. 2019, 42 pages.
Galitsky, Building Chatbot Thesaurus, Developing Enterprise Chatbots, Apr. 2019, pp. 221-252.
Galitsky et al., Building Dialogue Structure from Discourse Tree of a Question, Proceedings of the 2018 EMNLP Workshop SCAI: The 2nd International Workshop on Search-Oriented Conversational AI, Oct. 31, 2018, pp. 17-23.
Galitsky et al., Building Integrated Opinion Delivery Environment, Proceedings of the Twenty-Fourth International Florida Artificial Intelligence Research Society Conference, Jan. 2011, 6 pages.
Galitsky et al., Building Web Infrastructure for Providing Rating Services and Subscription to Them, Mathematical Modeling, vol. 19, No. 2, 2007, 14 pages.
Galitsky et al., Chatbot Components and Architectures, In Developing Enterprise Chatbots, Springer, 2019, pp. 13-47.
Galitsky et al., Concept-Based Learning of Human Behavior for Customer Relationship Management, Information Sciences, vol. 181, No. 10, May 15, 2011, pp. 2016-2035.
Galitsky et al., Constructing Imaginary Discourse Trees Improves Answering Convergent Questions, CICLING, Apr. 7-13, 2019, 5 pages.
Galitsky et al., Customers' Retention Requires an Explainability Feature in Machine Learning Systems They Use, 2018 AAAI Spring Symposium Series, 2018, pp. 214-220.
Galitsky, Customers Retention Requires an Explainability Feature in Machine Learning Systems They Use, AAAI Spring Symposium on Beyond Machine Intelligence: Understanding Cognitive Bias and Humanity for Well-Being AI. Stanford CA, 2018, pp. 214-220.
Galitsky et al., Detecting Logical Argumentation in Text via Communicative Discourse Tree, Journal of Experimental & Theoretical Artificial Intelligence, vol. 30, No. 5, May 2018, 29 pages.
Galitsky et al., Discourse-Based Approach to Involvement of Background Knowledge for Question Answering, Proceedings of the International Conference on Recent Advances in Natural Language Processing, Sep. 2-4, 2019, pp. 373-381.
Galitsky et al., Discourse-Level Dialogue Management, In Developing Enterprise Chatbots: Springer Nature, 2019, pp. 365-387.
Galitsky et al., Discovering Common Outcomes of Agents' Communicative Actions in Various Domains, Knowledge-Based Systems, vol. 24, No. 2, Mar. 2011, pp. 210-229.
Galitsky et al., Enabling a Bot with Understanding Argumentation and Providing Arguments., In Developing Enterprise Chatbots, Springer—Cham, Switzerland., 2019, pp. 465-532.
Galitsky et al., Explainable Machine Learning for Chatbots, In Developing Enterprise Chatbots, Springer, Cham, Switzerland, 2019, pp. 53-83.
Galitsky et al., Extending Tree Kernels Towards Paragraphs, International Journal of Computational Linguistics and Applications, vol. 5, No. 1, Jan.-Jun. 2014, pp. 105-116.
Galitsky et al., From Generalization of Syntactic Parse Trees to Conceptual Graphs, Proceedings of the 18th international conference on Conceptual structures: from information to intelligence, Jul. 2010, pp. 185-190.
Galitsky, Inductive Learning of Dispute Scenarios for Online Resolution of Customer Complaints, 3rd International IEEE Conference Intelligent Systems, Sep. 2006, pp. 103-108.
Galitsky et al., Interrupt Me Politely: Recommending Products and Services by Joining Human Conversation, Proceedings of the Workshop on Natural Language Processing in E-Commerce, Dec. 12, 2020, 11 pages.
Galitsky et al., Learning Adversarial Reasoning Patterns in Customer Complaints, Workshop at AAAI, (WS-11-06), 2011, 8 pages.
Galitsky, Learning Noisy Discourse Trees, Computational Linguistics and Intellectual Technologies, Proceedings of the International Conference Dialogue 2017. Available Online at: http://www.dialog-21.ru/media/3911/galitskyb.pdf, May 31-Jun. 3, 2017, 14 pages.
Galitsky, Matching Parse Thickets for Open Domain Question Answering, Data & Knowledge Engineering, vol. 107, Dec. 9, 2016, pp. 24-50.
Galitsky, Matching Parse Thickets for Open Domain Question Answering, Data & Knowledge Engineering, vol. 107, Jan. 2017, pp. 24-50.
Galitsky et al., Matching Sets of Parse Trees for Answering Multi-Sentence Questions, Proceedings of Recent Advances in Natural Language Processing, Sep. 2013, pp. 285-293.
Galitsky, Natural Language Understanding with the Generality Feedback, Discrete Mathematics and Theoretical Computer Science Technical Report 99-32, Jun. 1999, pp. 1-21.
Galitsky, On a Chatbot Conducting a Virtual Social Dialogue, 28th Association for Computing Machinery International Conference, Nov. 2019, 9 pages.
Galitsky et al., On a Chatbot Conducting Dialogue-in-Dialogue, Proceedings of the 20th Annual SIGdial Meeting on Discourse and Dialogue, Sep. 11-13, 2019, pp. 118-121.
Galitsky et al., On a Chatbot Conducting Virtual Dialogues, CIKM '19: Proceedings of the 28th ACM International Conference on Information and Knowledge Management, vol. 4, Nov. 3, 2019, pp. 2925-2928.
Galitsky et al., Programming Spatial Algorithms in Natural Language, Natural Language Processing, Available Online at: https://www.researchgate.net/publication/255598711_Programming_Spatial_Algorithms_in_Natural_Language, Jan. 2008, pp. 16-23.
Galitsky, Providing Personalized Recommendation for Attending Events Based on Individual Interest Profiles, Artificial Intelligence Research, vol. 5, No. 1, Sep. 2015, 37 pages.
Galitsky, Rhetorical Agreement: Maintaining Cohesive Conversations, Springer Nature, 2019, pp. 327-360.
Galitsky et al., Simulating the Conflict Between Reputation and Profitability for Online Rating Portals, Journal of Artificial Societies and Social Simulation vol. 8, No. 2, 2005, 21 pages.
Galitsky et al., Team Formation by Children with Autism, Research Gate, Available Online at: https://www.researchgate.net/publication/283023160, Jan. 2015, 10 pages.
Galitsky et al., Using Generalization of Syntactic Parse Trees for Taxonomy Capture on the Web, ICCS 2011, LNAI 6828, Jul. 2011, pp. 104-117.
Ganter et al., Pattern Structures and Their Projections, International Conference on Conceptual Structures, Jul. 30-Aug. 3, 2001, 16 pages.
Garcia-Villalba et al., A Framework to Extract Arguments in Opinion Texts, International Journal of Cognitive Informatics and Natural Intelligence, vol. 6, No. 3, pp. 62-87, Jul.-Sep. 2012.
Ghosh et al., Analyzing Argumentative Discourse Units in Online Interactions, Proceedings of the First Workshop on Argumentation Mining, Jun. 26, 2014, pp. 39-48.
Glickman et al., Web Based Probabilistic Textual Entailment, Computer Science Department, Available Online at: https://citeseerx.ist.psu.edu/viewdoc/download?doi=10.1.1.125.6555&rep=rep1&type=pdf, Jan. 2005, 4 pages.
Golightly et al., Writing and Reading in the Disciplines, Pearson Custom Publishing, 2000.
Goutsos, Modeling Discourse Topic: Sequential Relations and Strategies in Expository Text, Text, vol. 16, No. 4, Dec. 1, 1996, pp. 501-533.
Grasso, Characterising Rhetorical Argumentation, Heriot-watt University, Department of Computing & Electrical Engineering, Jun. 2003, 235 pages.
Grasso, Playing with RST: Two Algorithms for the Automated Manipulation of Discourse Trees, Text, Speech and Dialogue: Second International Workshop, TSD'99 Plzen, Czech Republic, Proceedings, Conference Paper, Jan. 1999, pp. 357-360.
Greenberg, Conversational Experiences: Building Relationships One Conversation at a Time, Social CRM: The Conversation, Oct. 30, 2018, 10 pages.
Gronroos, The Relationship Marketing Process: Communication, Interaction, Dialogue, Value, Journal of Business & Industrial Marketing, vol. 19, Issue 2, Mar. 2004, pp. 99-113.

(56) References Cited

OTHER PUBLICATIONS

Grosz et al., Attention, Intention and the Structure of Discourse, Computational Linguistics, vol. 12, No. 3, 1986, pp. 175-204.
Grosz et al., Centering: A Framework for Modeling the Local Coherence of Discourse, Computational Linguistics, vol. 21, No. 2, Jun. 1995, 24 pages.
Grosz et al., Centering: A Framework for Modeling the Local Coherence of Discourse, Computational Linguistics, vol. 21, No. 2, Jan. 1995, pp. 203-225.
Grudin, The Rise of Incompetence, Association for Computing Machinery Interactions, Available Online at: https://interactions.acm.org/archive/view/january-february-2016/the-rise-of-incompetence, Jan.-Feb. 2016, 2 pages.
Gundel et al., Cognitive Status and The Form of Referring Expressions in Discourse, Language, vol. 69, No. 2, Jun. 1993, pp. 274-307.
Hai et al., Deceptive Review Spam Detection via Exploiting Task Relatedness and Unlabeled Data, Proceedings of the 2016 Conference on Empirical Methods in Natural Language Processing, Nov. 1-5, 2016, pp. 1817-1826.
Hall et al., The Weka Data Mining Software: An Update, Special Interest Group on Knowledge Discovery and Data Mining, Explorations Newsletter, vol. 11, No. 1, Available Online at: http://dx.doi.org/10.1145/1656274.1656278, Jun. 2009, pp. 10-18.
Halliday et al., Cohesion in English, vol. 14, No. 1, 1980, pp. 47-50.
Hasida et al., SemAF: Discourse Structures, Online Available at: http://slideplayer.com/slide/6408486/, 2018, 6 pages.
Heerschop et al., Polarity Analysis of Texts Using Discourse Structure, In Proceedings of the 20th ACM International Conference on Information and Knowledge Management, CIKM '11, Oct. 2011, 10 pages.
Heilman et al., Good Question! Statistical Ranking for Question Generation, Human Language Technologies: The 2010 Annual Conference of the North American Chapter of the Association for Computational Linguistics, Jun. 2010, pp. 609-617.
Hobbs, Coherence and Coreference, Cognitive Science, vol. 3, No. 1, Jan.-Mar. 1979, pp. 67-90.
Hoffman, Financial Report Ontology, Available online at: http://www.xbrlsite.com/2015/fro/, 2015, 2 Pages.
Hogenboom et al., Polarity Classification Using Structure-Based Vector Representations of Text, Decision Support Systems, vol. 74, Mar. 12, 2015, 18 pages.
Hogenboom et al., Using Rhetorical Structure in Sentiment Analysis, Communications of the ACM, vol. 58, No. 7, Jul. 2015, pp. 69-77.
Ibeke et al., Extracting and Understanding Contrastive Opinion through Topic Relevant Sentences, Proceedings of the Eighth International Joint Conference on Natural Language Processing, vol. 2, Nov. 27-Dec. 1, 2017, pp. 395-400.
Ilvovsky, Going Beyond Sentences When Applying Tree Kernels, Proceedings of the Student Research Workshop, vol. 20, No. 4, Jun. 22-27, 2014, pp. 56-63.
Indian Application No. 201947044096, First Examination Report mailed on Jan. 13, 2022, 5 pages.
Indian Application No. 202047007447, First Examination Report, Sep. 9, 2021, 6 pages.
Jansen et al., Worldtree: a Corpus of Explanation Graphs for Elementary Science Questions Supporting Multi-Hop Inference, CoRR, abs/1802.03052, 2018, 9 pages.
Jasinskaja et al., Rhetorical Relations, Aug. 13, 2015, pp. 1-23.
Ji et al., A Neural Discourse Structure for Text Categorization, ACL, Aug. 2017, 10 pages.
Ji et al., Neural Discourse Structure for Text Categorization, Proceedings of the 55th Annual Meeting of the Association for Computational Linguistics, vol. 1, Jul. 30-Aug. 4, 2017, pp. 996-1005.
Ji et al., Representation Learning for Text-Level Discourse Parsing, Association for Computational Linguistics, Available Online at: https://www.aclweb.org/anthology/P14-1002, Jun. 2014, pp. 13-24.
Jijkoun et al., Recognizing Textual Entailment Using Lexical Similarity, Available Online at: https://u.cs.biu.ac.il/~nlp/RTE1/Proceedings/jijkoun_and_de_rijke.pdf, Jan. 2005, 4 pages.
Jindal et al., Opinion Spam and Analysis, Proceeding WSDM '08 Proceedings of the 2008 International Conference on Web Search and Data Mining, Feb. 11-12, 2008, pp. 219-229.
Joachims et al., Cutting-Plane Training of Structural SVMs, Machine Learning, vol. 77, No. 1, Oct. 2009, pp. 27-59.
Johnson et al., Procedural Generation of Linguistics, Dialects, Naming Conventions and Spoken Sentences, Proceedings of 1st International Joint Conference of DiGRA and FDG, 2016, 9 pages.
Jorgensen et al., Challenges of Studying and Processing Dialects in Social Media, Proceedings of the ACL 2015 Workshop on Noisy User-Generated Text, Jul. 31, 2015, pp. 9-18.
Kan et al., Linear Segmentation and Segment Significance, Department of Computer Science and Center for Research on Information Access, Sep. 15, 1998, 9 pages.
Kelley, An Iterative Design Methodology for User-Friendly Natural Language Office Information Applications, ACM Transaction on Information Systems, vol. 2, No. 1, Mar. 1984, pp. 26-41.
Kerly et al., Bringing Chatbots into Education: Towards Natural Language Negotiation of Open Learner Models, Knowledge-Based Systems, vol. 20, No. 2, Dec. 2006, 14 pages.
Khan et al., SWIMS: Semi-Supervised Subjective Feature Weighting and Intelligent Model Selection for Sentiment Analysis, Knowledge-Based Systems, vol. 100, May 15, 2016, pp. 97-111.
Khardon et al., The Subsumption Lattice and Query Learning, Journal of Computer and System Sciences, vol. 72, No. 1, Feb. 2006, pp. 72-94.
Kittredge et al., An Advanced English Grammar with Exercises, The Athenaeum Press, 1913, 266 pages.
Klenner, A Model for Multi-Perspective Opinion Inferences, Proceedings of IJCAI Workshop Natural Language Meets Journalism, Jul. 9, 2016, pp. 6-11.
Kocisky et al., The NarrativeQA Reading Comprehension Challenge, Transactions of the Association for Computational Linguistics, vol. 6, May 2018, pp. 317-328.
Koiti, Presentation on Theme: WG2 PWI24617-5 SemAF, Discourse Structure, Berlin HASIDA Koiti AIST, Accessed from Internet on Oct. 14, 2019, 2 pages.
Kong, Are Simple Business Request Letters Really Simple? A Comparison of Chinese and English Business Request Letters, Text-Interdisciplinary Journal for the Study of Discourse, vol. 18, No. 1, 1998, pp. 103-141.
Kostelnik et al., Chatbots For Enterprises: Outlook, Acta Universitatis Agriculturae ET Silviculturae Mendelianae Brunensis, vol. 67, No. 6, 2019, pp. 1541-1550.
Kovalerchuk et al., Toward Virtual Data Scientist with Visual Means, International Joint Conference on Neural Networks, Feb. 2017, pp. 3073-3080.
Krakovna et al., Increasing the Interpretability of Recurrent Neural Networks Using Hidden Markov Models, ICML Workshop on Human Interpretability in Machine Learning, Sep. 30, 2016, pp. 46-50.
Kuchaiev et al., Topological Network Alignment Uncovers Biological Function and Phylogeny, Journal of the Royal Society Interface, vol. 7, Mar. 24, 2010, pp. 1341-1354.
Kumar et al., A Framework for Automatic Question Generation from Text using Deep Reinforcement Learning, Proceedings of the 2019 IJCAI Workshop SCAI: The 4th International Workshop on Search-Oriented Conversational AI, Aug. 3, 2019, 7 pages.
Kuyten et al., A Discourse Search Engine based on Rhetorical Structure Theory, Advances in Information Retrieval: 37th European Conference on IR Research, Mar. 2015, 12 pages.
Kwiatkowski et al., Natural Questions: a Benchmark for Question Answering Research, Transactions of the Association of Computational Linguistics, 2019, 14 pages.
Kwiatkowski et al., Scaling Semantic Parsers With on-the-fly Ontology Matching, Empirical Methods in Natural Language Processing, Oct. 18-21, 2013, pp. 1545-1556.
Kwon et al., Identifying and Classifying Subjective Claims, The Proceedings of the 8th Annual International Digital Government Research Conference, May 20-23, 2007, pp. 76-81.

(56) References Cited

OTHER PUBLICATIONS

Lake et al., Human-Level Concept Learning Through Probabilistic Program Induction, Science, vol. 350, No. 6266, Dec. 11, 2015, pp. 1332-1338.

Lan et al., Albert: A Lite BERT for Self-Supervised Learning of Language Representations, In Conference Paper at ICLR 2020, Feb. 9, 2020, pp. 1-17.

Lawless et al., AI and the Mitigation of Error: a Thermodynamics of Teams, Association for the Advancement of Artificial Intelligence Spring Symposia, 2016, 8 pages.

Lawrence et al., Combining Argument Mining Techniques, Working Notes of the 2nd Argumentation Mining Workshop, Jun. 4, 2015, pp. 127-136.

Lawrence et al., Mining Argumentative Structure from Natural Language Text Using Automatically Generated Premise-Conclusion Topic Models, Proceedings of the 4th Workshop on Argument Mining, Sep. 8, 2017, pp. 39-48.

Lee, Genres, Registers, Text Types, Domain, and Styles: Clarifying the Concepts and Navigating a Path Through the BNC Jungle, Language Learning & Technology, vol. 5, No. 3, Sep. 2001, pp. 37-72.

Levchuk et al., Active Inference in Multiagent Systems: Context-driven Collaboration and Decentralized Purpose-driven Team Adaptation, Artificial Intelligence for the Internet of Everything, 2019, 9 pages.

Li et al., Adversarial Learning for Neural Dialogue Generation, Available Online at: https://www.aclweb.org/anthology/D17-1230.pdf, Sep. 2017, 13 pages.

Li et al., Annotating the Little Prince with Chinese AMRs, LAW-2016, Berlin, Germany, Aug. 11, 2016, 9 pages.

Li et al., Chinese Abstract Meaning Representation, Available online at: https://catalog.ldc.upenn.edu/LDC2021T13, 2019, 2 pages.

Li et al., DailyDialog: a Manually Labelled Multi-Turn Dialogue Dataset, Proceedings of the Eighth International Joint Conference on Natural Language Processing, Long Papers, vol. 1, Dec. 1, 2017, pp. 986-995.

Li et al., Deep Reinforcement Learning for Dialogue Generation, Proceedings of the 2016 Conference on Empirical Methods in Natural Language Processing, Sep. 2016, pp. 1192-1202.

Liang, Lambda Dependency-based Compositional Semantics, Technical report, arXiv., Sep. 19, 2013, 7 pages.

Lin et al., A PDTB-Styled End-to-End Discourse Parser, Natural Language Engineering, vol. 20, No. 2, Apr. 2014, pp. 151-184.

Ling et al., Program Induction by Rationale Generation: Learning to Solve and Explain Algebraic Word Problems, CoRR, abs/1705.04146, Oct. 23, 2017, 10 pages.

Lioma et al., Rhetorical Relations for Information Retrieval, SIGIR, Apr. 2012, pp. 931-940.

Lippi et al., Argument Mining from Speech: Detecting Claims in Political Debates, AAAI'16: Proceedings of the Thirtieth AAAI Conference on Artificial Intelligence, Feb. 2016, pp. 2979-2985.

Lippi et al., Argumentation Mining: State of the Art and Emerging Trends, ACM Transactions on Internet Technology, vol. 16, No. 2, Article 10, Mar. 2016, pp. 1-25.

Lippi et al., Margot: a Web Server for Argumentation Mining, Expert Systems with Applications, vol. 65, Dec. 2016, pp. 292-303.

Liu et al., How Not to Evaluate Your Dialogue System: an Empirical Study of Unsupervised Evaluation Metrics for Dialogue Response Generation, Proceedings of the Conference on Empirical Methods in Natural Language Processing, Jan. 3, 2017, 15 pages.

Liu et al., Roberta: a Robustly Optimized Bert Pretraining Approach, arXiv:1907.11692, Available Online at: https://arxiv.org/abs/1907.11692, Jul. 26, 2019, 13 pages.

Liu et al., Towards Better Analysis of Deep Convolutional Neural Networks, IEEE Transactions on Visualization and Computer Graphics, vol. 23, No. 1, May 2016, pp. 1-10.

Lo Cascio et al., Grammatica dell'Argomentare: strategie e strutture, [A grammar of Arguing: strategiesand structures] Firenze: La Nuova Italia, 1991, pp. 662-663.

Logacheva et al., ConvAI Dataset of Topic-Oriented Human-to-Chatbot Dialogues, The NIPS '17 Competition: Building Intelligent Systems, 2018, pp. 47-57.

Louis et al., Discourse Indicators for Content Selection in Summaization, SIGDIAL Conference, The Association for Computer Linguistics, Sep. 2010, pp. 147-156.

Lowe et al., On the Evaluation of Dialogue Systems with Next Utterance Classification, In Special Interest Group on Discourse and Dia-logue, Jul. 2016, pp. 264-269.

Luan et al., LSTM based Conversation Models, Department of Electrical Engineering, University of Washington, Mar. 31, 2016, 5 pages.

Lucas, Computer-Assisted Text Analysis for Comparative Politics, Political Analysis, vol. 23, No. 2, Feb. 4, 2015, pp. 254-277.

Lyons et al., Trust and Human-Machine Teaming: a Qualitative Study, Artificial Intelligence for the Internet of Everything, 2019, pp. 101-116.

Macagno, Argumentation Schemes, Cambridge University Press, 2008, pp. 517-573.

Macewan, The Essentials of Argumentation, D. C. Heath, 1898, 474 pages.

Makhalova et al., Information Retrieval Chatbots Based on Conceptual Models, In book: Graph-Based Representation and Reasoning, Jun. 2019, pp. 230-238.

Makhalova et al., Pattern Structures for News Clustering, Proceedings of the 4th International Conference on What can FCA do for Artificial Intelligence, vol. 1430, Jul. 2015, pp. 35-42.

Mann et al., Rhetorical Structure Theory: Description and Construction of Text Structures, University of Southern California, Oct. 1986, 22 pages.

Marcu, From Discourse Structures to Text Summaries, Proceedings of the ACL Workshop on Intelligent Scalable Text Summarization, 1997, pp. 82-88.

Marcu, The Theory and Practice of Discourse Parsing and Summarization, MIT Press, Nov. 2000, 248 pages.

Marir et al., Rhetorical Structure Theory for Content-Based Indexing and Retrieval of Web Documents, ITRE 2004, 2nd International Conference Information Technology: Research and Education, Jun. 2004, pp. 160-164.

Markle-Huss et al., Improving Sentiment Analysis with Document-Level Semantic Relationships from Rhetoric Discourse Structures, 50th Hawaii International Conference on System Sciences, Jan. 2017, pp. 1142-1151.

Marks et al., Want Classified Information? Talk to The Chatbot, New Scientist, vol. 223, No. 2980, Aug. 2, 2014, p. 22.

Matousek et al., Text, Speech and Dialogue, Second International Workshop, TSD'99 Plzen, Czech Republic, Sep. 13-17, 1999, 11 pages.

May et al., SemEval-2017 Task 9: Abstract Meaning Representation Parsing and Generation, Proceedings of the 11th International Workshop on Semantic Evaluation, Aug. 3-4, 2017, pp. 536-545.

Maziero et al., Revisiting Cross-Document Structure Theory for Multi-Document Discourse Parsing, Information Processing & Management, vol. 50, Issue 2, Mar. 2014, pp. 297-314.

Mcnamara et al., Are Good Texts Always Better? Interactions of Text Coherence, Background Knowledge, and Levels of Understanding in Learning from Text, Cognition and Instruction, vol. 14, No. 1, Mar. 1996, pp. 1-43.

Mercier et al., Why Do Humans Reason? Arguments for an Argumentative Theory, Behavioral and Brain Sciences, vol. 34, No. 2, Apr. 2011, pp. 57-111.

Miceli et al., Emotional and Non-Emotional Persuasion, Applied Artificial Intelligence, Jun. 2006, pp. 1-25.

Mikolov et al., Efficient Estimation of Word Representations in Vector Space, Available Online at: https://arxiv.org/pdf/1301.3781.pdf, Sep. 7, 2013, pp. 1-12.

Milenkovic et al., Uncovering Biological Network Function via Graphlet Degree Signatures, Cancer Informatics, vol. 6, Apr. 14, 2008, pp. 257-273.

Mitkov et al., A Computer-Aided Environment for Generating Multiple-Choice test items, Natural Language Engineering, vol. 12, No. 2, Jun. 2006, pp. 177-194.

(56) References Cited

OTHER PUBLICATIONS

Mittu et al., Introduction to the Symposium on AI and the Mitigation of Human Error, Association for the Advancement of Artificial Intelligence Spring Symposia, 2016, 4 pages.

Moens et al., Automatic Detection of Arguments in Legal Texts, Proceedings of the 11th International Conference on Artificial Intelligence and Law, ICAIL 2007, Jun. 4-8, 2007, pp. 225-230.

Molnar, Interpretable Machine Learning. A Guide for Making Black Box Models Explainable, Available online at: https://christophm.github.io/interpretable-ml-book/, Aug. 14, 2018, 185 pages.

Morato et al., Experiments in Discourse Analysis Impact on Information Classification and Retrieval Algorithms, Inf. Process. Manage. vol. 39, 2003, pp. 825-851.

Moschitti, Efficient Convolution Kernels for Dependency and Constituent Syntactic Trees, Proceedings of the 17th European Conference on Machine Learning, Sep. 18-22, 2006, pp. 318-329.

Moskowitz et al., Human Caused Bifurcations in a Hybrid Team—A Position Paper, Association for the Advancement of Artificial Intelligence Spring Symposia, 2016, 4 pages.

Mukherjee et al., Fake Review Detection: Classification and Analysis of Real and Pseudo Reviews, Technical Report, Department of Computer Science, 2013, 11 pages.

Mukherjee et al., What Yelp Fake Review Filter Might Be Doing?, Proceedings of the Seventh International Association for the Advancement of Artificial Intelligence Conference on Weblogs and Social Media, Jan. 2013, pp. 409-418.

Murphy et al., What Makes a Text Persuasive? Comparing Students' and Experts' Conceptions of Persuasiveness, International Journal of Educational Research, vol. 35, pp. 675-698, 2001.

Nakamura et al., Another Diversity-Promoting Objective Function for Neural Dialogue Generation, Association for the Advancement of Artificial Intelligence, Nov. 21, 2018, 8 pages.

Narasimhan, Nvidia Clocks Worlds Fastest Bert Training Time and Largest Transformer Based Model, Paving Path for Advanced Conversational AI, nVIDIA Developer Blog, Available Online at: https://developer.nvidia.com/blog/training-bert-with-gpus/, Aug. 13, 2019, 5 pages.

Narducci et al., Improving the User Experience with a Conversational Recommender System, International Conference of the Italian Association for Artificial Intelligence, 2018, pp. 528-538.

Nguyen et al., A Neural Local Coherence Model, Proceedings of the 55th Annual Meeting of the Association for Computational Linguistics, vol. 1, Jul. 2017, pp. 1320-1330.

Novikova et al., Why We Need New Evaluation Metrics for NLG, Proceedings of the 2017 Conference on Empirical Methods in Natural Language Processing, Sep. 7-11, 2017, pp. 2241-2252.

Oatley et al., Understanding Emotions, Wiley & Co., Feb. 1996.

Oppong, What Was I Thinking? (The Science of Systematic Irrationality), Available Online at: https://medium.com/kaizen-habits/what-was-i-thinking-the-science-of-systematic-irrationality-e053e5476fcf, Oct. 25, 2018, 6 pages.

Oraby et al., And That's a Fact: Distinguishing Factual and Emotional Argumentation in Online Dialogue, Proceedings of the 2nd Workshop on Argumentation Mining, Jun. 4, 2015, pp. 116-126.

O'Reilly et al., Reversing the Reverse Cohesion Effect: Good Texts Can Be Better for Strategic, High-Knowledge Readers, Discourse Processes, vol. 43, No. 2, Dec. 2007, pp. 121-152.

Ospina et al., Eliciting the Patient's Agenda—Secondary Analysis of Recorded Clinical Encounters, Journal of General Internal Medicine, vol. 34, No. 1, 2018, pp. 36-40.

Ouyang et al., Improving Recommendation by Deep Latent Factor-Based Explanation, Associated for the Advancement of Artificial Intelligence, 2020, 9 pages.

Palmer, SemLink: Linking PropBank, VerbNet and FrameNet, Proceedings of the Generative Lexicon Conference, GL 2009, Sep. 17, 2009, 54 pages.

Papineni et al., Bleu: A Method for Automatic Evaluation of Machine Translation, Proceedings of the 40th Annual Meeting on Association for Computational Linguistics, Jul. 2002, pp. 311-318.

Park et al., Multimodal Explanations: Justifying Decisions and Pointing to the Evidence, CoRR, abs/1802.08129, Feb. 15, 2018, 11 pages.

International Application No. PCT/US2018/031890, International Search Report and Written Opinion mailed on Aug. 17, 2018, 12 pages.

International Application No. PCT/US2018/053376, International Preliminary Report on Patentability mailed on Apr. 9, 2020, 12 pages.

International Application No. PCT/US2018/053376, International Search Report and Written Opinion mailed on Feb. 11, 2019, 18 pages.

International Application No. PCT/US2018/053376, Invitation to Pay Add'l Fees and Partial Search Report mailed on Dec. 21, 2018, 11 pages.

International Application No. PCT/US2018/053392, International Search Report and Written Opinion mailed on Dec. 17, 2018, 11 pages.

Pelsmaekers et al., Rhetorical Relations and Subordination in L2 Writing, Linguistic Choice Across Genres: Variation in Spoken and Written English, Jul. 15, 1998, pp. 191-213.

Pennington et al., GloVe: Global Vectors for Word Representation, Proceedings of the 2014 Conference on Empirical Methods in Natural Language Processing (EMNLP), Oct. 25-29, 2014, pp. 1532-1543.

Persing et al., Modeling Argument Strength in Student Essays, Proceedings of the 53rd Annual Meeting of the Association for Computational Linguistics and the 7th International Joint Conference on Natural Language Processing, Jul. 26-31, 2015, pp. 543-552.

Peter et al., The Peter Principle: Why Things Always Go Wrong, William Morrow and Company, 1968.

Peters et al., Deep Contextualized Word Representations, Allen Institute for Artificial Intelligence, Paul G. Allen School of Computer Science & Engineering, University of Washington, Mar. 22, 2018, 15 pages.

Peters et al., Deep Contextualized Word Representations, Proceedings of the 2018 Conference of the North American Chapter of the Association for Computational Linguistics: Human Language Technologies, vol. 1, Jun. 1-6, 2018, pp. 2227-2237.

Pisarevskaya et al., An Anatomy of a Lie: Discourse Patterns in Customer Complaints Deception Dataset, In Companion Proceedings of The 2019 World Wide Web Conference, 2019, pp. 373-380.

Piwek et al., T2D: Generating Dialogues Between Virtual Agents Automatically from Text, Intelligent Virtual Agents, 2007, pp. 161-174.

Plotkin, A Note on Inductive Generalization, Machine Intelligence 5, Chapter 8, 1970, pp. 153-163.

Poesio et al., Centering: A Parametric Theory and Its Instantiations, Computational Linguistics, vol. 30, No. 3, Sep. 2004, pp. 309-363.

Polleti et al., Explanations Within Conversational Recommendation Systems: Improving Coverage Through Knowledge Graph Embeddings, Association for the Advancement of Artificial Intelligence (www.aaai.org), 2020, 8 pages.

Prasad et al., The Penn Discourse TreeBank 2.0, Proceedings of the Sixth International Conference on Language Resources and Evaluation, 2008, 8 pages.

Radev, A Common Theory of Information Fusion from Multiple Text Sources Step One: Cross-document Structure, Proceedings of the 1st SIGDial Workshop on Discourse and Dialogue, vol. 10, Oct. 7-8, 2000, pp. 74-83.

Rajpurkar et al., Know What You Don't Know: Unanswerable Questions for SQuAD, arXiv:1806.03822, Available Online at: https://arxiv.org/pdf/1806.03822.pdf, Jun. 11, 2018, 9 pages.

Rajpurkar et al., SQuAD: 100,000+ Questions for Machine Comprehension of Text, Proceedings of the Conference on Empirical Methods in Natural Language Processing, Available online at: https://doi.org/10.18653/v1/D16-1264, Oct. 11, 2016, pp. 2383-2392.

Rayana et al., Collective Opinion Spam Detection: Bridging Review Networks and Metadata, Proceedings of the 21st Association for Computing Machinery Special Interest Group on Knowledge Dis-

(56) References Cited

OTHER PUBLICATIONS covery and Data Mining International Conference on Knowledge Discovery and Data Mining, Aug. 11-14, 2015, 10 pages.
Redeker, Coherence and Structure in Text and Discourse, In: William Black & Harry Bunt (eds.), Abduction, Belief and Context in Dialogue. Studies in Computational Pragmatics, Jan. 2000, pp. 1-28.
Ribeiro et al., Why Should I Trust You? Explaining the Predictions of Any Classifier, KDD '16: Proceedings of the 22nd ACM SIGKDD International Conference on Knowledge Discovery and Data Mining, Available Online at: https://dl.acm.org/doi/10.1145/2939672.2939778, Aug. 2016, pp. 1135-1144.
Ritter et al., Data-Driven Response Generation in Social Media, Proceedings of the 2011 Conference on Empirical Methods in Natural Language Processing, Jul. 27-31, 2011, pp. 583-593.
Robinson, A Machine-Oriented Logic Based on the Resolution Principle, Journal of the Association for Computing Machinery, vol. 12, No. 1, Jan. 1965, pp. 23-41.
Rose et al., Discourse Processing of Dialogues with Multiple Threads, In Proceedings of the 33rd Annual Meeting of the Association for Computational Linguistics, Jun. 26-30, 1995, pp. 31-38.
Ruder, An Overview of Gradient Descent Optimization Algorithms, Available Online at: https://arxiv.org/pdf/1609.04747.pdf, Jun. 15, 2017, 14 pages.
Ruppenhofer et al., FrameNet II: Extended Theory and Practice, Available Online at: https://framenet.icsi.berkeley.edu/fndrupal/the_book., 2016, 129 pages.
Sadek et al., A Discourse-Based Approach for Arabic Question Answering, ACM Transactions on Asian and Low-Resource Language Information Processing, vol. 16, No. 2, Article 11, Nov. 2016, pp. 1-18.
Sadek et al., Arabic Rhetorical Relations Extraction for Answering Why and How to Questions, NLDB'12: Proceedings of the 17th international conference on Applications of Natural Language Processing and Information Systems, Jun. 2012, pp. 385-390.
Sakai, Alternatives to Bpref, Proceedings of the 30th Annual International ACM SIGIR Conference on Research and Development in Information Retrieval, Jul. 2007, pp. 71-78.
Salton et al., On the Specification of Term Values in Automatic Indexing, Journal of Documentation, vol. 29, No. 4, 1973, 35 pages.
Sardianos et al., Argument Extraction from News, Proceedings of the 2nd Workshop on Argumentation Mining, Jun. 4, 2015, pp. 56-66.
Scheffler et al., Mapping PDTB-Style Connective Annotation to RST-Style Discourse Annotation, Proceedings of the 13th Conference on Natural Language Processing, 2016, pp. 242-247.
Schlosser, Can Including Pros and Cons Increase the Helpfulness and Persuasiveness of Online Reviews? The Interactive Effects of Ratings and Arguments, Journal of Consumer Psychology, vol. 21, No. 3, Jul. 2011, pp. 226-239.
Schnabel et al., Evaluation Methods for Unsupervised Word Embeddings, Proceedings of the 2015 Conference on Empirical Methods in Natural Language Processing, Available Online at: https://www.aclweb.org/anthology/D15-1036.pdf, Sep. 17-21, 2015, pp. 298-307.
Schnedecker, Les Chaines De Reference Dans Les Portraits Journalistiques : Elements De Description, Travaux de Linguistique, Jan. 2005, pp. 85-133.
Schnedecker, Nom Propre Et Chaines De Reference, Recherches Linguistiques, 1997, 231 pages.
Scholman et al., Examples and Specifications That Prove a Point: Identifying Elaborative and Argumentative Discourse Relations, Dialogue & Discourse, vol. 8, No. 2, Jul. 2017, pp. 56-83.
Schulz et al., A Frame Tracking Model for Memory-Enhanced Dialogue Systems, Available Online at: https://arxiv.org/pdf/1706.01690.pdf, Jun. 6, 2017, 9 pages.
Selivanov, GloVe Word Embeddings, Available Online at: https://cran.rproject.org/web/packages/text2vec/vignettes/glove.html, Feb. 18, 2020, 4 pages.

Seo et al., Online Community Search Using Thread Structure, CIKM '09 Proceedings of the 18th ACM conference on Information and knowledge Management, 2009, 4 pages.
Seo et al., Online Community Search Using Thread Structure, In Proceedings of the 18th ACM Conference on Information and Knowledge Management, Nov. 2009, 4 pages.
Serasset et al., Association for Computational Linguistics, Stroudsburg, pp. 7-14.
Serban et al., A Hierarchical Latent Variable Encoder-Decoder Model for Generating Dialogues, Proceedings of the Thirty-First Association for the Advancement of Artificial Intelligence Conference on Artificial Intelligence, Jun. 14, 2016, 15 pages.
Serban et al., A Survey of Available Corpora for Building Data-Driven Dialogue Systems, Available online at: https://arxiv.org/pdf/1512.05742.pdf, Mar. 21, 2017, 56 pages.
Serban et al., Building End-To-End Dialogue Systems Using Generative Hierarchical Neural Network Models, Proceedings of the Thirtieth Association for the Advancement of Artificial Intelligence Conference on Artificial Intelligence, Apr. 6, 2016, 8 pages.
Serban et al., Generating Factoid Questions with Recurrent Neural Networks: The 30M Factoid Question-Answer Corpus, Proceedings of the 54th Annual Meeting of the Association for Computational Linguistics, vol. 1, May 29, 2016, 13 pages.
Severyn et al., Fast Support Vector Machines for Convolution Tree Kernels, Data Mining Knowledge Discovery, vol. 25, No. 2, Sep. 2012, 33 pages.
Shaw, 3 Reasons Why People Say One Thing and Do Another, Available online at: https://beyondphilosophy.com/3-reasons-why-people-say-one-thing-and-do-another/, May 22, 2015, 7 pages.
Shuldiner, Raising Them Right: AI and the Internet of Big Things, Chapter 8, Artificial Intelligence for the Internet of Everything, 2019, pp. 139-143.
Sidorov et al., Syntactic N-Grams as Machine Learning Features for Natural Language Processing, Expert Systems with Applications, vol. 41, Issue 3, Feb. 15, 2014, pp. 853-860.
Sjoera, The Linguistics Behind Chat Bots, iCapps, Available Online at: http://www.icapps.com/the-linguistics-behind-chatbots/, Feb. 22, 2017, 9 pages.
Socher et al., Recursive Deep Models for Semantic Compositionality Over a Sentiment Treebank, Proceedings of the 2013 Conference on Empirical Methods in Natural Language Processing, Oct. 2013, pp. 1631-1642.
Somasundaran et al., Supervised and Unsupervised Methods in Employing Discourse Relations for Improving Opinion Polarity Classification, Proceedings of the 2009 Conference on Empirical Methods in Natural Language Processing, In EMNLP, ACL, Aug. 2009, pp. 170-179.
Soricut et al., Sentence Level Discourse Parsing using Syntactic and Lexical Information, Proceedings of HLT-NAACL, Available Online at: https://www.aclweb.org/anthology/J02-4002, May-Jun. 2003, pp. 149-156.
Stab et al., Identifying Argumentative Discourse Structures in Persuasive Essays, Proceedings of the 2014 Conference on Empirical Methods in Natural Language Processing (EMNLP), Oct. 2014, pp. 46-56.
Stab et al., Recognizing Insufficiently Supported Arguments in Argumentative Essays, Proceedings of the 15th Conference of the European Chapter of the Association for Computational Linguistics (EACL 2017), vol. 1, Apr. 3-7, 2017, pp. 980-990.
Stab et al., Recognizing the Absence of Opposing Arguments in Persuasive Essays, Proceedings of the 3rd Workshop on Argument Mining, Aug. 7-12, 2016, pp. 113-118.
Suchanek et al., A Core of Semantic Knowledge, In Proceedings of the 16th international conference on World Wide Web, May 8-12, 2007, pp. 697-706.
Sun et al., Conversational Recommender System, Available Online at https://arxiv.org/pdf/1806.03277.pdf, Jun. 8, 2018, 10 pages.
Sun et al., Discourse Processing for Context Question Answering Based on Linguistic Knowledge, Knowledge-Based System, vol. 20, Aug. 2007, pp. 1-23.
Sun et al., Exploiting Product Related Review Features for Fake Review Detection, Mathematical Problems in Engineering, vol. 2016, Article ID 4935792, Jul. 4, 2016, 8 pages.

(56) References Cited

OTHER PUBLICATIONS

Suwandaratna et al., Discourse Marker based Topic Identification and Search Results Refining, 5th International Conference on In Information and Automation for Sustainability (ICIAFs), 2010, pp. 119-125.

Suwandaratna et al., Discourse Marker Based Topic Identification and Search Results Refining, In Information and Automation for Sustainability (ICIAFs), 5th International Conference, 2010, pp. 119-125.

Taboada et al., Rhetorical Structure Theory: Looking Back and Moving Ahead, Discourse Studies, vol. 8, No. 3, Jan. 24, 2006, pp. 423-459.

Taboada, The Genre Structure of Bulletin Board Messages, Text Technology, vol. 13, No. 2, Nov. 2, 2004, pp. 55-82.

Teufel et al., Summarizing Scientific Articles: Experiments with Relevance and Rhetorical Status, Computational Linguistics, vol. 28, No. 4, Dec. 2002, pp. 409-445.

Theranos, Wall Street Journal: Letter to the Editor, Theranos Works to Realize Access to Preventive Care, Available Online at: https://theranos.com/news/posts/wall-street-journal-letter-to-the-editor, Dec. 22, 2015, 4 pages.

Thompson et al., A Personalized System for Conversational Recommendations, Journal of Artificial Intelligence Research, vol. 21, No. 1, Mar. 2004, pp. 393-428.

Todirascu et al., Coherence and Cohesion for the Assessment of Text Readability, Proceedings of NLPCS 2013, Oct. 2013, pp. 11-19.

Torrance et al., Rhetorical Structure Analysis as a Method for Understanding Writing Processes, Presented at the Multidisciplinary Approaches to Discourse (MAD) Workshop, Information Technology Research Institute Technical Report Series, Aug. 2001, 9 pages.

Toulmin, The Uses of Argument, Cambridge At the University Press, 1958, 259 pages.

Traum, Rhetorical Relations, Action and Intentionality in Conversation, Proceedings ACL SIG Workshop on Intentionality and Structure in Discourse Relations, Jun. 1993, pp. 132-135.

Trstenjak et al., KNN with TF-IDF Based Framework for Text Categorization, Procedia Engineering, vol. 69, 24th Danube Adria Association for Automation and Manufacturing International Symposium on Intelligent Manufacturing and Automation, 2014, pp. 1356-1364.

Tseng et al., Tree-Structured Semantic Encoder with Knowledge Sharing for Domain Adaptation in Natural Language Generation, Available Online at: https://arxiv.org/pdf/1910.06719.pdf, Oct. 2, 2019, 10 pages.

Turek, Explainable Artificial Intelligence (XAI), Available Online at: https://www.darpa.mil/program/explainable-artificial-intelligence, Accessed from Internet on Aug. 27, 2019, pp. 1-10.

Turner, A Model Explanation System: Latest Updates and Extensions, ICML Workshop on Human Interpretability in Machine Learning, Available Online at: https://arxiv.org/pdf/1606.09517v1.pdf, Jun. 30, 2016, pp. 1-5.

Van Der Wees et al., Five Shades of Noise: Analyzing Machine Translation Errors in User-Generated Text, Proceedings of the ACL 2015 Workshop on Noisy User-generated Text, Jul. 31, 2015, pp. 28-37.

Van Dijk, Explorations in the Semantics and Pragmatics of Discourse, Text and Context, Longman Linguistics Library, 1977, 274 pages.

Van Eemeren et al., Fundamentals of Argumentation Theory: A Handbook of Historical Backgrounds and Contemporary Developments, Routledge, Taylor & Francis Group, Mar. 1, 1996, 440 pages.

Venkatesh et al., On Evaluating and Comparing Conversational Agents, 31st Conference on Neural Information Processing Systems, Jan. 2018, 10 pages.

Verberne et al., Discourse-Based Answering of Why-Questions, TAL Traitement Automatique des Langues, vol. 47, Sep. 2007, pp. 21-41.

Virtanen, Analysing Argumentative Strategies: A Reply to a Complaint, Anglicana Turkuensia, vol. 14, 1995, pp. 539-547.

Vorontsov et al., Additive Regularization of Topic Models, Machine Learning, vol. 101, 2015, 21 pages.

Walia et al., Semantic Features for Automated Answer Scoring, International Journal if Advance Research in Science and Engineering, vol. 6, No. 10, Oct. 2017, 6 pages.

Walton et al., Argumentation Schemes, Cambridge University Press, Aug. 2008, 456 pages.

Walton, Argumentation Schemes for Presumptive Reasoning, Lawrence Erlbaum Associates, Publishers, 1996, 39 pages.

Walton, Dialogical Models of Explanation, Explanation-Aware Computing: Papers from the Association for the Advancement of Artificial Intelligence Workshop, Technical Report WS-07-06, Association for the Advancement of Artificial Intelligence Workshop Press, Jan. 2007, 9 pages.

Wang et al., A Joint Model for Question Answering and Question Generation, Learning to Generate Natural Language Workshop, ICML, Jun. 5, 2017, 7 pages.

Wang et al., A Simple and Generic Belief Tracking Mechanism for the Dialog State Tracking Challenge: On the Believability of Observed Information, Proceedings of the SIGDIAL 2013 Conference, Aug. 2013, pp. 423-432.

Wang et al., An Information Retrieval Approach Based on Discourse Type, Proceedings of the 11th International Conference on Applications of Natural Language to Information Systems, 2006, pp. 197-202.

Wang et al., Predicting Thread Discourse Structure Over Technical Web Forums, Proceedings of the 2011 Conference on Empirical Methods in Natural Language Processing, Jul. 2011, pp. 13-25.

Wang et al., Using Learning Analytics to Understand the Design of an Intelligent Language Tutor-Chatbot Lucy, International Journal of Advanced Computer Science and Applications, vol. 4, No. 11, Nov. 2013, pp. 124-131.

Webber et al., Discourse Structure and Language Technology, Natural Language Engineering, vol. 18, No. 4, Oct. 2012, pp. 437-490.

Wilks, Machine Conversations, The Springer International Series in Engineering and Computer Science, vol. 511, 1999, 38 pages.

Wolf et al., Representing Discourse Coherence: A Corpus-Based Study, Computational Linguistics, vol. 31, No. 2, Jun. 2005, pp. 134-140.

Yang et al., Reflections on Rational Choice-The Existence of Systematic Irrationality, The Journal of Socio-Economics. vol. 37, No. 3, Jun. 2008, pp. 1218-1233.

Yao et al., Information Extraction over Structured data: Question Answering with Freebase, In Proceedings of the 52nd ACL, Jun. 23-25, 2014, pp. 956-966.

Yao et al., Online Deception Detection Refueled by Real World Data Collection, Proceedings of Recent Advances in Natural Language Processing, Jul. 28, 2017, 10 pages.

Yih et al., Semantic Parsing via Staged Query Graph Generation: Question Answering with Knowledge Base, Microsoft Research, Proceedings of the 53rd Annual Meeting of the Association for Computational Linguistics and the 7th International Joint Conference on Natural Language Processing, vol. 1, Jul. 26-31, 2015, pp. 1321-1331.

Young et al., POMDP-Based Statistical Spoken Dialogue Systems: A Review, Proceedings of the IEEE, vol. 101, No. 5, May 2013, pp. 1160-1179.

Yu et al., Detecting User Engagement in Everyday Conversations, Available online at: https://arxiv.org/pdf/cs/0410027.pdf, Oct. 13, 2004, 4 pages.

Yuan et al., Machine Comprehension by Text-to-Text Neural Question Generation, Proceedings of the 2nd Workshop on Representation Learning for Natural Language Processing, Aug. 3, 2017, pp. 15-25.

Zhao et al., Application-Driven Statistical Paraphrase Generation, Proceedings of the 47th Annual Meeting of the ACL and the 4th IJCNLP of the AFNLP, Aug. 2-7, 2009, pp. 834-842.

Zhao et al., Joint Syntacto-Discourse Parsing and the Syntacto-Discourse Treebank, Oregon State University, Available online at: https://arxiv.org/pdf/1708.08484.pdf, Aug. 28, 2017, pp. 2117-2123.

(56) References Cited

OTHER PUBLICATIONS

Zhu et al., Explainable AI for Designers: A Human-Centered Perspective on Mixed-Initiative Co-Creation, IEEE Conference on Computational Intelligence and Games (CIG), 2018, 8 pages.
U.S. Appl. No. 17/235,329, Notice of Allowance mailed on Aug. 9, 2023, 5 pages.
U.S. Appl. No. 17/235,329, Supplemental Notice of Allowability mailed on Aug. 30, 2023, 2 pages.
U.S. Appl. No. 17/652,366, Notice of Allowance mailed on Aug. 9, 2023, 5 pages.
U.S. Appl. No. 17/690,897, Corrected Notice of Allowability mailed on Aug. 4, 2023, 4 pages.
U.S. Appl. No. 17/690,897, Supplemental Notice of Allowance mailed on Sep. 8, 2023, 4 pages.
U.S. Appl. No. 18/151,164, Non-Final Office Action mailed on Oct. 26, 2023, 23 pages.
2009 Annual Study: Global Cost of a Data Breach, Ponemon Institute, LLC, PGP, Apr. 2010, 36 pages.
Data Loss Prevention, Trend Micro, Available online at http://www.trendmicro.co.in/cloud-content/us/pdfs/business/datasheets/ds_data-loss-prevention.pdf, 2010, 2 pages.
Data Loss Prevention Products & Services, Symantec, Available online at https:/www.symantec.com/products/data-loss-prevention. Retrieved Aug. 30, 2018.
Global Security Report 2010, Trustwave, Available online at https://www.trustwave.com/Resources/Library/Documents/2010-Trustwave-Global-Security-Report/, 2010, 49 pages.
Malaysia Airlines Flight 17, Wikipedia, 2016, 38 pages.
Shadow Chairman of Investigative Committee, CrimeRussia, Available online at https://crimerussia.com/corruption/tenevoy-direktor-skr/, Aug. 2016, 5 pages.
Airenti et al., Conversational and Behavior Games in the Pragmatics of Discourse, Cognitive Science, vol. 17, Issue 2, Apr.-Jun. 1993, pp. 197-256.
Allen et al., Analyzing Intention in Utterances, Artificial Intelligence, vol. 15, No. 3, Dec. 1980, pp. 143-178.
Bengio et al., A Neural Probabilistic Language Model, Journal of Machine Learning Research, vol. 3, Feb. 3, 2003, pp. 1137-1155.
Blaylock, Managing Communicative Intentions in Dialogue Using a Collaborative Problem-Solving Model, The University of Rochester, Computer Science Department, Apr. 2002, 56 pages.
Blaylock et al., Managing Communicative Intentions with Collaborative Problem Solving, In Current and New Directions in Discourse and Dialogue, 2003, pp. 63-84.
Boni, Using Logical Relevance for Question Answering, Journal of Applied Logic, vol. 5, No. 1, Mar. 2007, pp. 92-103.
Boyer et al., MJRTY—A Fast Majority Vote Algorithm, Automated Reasoning, 1991, pp. 105-117.
Carlson et al., Discourse Tagging Reference Manual, Available Online at https://www.isi.edu/~marcu/discourse/tagging-ref-manual.pdf, Sep. 2001, 87 pages.
Cohen, Enron Email Dataset, Available online at: https://www.cs.cmu.edu/~enron/, Jul. 10, 2016, 1 page.
Cohen et al., Intention is Choice with Commitment, Artificial Intelligence, 1990, pp. 213-261.
Cristea et al., Veins Theory: A model of Global Discourse Cohesion and Coherence, In C. Boitet & P. Whitelock (Eds.), 17th International Conference on Computational linguistics, 1998, pp. 281-285.
Croft et al., Search Engines—Information Retrieval in Practice, Pearson Education, 2009, 542 pages.
Endres-Niggemeyer et al., Summarizing Text for Intelligent Communication, Dagstuhl Seminar Report 79, 30.12-17.12.93 (9350), 1995, 36 pages.
Dijkstra, Programming Considered as a Human Activity, Proc. IFIP Congress, 1965, 7 pages.
Feng et al., A Linear-Time Bottom-Up Discourse Parser with Constraints and Post-Editing, In Proceedings of the 52nd Annual Meeting of the Association for Computational Linguistics, Jun. 23-25, 2014, pp. 511-521.
Feng, RST-Style Discourse Parsing and Its Applications in Discourse Analysis, University of Toronto, 2015, 189 pages.
Ferraiolo et al., Role-Based Access Controls, Proceedings of the 15th NIST-NSA National Computer Security Conference, Oct. 13-16, 1992, 11 pages.
Galitsky et al., Improving Text Retrieval Efficiency with Pattern Structures on Parse Thickets, Formal Concept Analysis Meets Information Retrieval, ECIR, 2013, 16 pages.
Galitsky et al., Improving Trust in Automation of Social Promotion, Association for the Advancement of Artificial Intelligence, 2014, pp. 28-35.
Galitsky et al., Inferring the Semantic Properties of Sentences by Mining Syntactic Parse Trees, Data & Knowledge Engineering, vols. 81-82, Nov.-Dec. 2012, 44 pages.
Galitsky et al., Learning Communicative Actions of Conflicting Human Agents, Journal of Experimental & Theoretical Artificial Intelligence, vol. 20, No. 4, Dec. 2008, pp. 277-317.
Galitsky, Learning Parse Structure of Paragraphs and Its Applications in Search, Engineering Applications of Artificial Intelligence, vol. 32, Jun. 2014, pp. 160-184.
Galitsky, Machine Learning of Syntactic Parse Trees for Search and Classification of Text, Engineering Applications of Artificial Intelligence, vol. 26, Issue 3, Mar. 2013, pp. 1072-1091.
Galitsky, Natural Language Question Answering System: Technique of Semantic Headers, Advanced Knowledge International, vol. 2, 2003.
Galitsky et al., Parse Thicket Representations for Answering Multi-Sentence Questions, International Conference on Conceptual Structures, 2013, pp. 153-172.
Galitsky et al., Rhetoric Map of an Answer to Compound Queries, In Proceedings of the 53rd Annual Meeting of the 20 Association for Computational Linguistics and the 7'h International Joint Conference of Natural Language Processing, Jul. 26-31, 2015, pp. 681-686.
Galitsky et al., Text Classification into Abstract Classes Based on Discourse Structure, Proceedings of Recent Advances in Natural Language Processing, Sep. 7-9, 2015, pp. 200-207.
Galitsky et al., Text Integrity Assessment: Sentiment Profile vs Rhetoric Structure, CICLing-2015, Springer international Publishing, 2015, pp. 126-139.
Galitsky, Using Extended Tree Kernels to Recognize Metalanguage in Text, Studies in Computational Intelligence, Feb. 2017, 26 pages.
Grefenstette et al., Multi-Step Regression Learning for Compositional Distributional Semantics, In Proceedings of the 26 Tenth International Conference on Computational Semantics. Association for Computational Linguistics, Mar. 2013, 11 pages.
Grefenstette, Towards a Formal Distributional Semantics: Simulating Logical Calculi with Tensors, University of Oxford, Apr. 2013, 10 pages.
Grosz et al., Attention, Intentions, and the Structure of Discourse, Computational Linguistics, vol. 12, No. 3, Jul.-Sep. 1986, pp. 175-204.
Grosz et al., Discourse Analysis, in Understanding Spoken Language, Elsevier North-Holland, 1978, pp. 234-268.
Hart et al., Text Classification for Data Loss Prevention, Hewlett-Packard Development Company, L.P., 2011, 21 pages.
Haussler, Convolution Kernels on Discrete Structures, UCSB Technical Report, Jul. 8, 1999, 38 pages.
Hernault et al., A Sequential Model for Discourse Segmentation, Computational Linguistics and Intelligent Text Processing, 2010, pp. 315-326.
Houngbo et al., An Automated Method to Build A Corpus of Rhetorically-Classified Sentences in Biomedical Texts, Proceedings of the First Workshop on Argumentation Mining, Association for Computational Linguistics, Jun. 26, 2014, pp. 19-23.
Iruskieta et al., A Qualitative Comparison Method for Rhetorical Structures: Identifying Different Discourse Structures in Multilingual Corpora, Lang Resources & Evaluation, vol. 49, Issue 2, May 8, 2014, 47 pages.
Jansen et al., Discourse Complements Lexical Semantics for Nonfactoid Answer Reranking, In Proceedings of the 52nd Annual Meeting of the Association for Computational Linguistics, Jun. 23-25, 2014, pp. 977-986.

(56) References Cited

OTHER PUBLICATIONS

John et al., Estimating Continuous Distributions in Bayesian Classifiers, Proceedings of the Eleventh Conference on Uncertainty in Artificial Intelligence, 1995, pp. 338-345.
Joty et al., A Novel Discriminative Framework for Sentence-Level Discourse Analysis, EMNLP-CoNLL'12 Proceedings of the 2012 Joint Conference on Empirical Methods in Natural Language Processing and Computational Natural Language Learning, 2012, pp. 904-915.
Joty et al., Codra: A Novel Discriminative Framework for Rhetorical Analysis, Computational Linguistics, vol. 41, No. 3, Mar. 18, 2015, pp. 385-435.
Joty et al., Combining Intra- and Multi-Sentential Rhetorical Parsing for Document-level Discourse Analysis, 51st Annual Meeting of the Association for Computational Linguistics, Aug. 4-9, 2013, pp. 486-496.
Joty et al., Discriminative Reranking of Discourse Parses Using Tree Kernels, Proceedings of the 2014 Conference on Empirical Methods in Natural Language Processing, Oct. 25-29, 2014, pp. 2049-2060.
Jurafsky et al., Speech and Language Processing: An Introduction to Natural Language Processing, Computational Linguistics, and Speech Recognition, Upper Saddle River, NJ: Prentice Hall, 2000, pp. 719-761.
Kate et al., Learning to Transform Natural to Formal Languages, In Proceedings of the Twentieth National Conference on Artificial Intelligence, Jul. 2005, pp. 1062-1068.
Kipper et al., A Large-scale Classification of English Verbs, Kluwer Academic Publishers, Springer Netherland, Dec. 2006, 18 pages.
Kipper et al., Verbnet Overview, Extensions, Mappings and Applications, Proceedings on NAACL HLT 2009: Tutorials, Association for Computational Linguistics, 2009, pp. 13-14.
Kirschner et al., Linking the Thoughts: Analysis of Argumentation Structures in Scientific Publications, Proceedings of the 2nd Workshop on Argumentation Mining, Jun. 4, 2015, pp. 1-11.
Kohavi, A Study of Cross-Validation and Bootstrap for Accuracy Estimation and Model Selection, International Joint Conference on Artificial Intelligence, Aug. 1995, pp. 1137-1143.
Kong et al., Improve Tree Kernel-Based Event Pronoun Resolution with Competitive Information, Proceedings of the Twenty-Second International Joint Conference on Artificial Intelligence, vol. 3, 2011, pp. 1814-1819.
Kontos et al., Question Answering and Rhetoric Analysis of Biomedical Texts in the Aroma System, National and 42 Kapodistrian University of Athens, Unpublished Manuscript, 2006, 6 pages.
Levinson, Presumptive Meanings: The Theory of Generalized Conversational Implicature, Cambridge, MA: The MIT Press, 2000, 11 pages.
Li et al., Recursive Deep Models for Discourse Parsing, Computer Science Department, 2014, 10 pages.
Lin et al., Recognizing Implicit Discourse Relations in the Penn Discourse Treebank, Proceedings of the 2009 Conference on Empirical Methods in Natural Language Processing, vol. 1, Aug. 6-7, 2009, pp. 343-351.
Litman et al., A Plan Recognition Model for Subdialogues in Conversations, Cognitive Science, 1987, pp. 163-200.
Mann et al., Discourse Structures for Text Generation, ACL '84 Proceedings of the 10th International Conference on Computational Linguistics and 22nd annual meeting on Association for Computational Linguistics, 1984, pp. 367-375.
Mann et al., Rhetorical Structure Theory and Text Analysis, University of Southern California, Nov. 1989, 66 pages.
Mann et al., Rhetorical Structure Theory: Towards a Functional Theory of Text Organization, Text-Interdisciplinary Journal for the Study of Discourse, vol. 8, Issue 3, Jan. 1988, pp. 243-281.
Mikolov et al., Distributed Representations of Words Phrases and their Compositionality, In Advances on Neural Information Processing Systems, Oct. 2013, 9 pages.
Mitchell et al., Composition in Distributional Models of Semantics, Cognitive Science, vol. 34, Issue 8, 2010, pp. 1388-1429.
Mitocariu et al., Comparing Discourse Tree Structures, Computational Linguistics and Intelligent Text Processing: 14th International Conference, vol. 7816, Mar. 24-30, 2013, 11 pages.
Mochales et al., Argumentation Mining, Artificial Intelligence and Law, vol. 19, Issue 1, Mar. 2011, pp. 1-22.
Ott et al., Finding Deceptive Opinion Spam by Any Stretch of the Imagination, In Proceedings of the 49th Annual Meeting of the Association for Computational Linguistics, vol. 1, Jun. 19-24, 2011, pp. 309-319.
Ott et al., Negative Deceptive Opinion Spam, In Proceedings of the 2013 Conference of the North American Chapter of the Association for Computational Linguistics, Jun. 9-14, 2013, pp. 497-501.
Peldszus et al., From Argument Diagrams to Argumentation Mining in Texts: A Survey, International Journal of Cognitive Informatics and Natural Intelligence, vol. 7, Issue 1, Jan. 2013, pp. 1-31.
Pendyala et al., Towards a Truthful World Wide Web from a Humanitarian Perspective, IEEE 2015 Global Humanitarian Technology Conference, Oct. 8-11, 2015, 7 pages.
Popescu et al., Logic-Based Rhetorical Structuring for Natural Language Generation in Human-Computer Dialogue, TSD 2007, LNAI 4629, 2007, pp. 309-317.
Popescu-Belis, Dialogue Acts: One or More Dimensions?, Tech Report ISSCO Working Paper No. 62, University of Geneva, 2005, 46 pages.
Radev et al., Centroid-Based Summarization of Multiple Documents: Sentence Extraction, Utility-Based Evaluation, 60 and User Studies, In Proceedings of the 2000 NAACL-ANLP Workshop on Automatic summarization—vol. 4, 2000, 8 pages.
Recasens et al., The Life and Death of Discourse Entities: Identifying Singleton Mentions, In Proceedings of NAACL-HLT, Jun. 2013, pp. 627-633.
Reed et al., Language Resources for Studying Argument, Proceedings of the 6th Conference on Language Resources and Evaluation, LREC2008, ELRA, 2010, pp. 2613-2618.
Reichman, Getting Computers to Talk Like You and Me, Discourse Context, Focus and Semantics (an ATN model) Cambridge, Mass. London: MIT Press, Jul. 1985, pp. 35-49.
Salton et al., Term-Weighting Approaches in Automatic Text Retrieval, Information Processing & Management, vol. 24, Issue 5, Nov. 1987, 23 pages.
Santhosh et al., Discourse Based Advancement on Question Answering System, International Journal on Soft Computing, Artificial Intelligence and Applications (IJSCAI), vol. 1, Issue 2, Oct. 2012, 12 pages.
Scholman et al., A Step-Wise Approach to Discourse Annotation: Towards a Reliable Categorization of Coherence 64 Relations, Categories of coherence relations in discourse annotation. Dialogue & Discourse, vol. 7, No. 2, 2016, 28 pages.
Searle, Speech Acts: An Essay in the Philosophy of Language, Cambridge University Press, Jan. 1969, pp. 22-53.
Socher et al., Learning Continuous Phrase Representations and Syntactic Parsing with Recursive Neural Networks, Stanford University, 2010, 9 pages.
Sperber et al., Relevance: Communication and Cognition, Blackwell, Oxford and Harvard University Press, Cambridge, MA, 1986, 331 pages.
Sun et al., Exploring Syntactic Structural Features for Sub-Tree Alignment Using Bilingual Tree Kernels, ACL'10 Proceedings of the 48th Annual Meeting of the Association for Computational Linguistics, Jul. 2010, pp. 306-315.
Surdeanu et al., Two Practical Rhetorical Structure Theory Parsers, In Proceedings of the Conference of the North American Chapter of the Association for Computational Linguistics—Human Language Technologies, Jun. 5, 2015, pp. 1-5.
Traum et al., Conversation Acts in Task-Oriented Spoken Dialogue, University of Rochester Computer Science, Computational Intelligence, vol. 8, No. 3, Aug. 1992, 31 pages.
Traum et al., Discourse Obligations in Dialogue Processing, In Proceedings of the 32nd annual meeting on Association for Computational Linguistics (ACL '94). Association for Computational Linguistics, 1994, pp. 1-8.
Tsui, English Conversation. Describing English Language Series, London: Oxford University Press, 1994, pp. 159-193.

(56) References Cited

OTHER PUBLICATIONS

Uliyar, A Primer: Oracle Intelligent Bots, Powered by artificial intelligence, White Paper, Sep. 2017, 28 pages.
Vapnik, The Nature of Statistical Learning Theory, 1995.
Walker et al., Quantitative and Qualitative Evaluation of Darpa Communicator Spoken Dialogue Systems, Discourse Analysis in Understanding Spoken Language, Proc. ACL, 2001, pp. 515-522.
Wang et al., Kernel Based Discourse Relation Recognition with Temporal Ordering Information, In Proceedings of the 48'th annual meeting of the Association for Computational Linguistics, Jul. 11-16, 2010, pp. 710-719.
Wu et al., Enhancing Text Representation for Classification Tasks with Semantic Graph Structures, International Journal of Innovative Computing, Information and Control, vol. 7, No. 5 (B), May 2011, pp. 2689-2698.
Wuchner et al., Data Loss Prevention Based on Data-Driven Usage Control, IEEE 23rd International Symposium on Software Reliability Engineering, 2012, 10 pages.
Yessenalina et al., Compositional Matrix-Space Models for Sentiment Analysis, Proceedings of the 2011 Conference on Empirical Methods in Natural Language Processing, Jul. 27-31, 2011, pp. 172-182.
Zanzotto et al., Estimating Linear Models for Compositional Distributional Semantics, In Proceedings of the 23 International Conference on Computational Linguistics (COLING), Aug. 23-27, 2010, pp. 1263-1271.
Zeilenga, Lightweight Directory Access Protocol (LDAP) Read Entry Controls, IETF, RFC 4527, Jun. 2006, 8 pages.
Zhao et al., Facilitating Discourse Analysis with Interactive Visualization, IEEE Transactions on Visualization and Computer Graphics, vol. 18, No. 12, 2012, pp. 2639-2648.
"First Action Interview Pilot Program Pre-Interview Communication" issued in U.S. Appl. No. 16/145,702, mailed Feb. 7, 2019, 6 pages.
Chen, "Understanding Mental States in Natural Language", Proceedings of the 8th International Conference on Computational Semantics, Jan. 2009, pp. 61-72.
Ebrahim, "NLP Tutorial Using Python NLTK (Simple Examples)", DZone.com, Available Online at, URL: https://dzone.com/articles/nlp-tutorial-using-python-nltk-simple-examples, (Last Accessed Feb. 1, 2019), Sep. 24, 2017, pp. 1-10.
Ponti, "Machine Learning Techniques Applied to Dependency Parsing", University of Pavia, Available Online at, URL: https://vision.unipv.it/AI/AIRG/MachineLearning TechniquesAppliedToDependencyParsingRevised.pdf (Last Accessed Jan. 1, 2019), Oct. 2015, pp. 1-45.
U.S. Appl. No. 16/145,702, "First Action Interview Office Action Summary", mailed Apr. 29, 2019, 8 pages.
Galitsky, "Discovering Rhetorical Agreement between a Request and Response", Dialogue & Discourse, vol. 8, No. 2, Dec. 1, 2017, pp. 167-205.
Galitsky et al., "On a Chat Bot Finding Answers with Optimal Rhetoric Representation", RANLP—Recent Advances in Natural Language Processing Meet Deep Learning, Nov. 10, 2017, pp. 253-259.
International Application No. PCT/US2019/015696, "International Search Report and Written Opinion", dated Apr. 23, 2019, 12 pages.
International Application No. PCT/US2019/031580, "International Search Report and Written Opinion", dated Jul. 5, 2019, 12 pages.
U.S. Appl. No. 15/975,683, "Non-Final Office Action", mailed Oct. 31, 2019, 27 pages.
U.S. Appl. No. 15/975,685, "Non-Final Office Action", mailed Nov. 15, 2019, 23 pages.
U.S. Appl. No. 16/010,091, "Non-Final Office Action", mailed Nov. 18, 2019, 26 pages.
U.S. Appl. No. 16/010,141, "Non-Final Office Action", mailed Feb. 24, 2020, 12 pages.
U.S. Appl. No. 16/010,156, "Notice of Allowance", mailed Feb. 6, 2020, 13 pages.
U.S. Appl. No. 16/010,156, "Notice of Allowance", mailed Nov. 7, 2019, 13 pages.
Galitsky et al., Chatbot with a Discourse Structure-Driven Dialogue Management, Proceedings of the Software Demonstrations of the 15th Conference of the European Chapter of the Association for Computational Linguistics Available on Internet at: https://pdfs.semanticscholar.org/439f/cbe14dbc84b694bae2ee42a914d743126d12.pdf, Apr. 2017, pp. 87-90.
Galitsky et al., "Style and Genre Classification by Means of Deep Textual Parsing", Computational Linguistics and Intellectual Technologies: Proceedings of the International Conference "Dialogue 2016", Jun. 2016, pp. 1-45.
Marcu et al., "An Unsupervised Approach to Recognizing Discourse Relations", Proceedings of the 40th Annual Meeting of the Association for Computational Linguistics (ACL), 2002, 8 pages.
International Application No. PCT/US2018/031890, "International Preliminary Report on Patentability", mailed Nov. 21, 2019, 9 pages.
Tai et al., "Improved Semantic Representations from Tree-Structured Long Short-Term Memory Networks", Available Online at: https://arxiv.org/pdf/1503.00075.pdf, May 30, 2015, 11 pages.
U.S. Appl. No. 15/975,683, "Non-Final Office Action", mailed Mar. 19, 2020, 16 pages.
U.S. Appl. No. 15/975,685, "Non-Final Office Action", mailed Apr. 1, 2020, 23 pages.
U.S. Appl. No. 16/010,091, "Notice of Allowance", mailed Mar. 19, 2020, 13 pages.
U.S. Appl. No. 16/145,702, "Final Office Action", mailed May 6, 2020, 19 pages.
U.S. Appl. No. 16/145,777, "Non-Final Office Action", mailed Apr. 3, 2020, 18 pages.
U.S. Appl. No. 16/260,939, "Non-Final Office Action", mailed May 1, 2020, 10 pages.
Galitsky et al., "Finding Maximal Common Sub-Parse Thickets for Multi-Sentence Search", Graph Structures for Knowledge Representation and Reasoning, 2014, 19 pages.
Galitsky et al., "Text Classification Based on Deep Textual Parsing", Available Online at: http://ceur-ws.org/vol-1886/paper_8.pdf, 2011, 9 pages.
Hara et al., "Exploring Difficulties in Parsing Imperatives and Questions", Proceedings of the 5th International Joint Conference on Natural Language Processing, Nov. 8-13, 2011, pp. 749-757.
Johnson et al., "The FrameNet Tagset for Frame-Semantic and Syntactic Coding of Predicate-Argument Structure", Proceedings of the First Meeting of the North American Chapter of the Association for Computational Linguistics, Apr. 2000, pp. 56-62.
International Application No. PCT/US2018/053392, "International Preliminary Report on Patentability", mailed Apr. 9, 2020, 7 pages.
U.S. Appl. No. 15/975,683 , Notice of Allowance, Mailed On Jun. 12, 2020, 17 pages.
U.S. Appl. No. 15/975,685 , Notice of Allowance, Mailed On Jul. 24, 2020, 17 pages.
U.S. Appl. No. 16/010,141 , Final Office Action, Mailed On Jul. 30, 2020, 14 pages.
U.S. Appl. No. 16/145,702 , Notice of Allowance, Mailed On Jul. 1, 2020, 15 pages.
U.S. Appl. No. 16/145,777 , Notice of Allowance, Mailed On Jul. 15, 2020, 17 pages.
U.S. Appl. No. 16/260,930 , Non-Final Office Action, Mailed On Aug. 12, 2020, 9 pages.
U.S. Appl. No. 16/260,939 , Notice of Allowance, Mailed On Jun. 12, 2020, 14 pages.
Galitsky et al., "Finding Maximal Common Sub-Parse Thickets for Multi-Sentence Search", IJCAI Workshop on Graphs and Knowledge Representation, IJCAI, 2013, 19 pages.
Kipper et al., "A Large-scale Classification of English Verbs", Kluwer Academic Publishers, Springer Netherland, Dec. 2006, 20 pages.
International Application No. PCT/US2019/015696, International Preliminary Report on Patentability, Mailed On Aug. 13, 2020, 8 pages.

(56) References Cited

OTHER PUBLICATIONS

International Application No. PCT/US2019/031580, International Preliminary Report on Patentability, Mailed On Nov. 19, 2020, 8 pages.
Mathkour, "A Novel Rhetorical Structure Approach for Classifying Arabic Security Documents", International Journal of Computer Theory and Engineering, vol. 1(3), Aug. 2009, 1793-8201.
U.S. Appl. No. 16/408,224, Supplemental Notice of Allowability mailed on Apr. 7, 2022, 4 pages.
U.S. Appl. No. 16/408,224, Supplemental Notice of Allowability mailed on Feb. 15, 2022, 4 pages.
U.S. Appl. No. 16/902,015, First Action Interview Office Action Summary mailed on Mar. 11, 2022, 5 pages.
U.S. Appl. No. 16/902,015, First Action Interview Pilot Program Pre-Interview Communication mailed on Jan. 21, 2022, 5 pages.
European Application No. 18789298.9, Office Action mailed on Jan. 18, 2022, 8 pages.
Indian Application No. 202047007045, First Examination Report mailed on Mar. 25, 2022, 6 pages.
U.S. Appl. No. 17/084,116, First Action Interview Pilot Program Pre-Interview Communication mailed on Sep. 28, 2022, 6 pages.
Indian Application No. 202047043656, First Examination Report mailed on Sep. 1, 2022, 6 pages.
U.S. Appl. No. 16/902,015, Notice of Allowance mailed on Oct. 4, 2022, 9 pages.
Japan Application No. 2020-517950, Notice of Decision to Grant mailed on Nov. 1, 2022, 3 pages.
Miyabe et al., Identifying a cross-document relation between sentences, IPSJ SIG Technical Reports, Information Processing Society of Japan, vol. 2005, No. 73, pp. 35-42.
Japanese Patent Application No. 2020-517950, Office Action mailed on Jul. 12, 2022, 5 pages.
U.S. Appl. No. 16/902,015, Final Office Action mailed on Jun. 9, 2022, 13 pages.
U.S. Appl. No. 17/084,116, Notice of Allowance, Mailed On Nov. 30, 2022, 17 pages.
Application No. CN201980030899.2 , Office Action, Mailed On Jul. 1, 2024, 5 pages.
Application No. JP2022-191911 , Office Action, Mailed On Jun. 18, 2024, 2 pages.
Application No. JP2023-060794 , Notice of Decision to Grant, Mailed On Jul. 2, 2024, 3 pages.

\* cited by examiner

DATA LOSS PREVENTION SYSTEM FOR CLOUD SECURITY BASED ON DOCUMENT DISCOURSE ANALYSIS

CROSS-REFERENCES TO RELATED APPLICATIONS

This application is a continuation of U.S. Ser. No. 16/010,123, filed Jun. 15, 2018, which claims the benefit of U.S. Provisional Application No. 62/520,411, filed Jun. 15, 2017, which are incorporated by reference in their entirety.

TECHNICAL FIELD

This disclosure is generally concerned with electronic document classification. More specifically, this disclosure is concerned with using discourse analysis to improve document classification used in data loss prevention systems.

BACKGROUND

Data loss prevention systems detect when sensitive information such as internal memos, scientific or technical documents, or other proprietary information is being transferred outside an organization and prevent transfer of such information. Data loss prevention systems use document classification to determine whether a document is public or private. Data loss prevention systems help organizations in preventing data breaches.

Existing document classification systems are based on keyword analysis. For example, existing systems analyze a keywords in a document and derive various statistics therefrom. Based on the statistics, existing solutions predict a class of the document. But such techniques result in many documents being incorrectly classified. For example, a given keyword such as "technology" or "contract" can be present in both public and private documents. In another example, keyword-based analysis can fail to recognize sensitive information and erroneously classifies some documents as public unless a document is explicitly tagged or labeled as "confidential."

Other solutions use machine learning in conjunction with keyword analysis, but these solutions suffer from some of the same problems such as keywords frequently appearing in both public and private documents. That is, the machine learning can only perform as well as the keyword data, which alone, is of limited value.

Consequently, existing solutions cannot accurately classify public and private documents, resulting in failed detection of leaked private documents and false positives for public documents.

BRIEF SUMMARY

Generally, systems, devices, and methods of the present invention are related to determining a document classification. For example, a document classification application accesses a document that includes sentences. The document classification application generates a set of discourse trees, each discourse tree corresponding to a sentence. Each discourse tree includes elementary discourse units and a rhetorical relationship that relates two elementary discourse units. The document classification application creates a first communicative discourse tree from a first discourse tree of the discourse trees by matching each elementary discourse unit in the first discourse tree that has a verb to a verb signature. The document classification application creates a second communicative discourse tree from a second discourse tree of the discourse trees by matching each elementary discourse unit in the second discourse tree that has a verb to a verb signature.

The document classification application combines the first communicative discourse tree and the second communicative discourse tree into a parse thicket. The parse thicket relates the first and second communicative discourse trees. The document classification application applies a classification model that is trained to predict whether a document is private or public to the parse thicket in order to determine a classification and provides the classification to a user interface.

The document classification application can further apply the classification model by classifying the document into a category. The classification is based at least in part on the determined category.

The document can include paragraphs with sentence fragments. The document classification application can further create, for each paragraph, a paragraph communicative discourse tree. The document classification application combines the paragraph communicative discourse trees into a parse thicket. The document classification application determines each paragraph is public or private by applying the classification model to the parse thicket. The document classification application, in response to determining that a threshold number of paragraphs are private, determines that the document is private.

The document classification application can further determine, from the document, a set of keywords. The document classification application executes a query for the document. The query includes the set of keywords. Responsive to receiving a result of the query that indicates that the document is public, the document classification application updates the classification as public.

The document classification application can further select, at random, the plurality of sentences from different paragraphs of the document.

Responsive to determining that the document is public, the document classification application can permit a transmission of the document over a data network.

The document classification application can, responsive to determine that the document is classified as private, prevent a transmission of the document over a data network.

The document classification application can further access a set of training data including a set of training pairs. Each training data pair includes a parse thicket corresponding to sentences from a document and an expected classification. The set of training data includes both (i) a first training data pair that has an expected classification of private and (ii) a second training data pair that has an expected classification of public. The document classification application trains a classification model by iteratively providing one of the training data pairs to the classification model, receiving, from the classification model, a determined classification, calculating a loss function by calculating a difference between the determined classification and the expected classification; and adjusting internal parameters of the classification model to minimize the loss function.

The document classification application can further access an electronic document including features such as one of (i) format, (ii) captions, or (iii) headers. The document classification application recognizes a document feature. The document classification application extracts from the document, metadata and text. The document classification application classifies the document into a category by applying a first classification model to the metadata, the text, and the document feature, selecting, based on the determined category, a second classification model from a set of classification models, and determines whether the document is public or private by applying the second classification model to the document.

The categories can include (i) financial, (ii) legal, (iii) engineering, and (iv) health. Each of classification the models can correspond to a respective category.

The document can include sentences. The document classification application can generate discourse trees. Each discourse tree corresponds to a sentence, includes elementary discourse units, and includes a rhetorical relationship that relates two elementary discourse units. The document classification application can create a first communicative discourse tree from a first discourse tree of the discourse trees by matching each elementary discourse unit in the first discourse tree that has a verb to a verb signature. The document classification application creates a second communicative discourse tree from a second discourse tree of the discourse trees by matching each elementary discourse unit in the second discourse tree that has a verb to a verb signature. The document classification application combines the first communicative discourse tree and the second communicative discourse tree into a parse thicket. The parse thicket relates the first and second communicative discourse trees. The document classification application applies the second classification model to the parse thicket in order to determine a classification. The classification model is trained to predict whether a document is public or private.

The document classification application can iteratively train the second classification model. The document classification application provides a training data pair from a set of training data to the classification model. Each training data pair comprises a training document and an expected document classification. The document classification application receives from the classification model, a determined classification. The document classification application calculates a loss function by calculating a difference between the determined classification and the expected classification. The document classification application adjusts internal parameters of the classification model to minimize the loss function.

The above methods can be implemented as tangible computer-readable media and/or operating within a computer processor and attached memory

DETAILED DESCRIPTION

Figure 1:
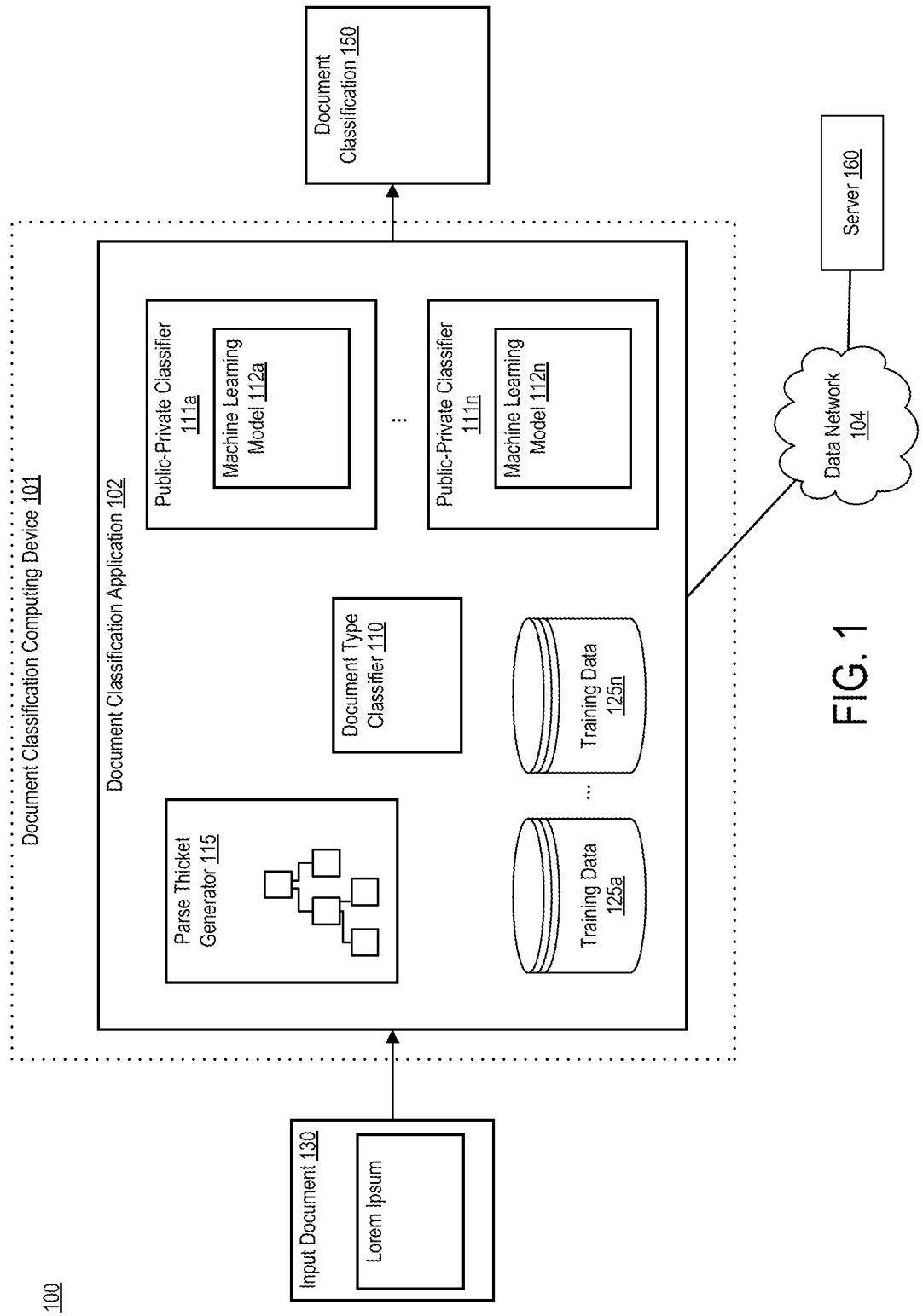
FIG. 1 shows an exemplary document classification environment, in accordance with an aspect.

Aspects disclosed herein provide technical improvements to the area of computer-implemented document classification. Document classification systems make determinations about a type of a document and whether the document is public or private. Based on this determination, a data loss prevention system can either permit or block transmission of the document. But as discussed, existing keyword-based solutions are inadequate. Such solutions fail to analyze writing style, grammar, and other formalities inherent in different document types, leads to erroneous results.

More specifically, aspects described herein determine whether a document is public or private by representing relevant parts of the document by communicative discourse trees. "Communicative discourse trees" or "CDTs" include discourse trees that are supplemented with communicative actions. A communicative action is a cooperative action undertaken by individuals based on mutual deliberation and argumentation.

By using communicative discourse trees, aspects described herein leverage discourse-level analysis in addition to syntactic analysis to recognize a grammar and discourse style inherent to different types of documents. Aspects provide superior performance of compared to keyword-based and statistical keyword learning-based approaches, and do not require advanced keywords or an extensive training set. Instead, communicative discourse trees are used in conjunction with machine learning models trained with appropriate training sets. The training data sets can correspond to the type of document being analyzed, e.g., financial, legal, health or technical documents.

The following example is provided to introduce certain aspects. A document classification application executing on a computing device accesses sentences from a document whose type is unknown. The document includes the following sentences: "the following describes a technical solution for removing signal from noise in a communication system;" "the algorithm is applied to a signal that includes noise;" and "removing the noise results in a superior signal that improves the accuracy of Company's satellite navigation systems, which have applications in military and commercial domains."

For each sentence, the document classification application generates a corresponding discourse tree. The document classification application selects the discourse trees corresponding to two different sentences from the document. The document classification system creates a first communicative discourse tree from a first discourse tree that corresponds to the sentence "the algorithm . . . ," and a second communicative discourse tree from a second discourse tree that corresponds to the sentence "removing the noise . . . ." The document classification application combines the first and second communicative discourse trees into a parse thicket. A parse thicket is a combination of parse trees for sentences with discourse-level relationships between words and parts of the sentence in one graph.

In this manner, the parse thicket relates the communicative discourse trees, therefore one or more rhetorical relationships between the sentences. The document classification application provides the parse thicket to a machine learning model such as a classification model. The classification model is trained to predict whether a document is public or private.

Technical advantages of some aspects include improved data loss prevision systems and document detection systems. As discussed, existing document classification systems are based on keyword analysis. For example, existing systems analyze a keywords in a document and derive various statistics therefrom. Based on the statistics, existing solutions predict a class of the document. But such techniques result in many documents being incorrectly classified. Other solutions may use machine learning in conjunction with keyword analysis, but these solutions suffer from some of the same problems such as keywords frequently appearing in both public and private documents. That is, the machine learning can only perform as well as the keyword data, which alone, is of limited value. Consequently, existing solutions cannot accurately classify public and private documents, resulting in failed detection of leaked private documents and false positives for public documents.

More specifically, aspects described herein use communicative discourse trees. Communicative discourse trees combine rhetoric information with communicative actions. By incorporating labels that identify communicative actions, learning of communicative discourse trees can occur over a richer features set than simply rhetoric relations and syntax of elementary discourse units (EDUs). With such a feature set, additional techniques such as classification can be used to determine a rhetoric relationship between texts, thereby enabling improved document classifications systems.

Certain Definitions

As used herein, "private" refers to document which are intended to be kept confidential. For example, private documents include, but are not limited to, business plans, health records, engineering specifications; legal documents such as legally-binding contracts and agreements, offer letters, stock option certificates, letters of intent; financial documents such as financial plans, forecasts, internal reports, term-sheets; health documents such as patient forms, requests, clinical data; and educational records such as grade sheets.

As used herein, "public" refers to document which are publicly accessible. Public documents include, but are not limited to as SEC filings, press releases, public websites, public legal forms, regulations, court decisions, public financial reports, financial regulation documents, or resumes.

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

FIG. 1 shows an exemplary document classification environment, in accordance with an aspect. FIG. 1 depicts exemplary classification computing device 101, input document 130, document classification 150, data network 104, and server 160. Document classification computing device 101 includes document classification application 102, which includes one or more of document type classifier 110, training data 125*a-n*, communicative discourse tree generator 115, and public-private classifiers 111*a*-111*n*.

Document classification application 102 receives or accesses input document 130. Input document 130 can be received via an external system such as a data loss prevention system, email client, chat client, etc. Input document 130 can be any type of document, such as text, PDF®, image, vector document, or other type of document. Nonvector document types can be provided to an optical character recognition application to recognize text within the document.

Document classification application 102 provides input document 130 to a parse thicket generator 115. Parse thicket generator 115 creates a communicative discourse tree from portions of text such as sentences or paragraphs from input document 130 and creates a parse thicket from the generated communicative discourse trees. Parse thicket generator 115 can use a process described in more detail with respect to FIG. 16.

In order to classify a particular type of document as public or private, document classification application 102 accesses one or more public-private classifiers 111a-n. Each public-private classifier 111a-n is trained to operate on a particular type of document. Because document types vary in style, multiple public-private classifiers 111a-n may be appropriate. For example, classifier 111a can be trained to predict whether legal documents are public or private, whereas classifier 111b is trained to predict whether engineering documents are public or private.

Each public-private classifier can include one or more machine learning models. As depicted, for example, public-private classifier 111a includes machine learning model 112a. The machine learning models can be predictive models, classifiers, SVM models, Gradient Tree Boosters, etc.

Document classification application 102 can train one or more of the machine learning models itself or receive a trained machine learning model from another system. Document classification application 102 can access one or more sets of training data 125a-n. Each set of training data 125a-n can correspond to a particular public-private classifier 111a-n. Alternatively, training data can be reused across one or more public-private classifiers.

In an aspect, in order to determine a type of input document 130, document classification application 102 provides input document 130 to document type classifier 110 before passing the input document to a specific public-private classifier 111a-n. Document type classifier 110 analyzes input document 130 in order to determine the type of the document, for example, whether the document is legal, financial, medical, etc. Document type classifier 130 then determines which public-private classifier 111a-n is applicable and routes input document 130 to the determined classifier. Document type classifier 130 can use a process described in more detail with respect to FIG. 18.

Document classification computing device 101 can be any computing system such as desktop, laptop, or mobile device such as a mobile phone, smart phone, tablet, laptop, smart watch, and the like. Document classification computing device 101 can access data network 104 in order to query databases, for example, to determine whether input document 130 is accessible on the Internet. Data network 104 can be any public or private network, wired or wireless network, Wide Area Network, Local Area Network, or the Internet.

In an example, document classification application 102 receives input document 130. Document classification application 102 provides input document 130 to parse thicket generator 115 and receives a parse thicket representing a combination of communicative discourse trees from text such as sentences or paragraphs from input document 130. In this manner, the rhetoric agreement between sentences or paragraphs is represented. By representing the rhetoric agreement, document classification application 102 provides superior results over keyword-based systems.

Document classification application 102 provides input document 130 to document type classifier 110 in order to determine the appropriate public-private classifier 111a-n. Based on the determined classifier, document type classifier 110 provides the parse thicket to the selected public-private classifier and receives document classification 150. Document classification 150 is the classification of the document as public or private. Based on document classification 150, document classification system 102 or a data loss prevention system can take appropriate action such as releasing the document if the document classification is public, or blocking the document if the document classification is private.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation for time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
| --- | --- | --- |
| Contrast | One alternate (unconstrained) | The other alternate (unconstrained) |
| Joint | | |
| List | An item | A next item |
| Sequence | An item | A next item |

Figure 2:
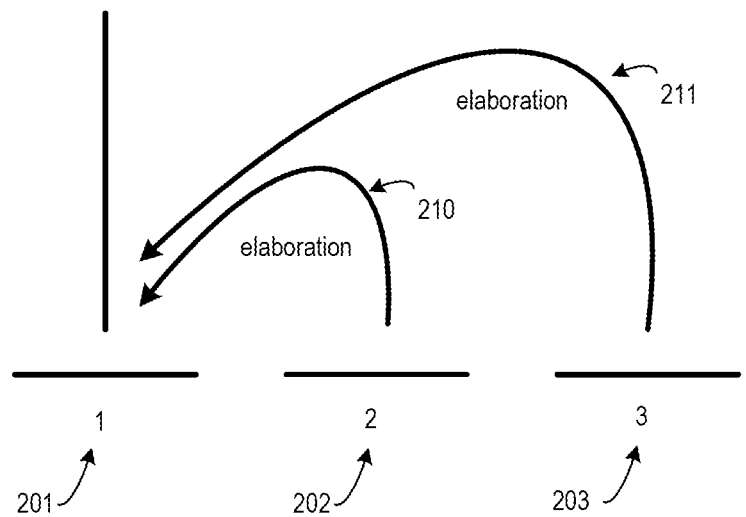
FIG. 2 depicts an example of a discourse tree in accordance with an aspect.
Figure 3:
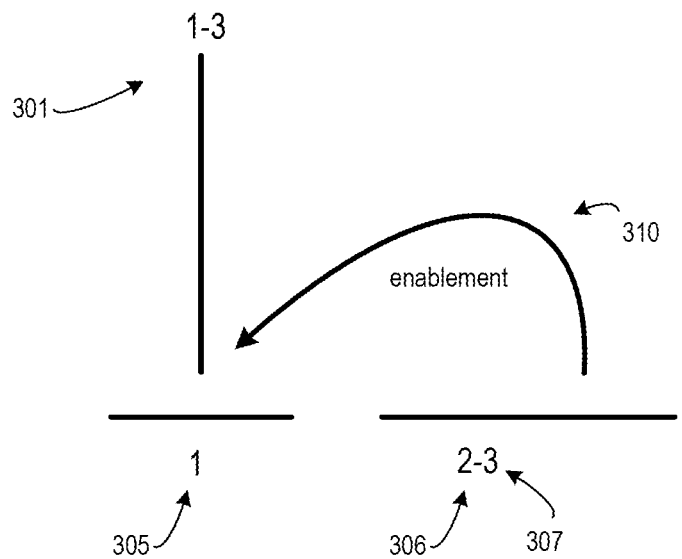
FIG. 3 depicts a further example of a discourse tree in accordance with an aspect.
Figure 3:
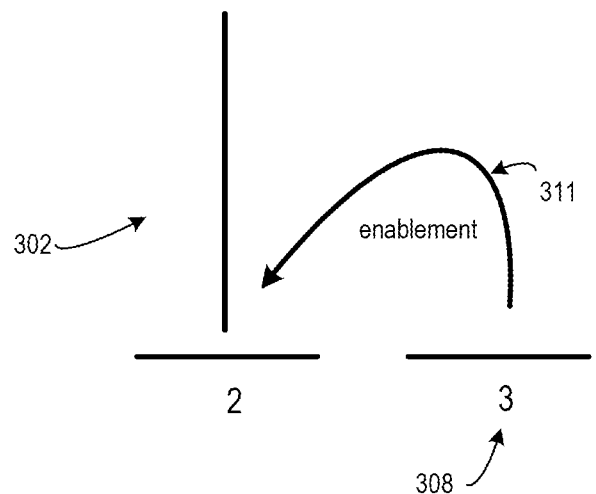

FIG. 2 depicts an example of a discourse tree, in accordance with an aspect. FIG. 2 includes discourse tree 200. Discourse tree includes text span 201, text span 202, text span 203, relation 210 and relation 228. The numbers in FIG. 2 correspond to the three text spans. FIG. 3 corresponds to the following example text with three text spans numbered 1, 2, 3:

1. Honolulu, Hawaii will be site of the 2017 Conference on Hawaiian History
2. It is expected that 200 historians from the U.S. and Asia will attend
3. The conference will be concerned with how the Polynesians sailed to Hawaii For example, relation 210, or elaboration, describes the relationship between text span 201 and text span 202. Relation 228 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relationship 310, enablement, between components 306 and 305, and 307, and 305. FIG. 3 refers to the following text spans:

1. The new Tech Report abstracts are now in the journal area of the library near the abridged dictionary.
2. Please sign your name by any means that you would be interested in seeing.
3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
  (a) Unit size may vary, depending on the goals of the analysis
  (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
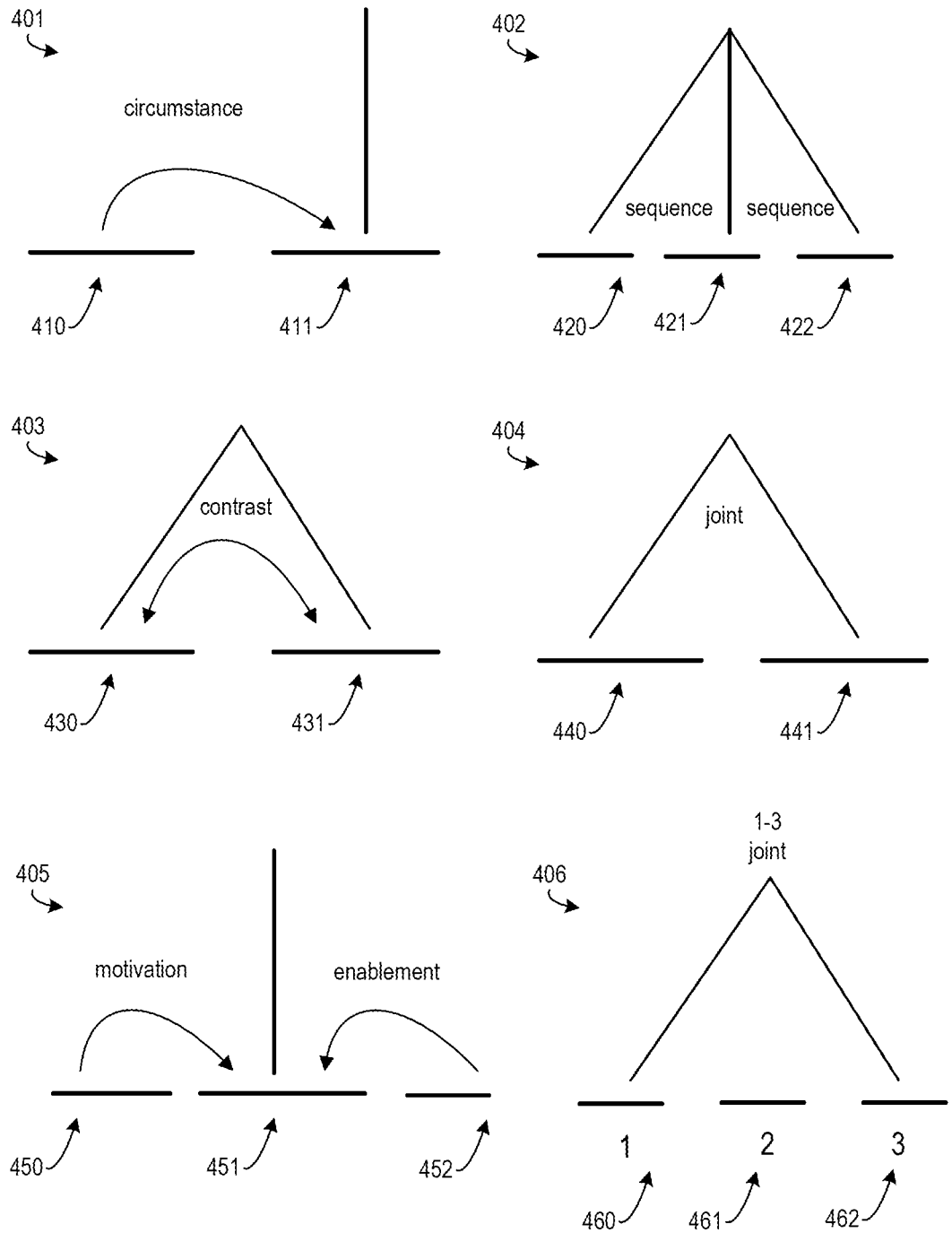
FIG. 4 depicts illustrative schemas, in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas, in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
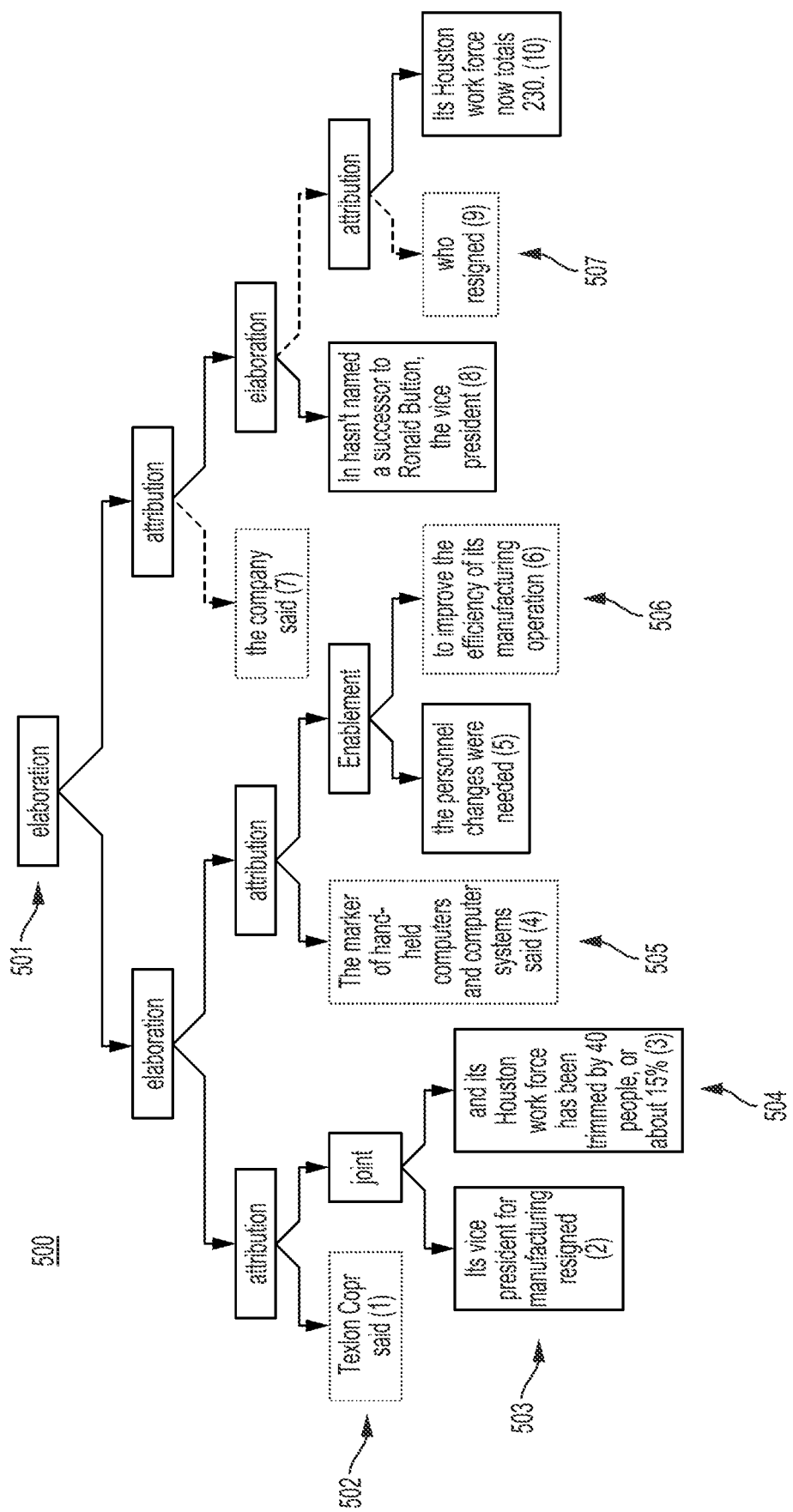
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multi-sentential rhetorical parsing for document-level discourse analysis. In ACL (1), pages 486-496.

Figure 6:
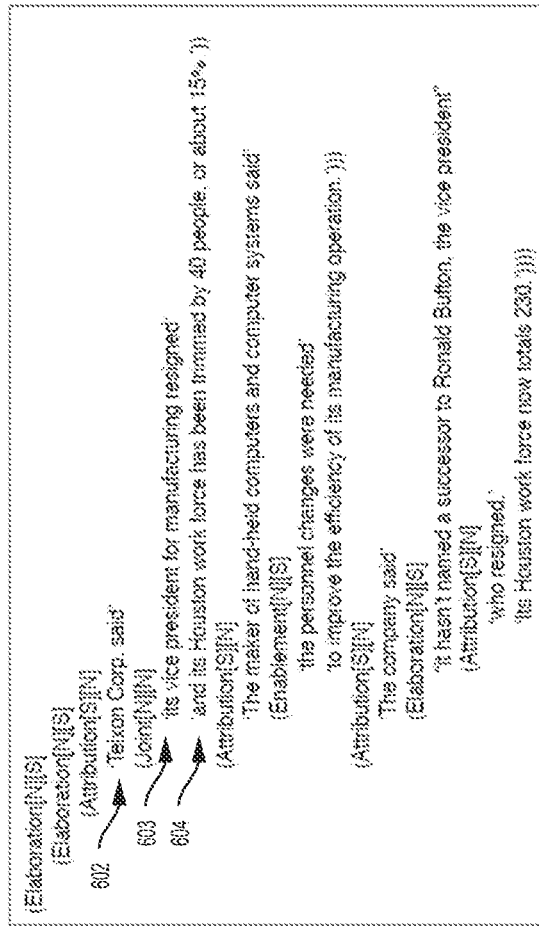
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is 5/8 while its recall is 5/12. When a search engine returns 30 pages only 20 of which were relevant while failing to return 40 additional relevant pages, its precision is 20/30=2/3 while its recall is 20/60=1/3. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2× ((precision×recall)/(precision+recall)) and is the harmonic mean of precision and recall. The F1 score reaches its best value at 1 (perfect precision and recall) and worst at 0.

Analyzing Sentence Pairs

Figure 7:
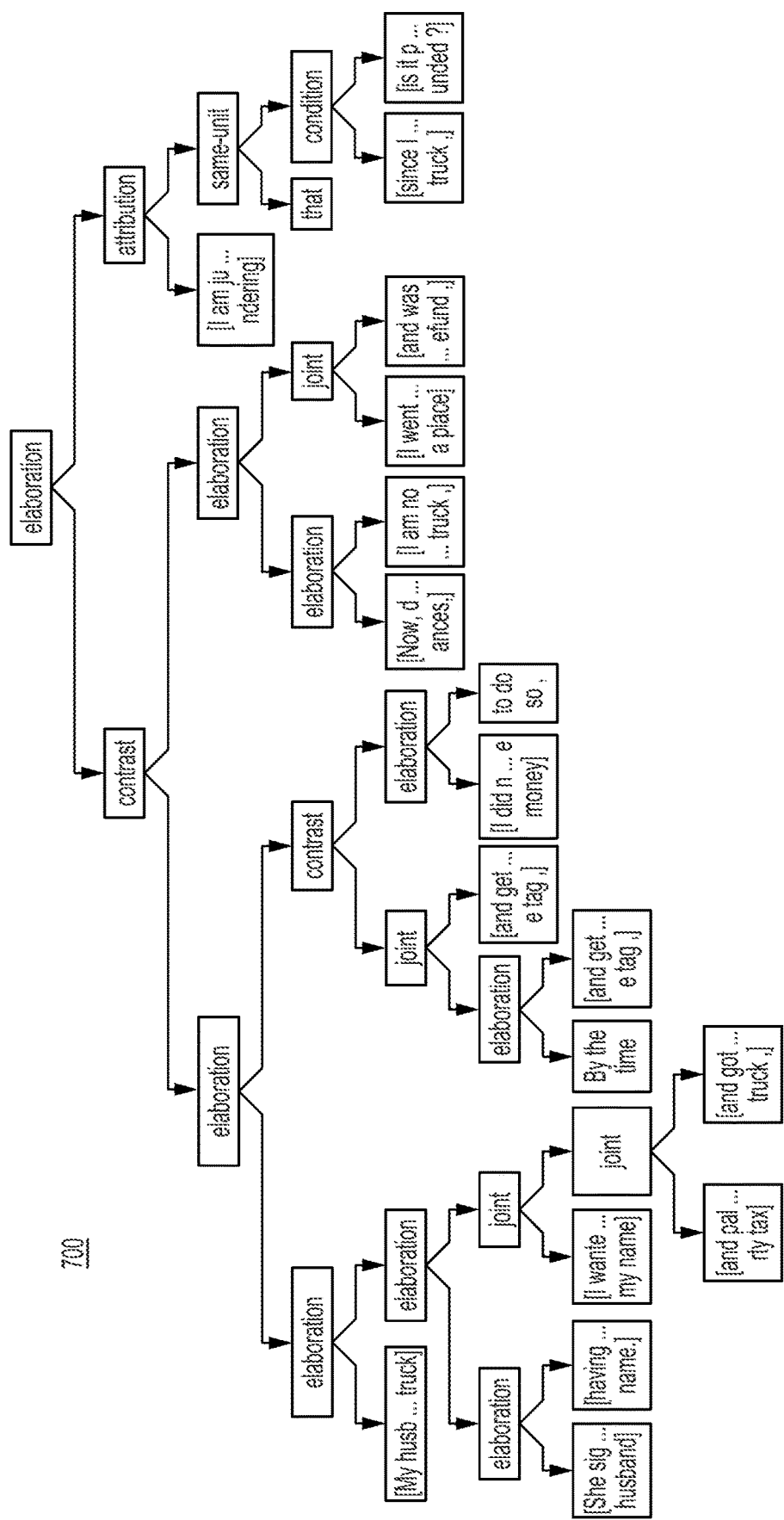
FIG. 7 depicts an exemplary DT for an example request about property tax in accordance with an aspect.

As described, aspects described herein can be used to determine whether a document is public or private. In a similar fashion, aspects described herein can also be used to analyze request and response pairs such as a question and an answer, to determine whether the answer addresses the question. Examples of the request and response case are provided herein for illustrative purposes. FIG. 7 depicts an exemplary DT for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with "By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, The main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
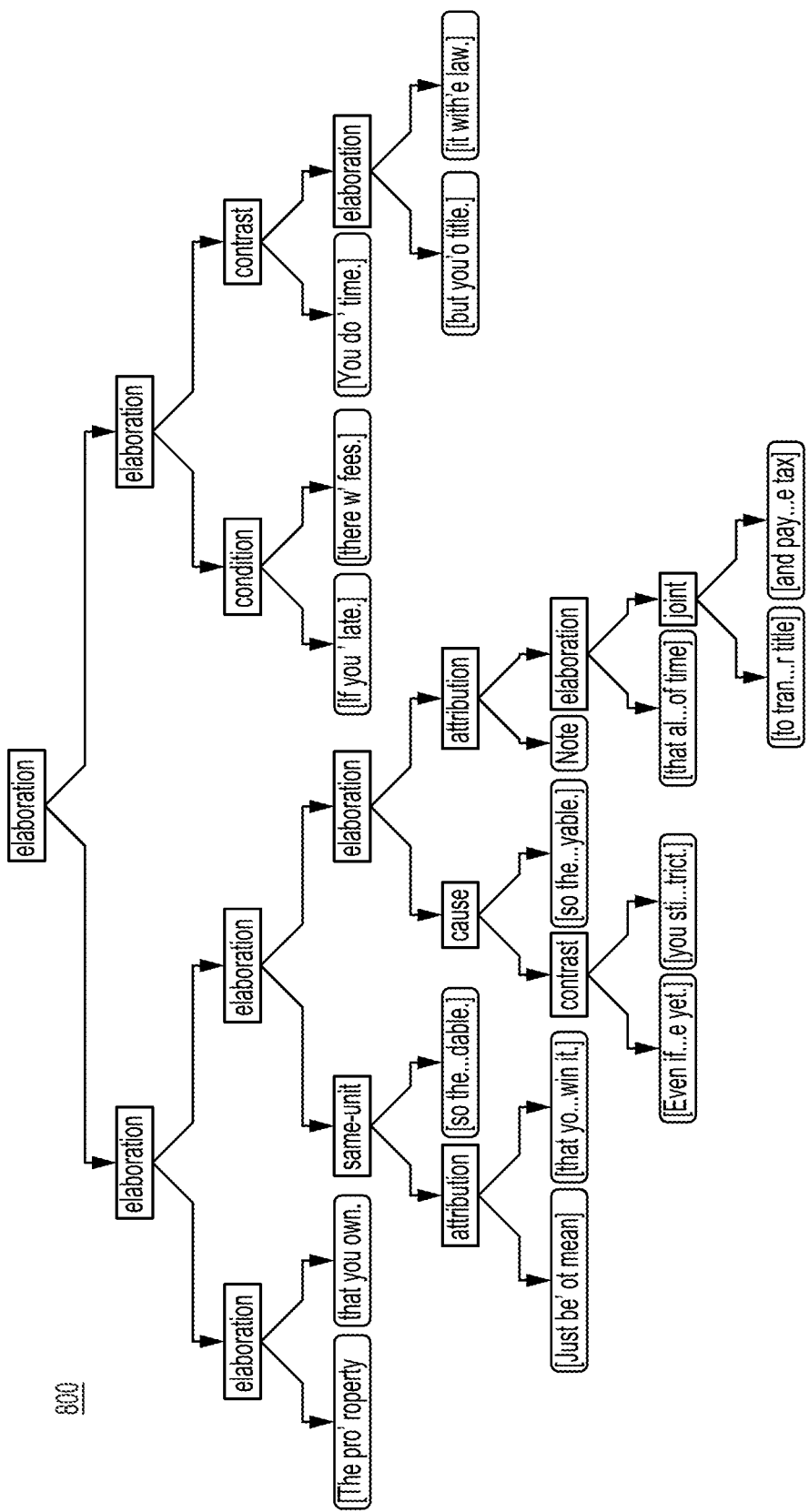
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
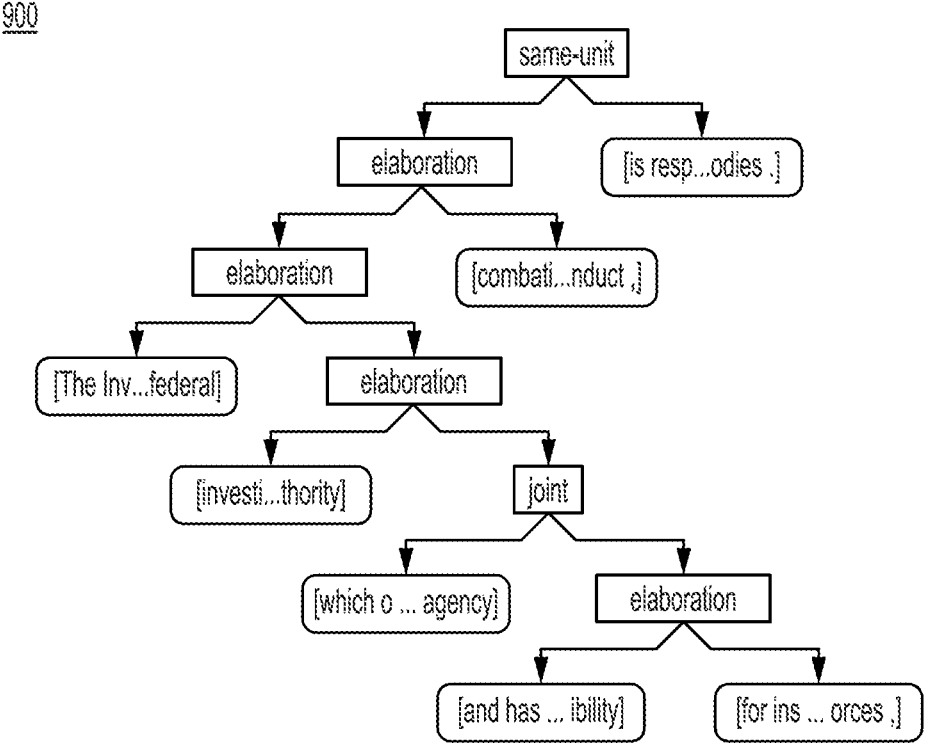
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
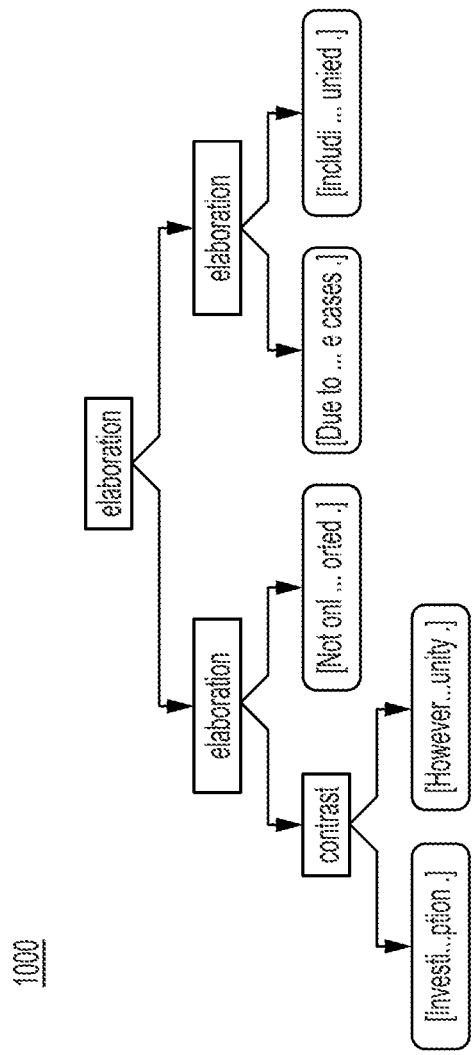
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers, see FIG. 9 and FIG. 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Communicative Discourse Trees (CDTs)

Aspects of the present disclosure build communicative discourse trees and use communicative discourse trees to analyze the rhetorical structure of documents. More specifically, aspects described herein create representations of sentences in a document, learn the representations, and relates the pairs into classes such as public or private. In this manner, document classification application 102 determines the particular class of document (e.g., scientific, technical, or legal), or the status (public or private).

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize sentences that indicate whether a document is public or private.

Document classification application 102 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov S O. Rhetoric Map of an Answer to Compound Queries Knowledge Trail Inc. ACL 2015, 681-686. ("Galitsky 2015"). By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
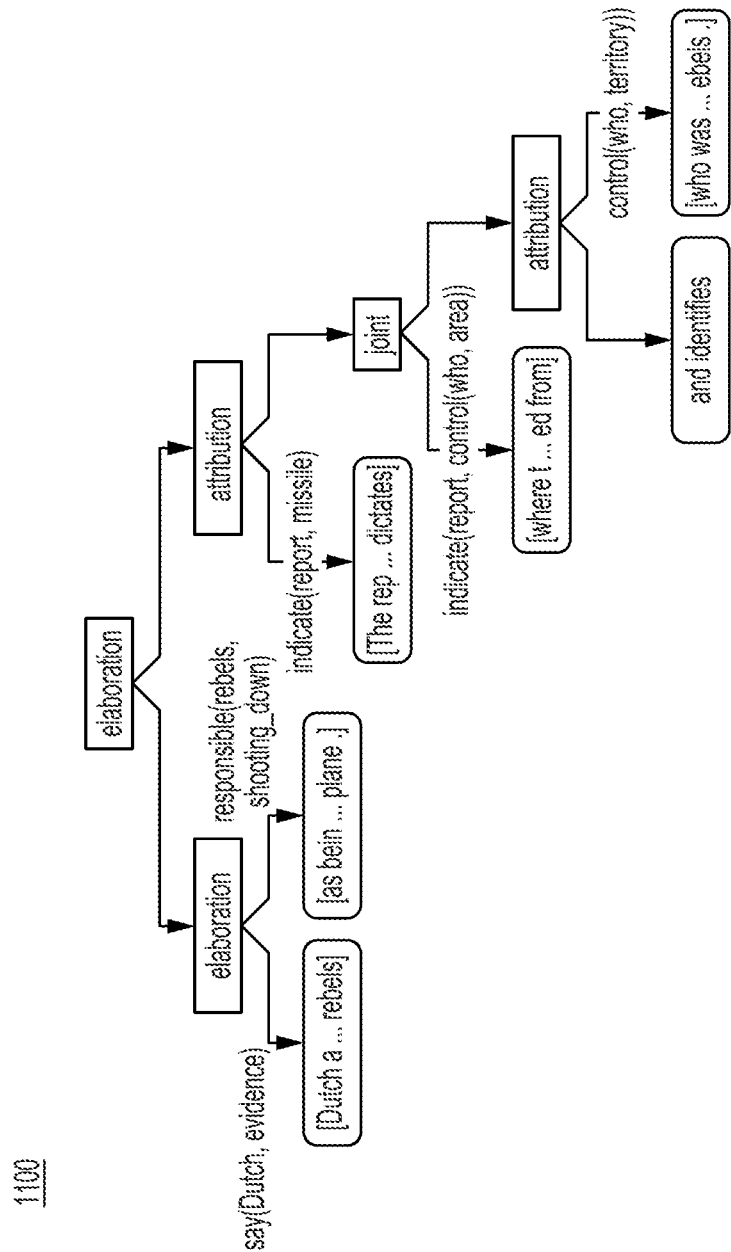
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of MH17 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible (rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 2008. and/or Karin Kipper Schuler, Anna Korhonen, Susan W. Brown, VerbNet overview, extensions, mappings and apps, Tutorial, NAACL-HLT 2009, Boulder, Colo.

Figure 12:
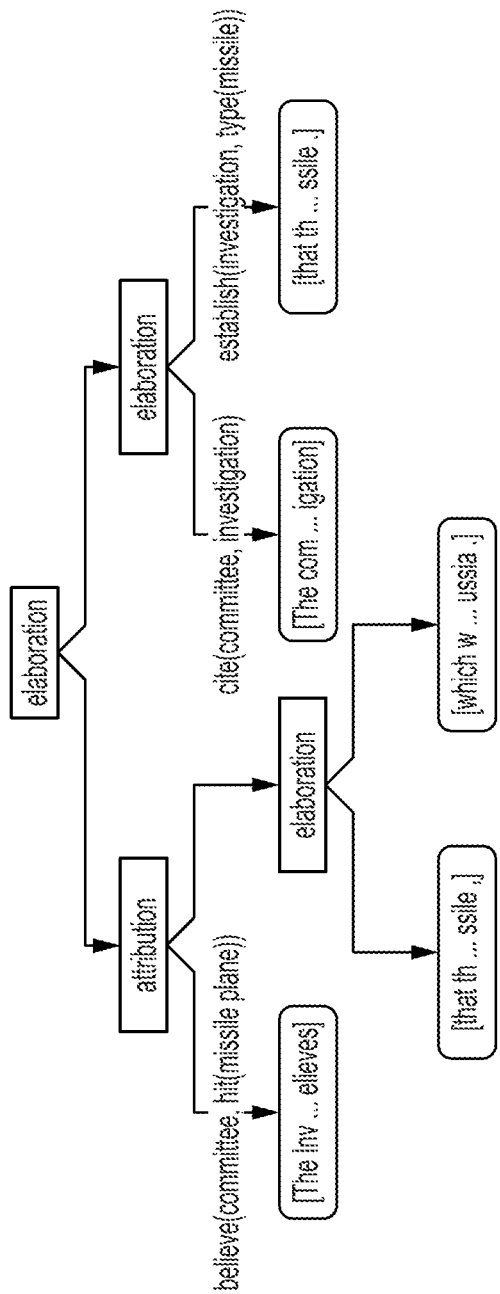
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1200, which represents the following text: "The Investigative Committee of the Russian Federation believes that the plane was hit by a missile, which was not produced in Russia. The committee cites an investigation that established the type of the missile."

Figure 13:
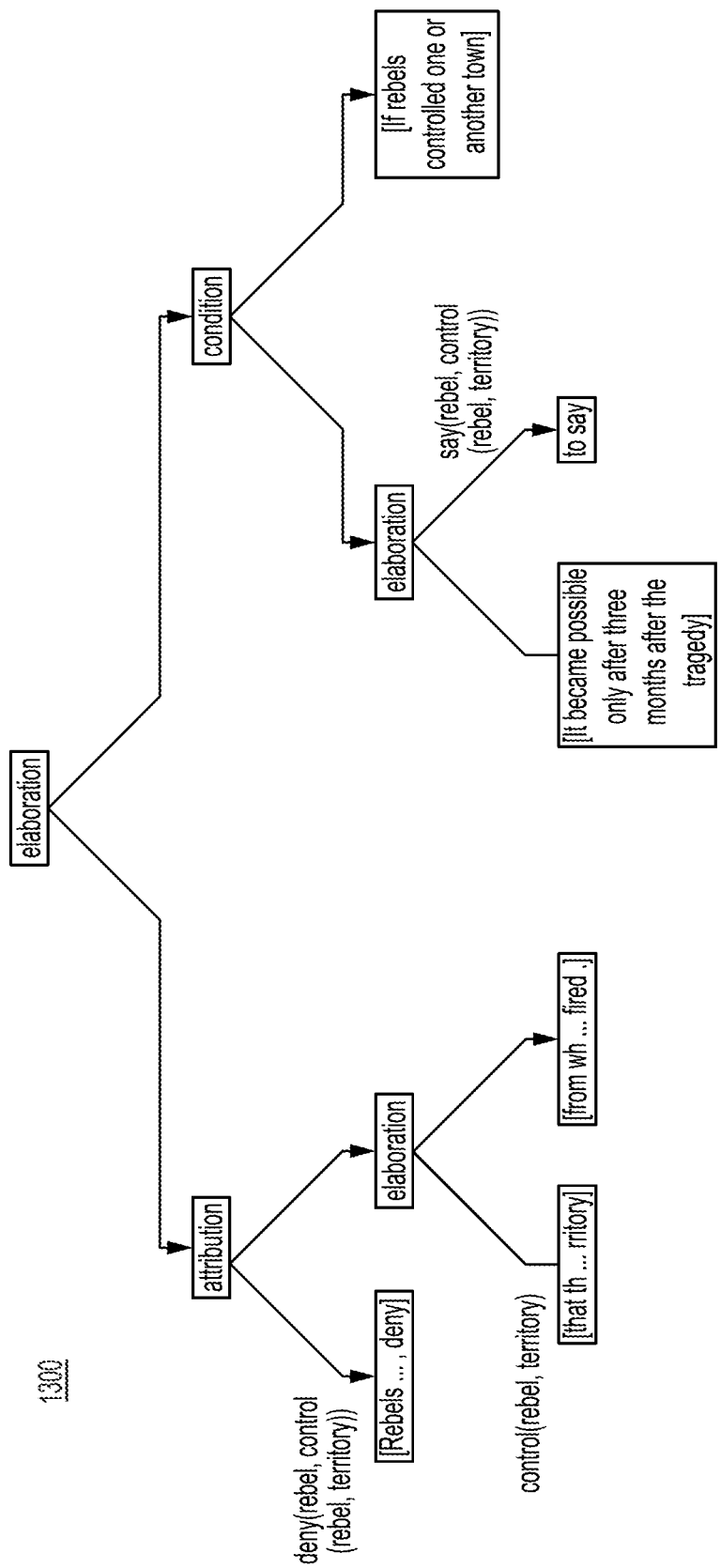
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1200 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 2008), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional_state(result(E), Emotion, Experiencer).

NP V ADV-Middle. Example: "Small children amuse quickly." Syntax: Experiencer V ADV. Clause: amuse (Experiencer, Prop):—, property(Experiencer, Prop), adv(Prop).

NP V NP-PRO-ARB. Example "The teacher amused." Syntax Stimulus V. amuse(Stimulus, E, Emotion, Experiencer): cause(Stimulus, E), emotional_state(result(E), Emotion, Experiencer).

NP.cause V NP. Example "The teacher's dolls amused the children." syntax Stimulus <+genitive> ('s) V Experiencer. amuse(Stimulus, E, Emotion, Experiencer): cause(Stimulus, E),
emotional_state(during(E), Emotion, Experiencer).

NP V NP ADJ. Example "This performance bored me totally." syntax Stimulus V Experiencer Result. amuse (Stimulus, E, Emotion, Experiencer). cause(Stimulus, E), emotional_state(result(E), Emotion, Experiencer), Pred(result(E), Experiencer).

Communicative actions can be characterized into clusters, for example:

Verbs with Predicative Complements (Appoint, characterize, dub, declare, conjecture, masquerade, orphan, captain, consider, classify), Verbs of Perception (See, sight, peer).

Verbs of Psychological State (Amuse, admire, marvel, appeal), Verbs of Desire (Want, long).

Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner(speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Document Classification

Data loss prevision systems can be designed to protect static data such as data stored in document management systems, email servers, file servers, networked-attached storages, personal computers, and cloud storages; and outbound network traffic such as emails, instant messages, and web traffic. In the case of outbound network traffic, scanning can be done seamlessly with no appreciable delay to a user of a computing system. Data loss prevision systems rely on accurate document classification systems in order to flag or block the loss of private information while allowing public information to be transmitted.

While classifications of public and private data varies by organization, legal requirements may dictate that personally identifiable information, health records under HIPAA and educational records under FERPA are required to be protected. Trade secrets and internal communications are typically sensitive.

In an aspect, before determining whether input document 130 is public or private, document classification application 102 can select a particular public-private classifier from public-private classifiers 111a-n. Different public-private classifiers may be trained for different types of documents such as scientific or legal documents. Once a document is obtained, document classification application 102 recognizes document format, extracts metadata and text. Certain features of format are extracted as well, including image captions, headers and footers, signature boxes and form-specific elements.

In a further aspect, document classification application 102 can form a search query for a document and submit the query to a search engine API tool such as Bing or Google to determine whether the document is public. The query can be generated from text extracted from multiple sections of a document. If a returned result is not very frequent (such as "this is private and confidential") and very similar (in terms of string distance) to some sentences in the document, then document classification application 102 concludes that the document is public.

As discussed with respect to FIG. 1, in an aspect, to obtain a category of input document 130, document classification application 102 classifies input document 130 into document type classifier 110. Document type classifier 110 determines a class from a set of predefined classes. In an example, six major classes are defined, which can be adequate to cover most documents. Document type classifier 110 can be performed by using nearest neighbor and can be implemented via Apache Lucene search of the phrases extracted from a document. The most probable class can be determined using a majority vote algorithm.

Once a document type is obtained, then document classification application 102 selects the appropriate public-private classifier 111a-n. Document classification application 102 selects sampling such as a few paragraphs from a document is selected for analysis. As described further herein, document classification 102 uses communicative discourse trees and parse thickets to determine the classification of input document 130.

Design Documents

Design documents can be considered a separate classification of document. A design document contains a thorough and well-structured description of how to build a particular engineering system. In this respect, a design document has a reproducible structure similar to that of a patent or research publication. But the design document differs in format. Design documents are different from non-design documents on the same topic in terms of style and phrasing. To extract these features, rhetoric relations are essential.

Document classification application 102 can differentiate design documents from classes of documents which can be viewed as ones containing meta-language. Genuine design documents consist of a language-object. Different classes of meta design documents can be enumerated: design requirements, project requirement document, requirement analysis, operational requirements; construction documentation, project planning, technical services review; design guidelines, design guides, tutorials; design templates (template for technical design document); research papers on system design; general design-related notes; educational materials on system design; the description of the company, which owns design documents; resume of a design professional; specifications for civil engineering; functional specifications; best design practices descriptions; and project proposals.

Meta-documents can contain object-level text, such as design examples. Object level documents (genuine design docs) can contain some author reflections on the system design process (which are written in metalanguage). Hence the boundary between classes does not strictly separates metalanguage and language object. Document classification 102 uses statistical language learning to optimize such boundary, using a rich set of linguistic features included with the discourse structures. In the design document domain, document classification 102 can differentiate between texts in mostly meta-language and the ones mostly in language-object.

Learning Rhetorical Structures

While keywords may be in some cases be sufficient to determine a topic of a text or document, such as software vs hardware or pop rock vs punk, keyword analysis often fails. For example, when determining whether a document is public or private in the case that distinct classes of documents share the same keywords, document phrasing, style, or other kinds of text structure information, discourse information such as anaphora and rhetoric structure aids in making accurate classifications.

For example, an engineering design document could easily be confused with a document on how to perform an action such as how to build a piece of furniture or paint a wall. For example, while an engineering design document may be private and confidential, a document that explains how to build something or how something may be non-sensitive or public. For example, without this distinction, data protection systems may erroneously consider published or granted patents, research papers, white papers, tutorials, examples, technical marketing materials as confidential engineering documents. Therefore, because engineering design documents and documents on how to perform an action may be erroneously misclassified using keyword-based solutions, the use of parse trees alone may also be insufficient. For example, without discourse structure, the distinction is difficult to make.

Figure 14:
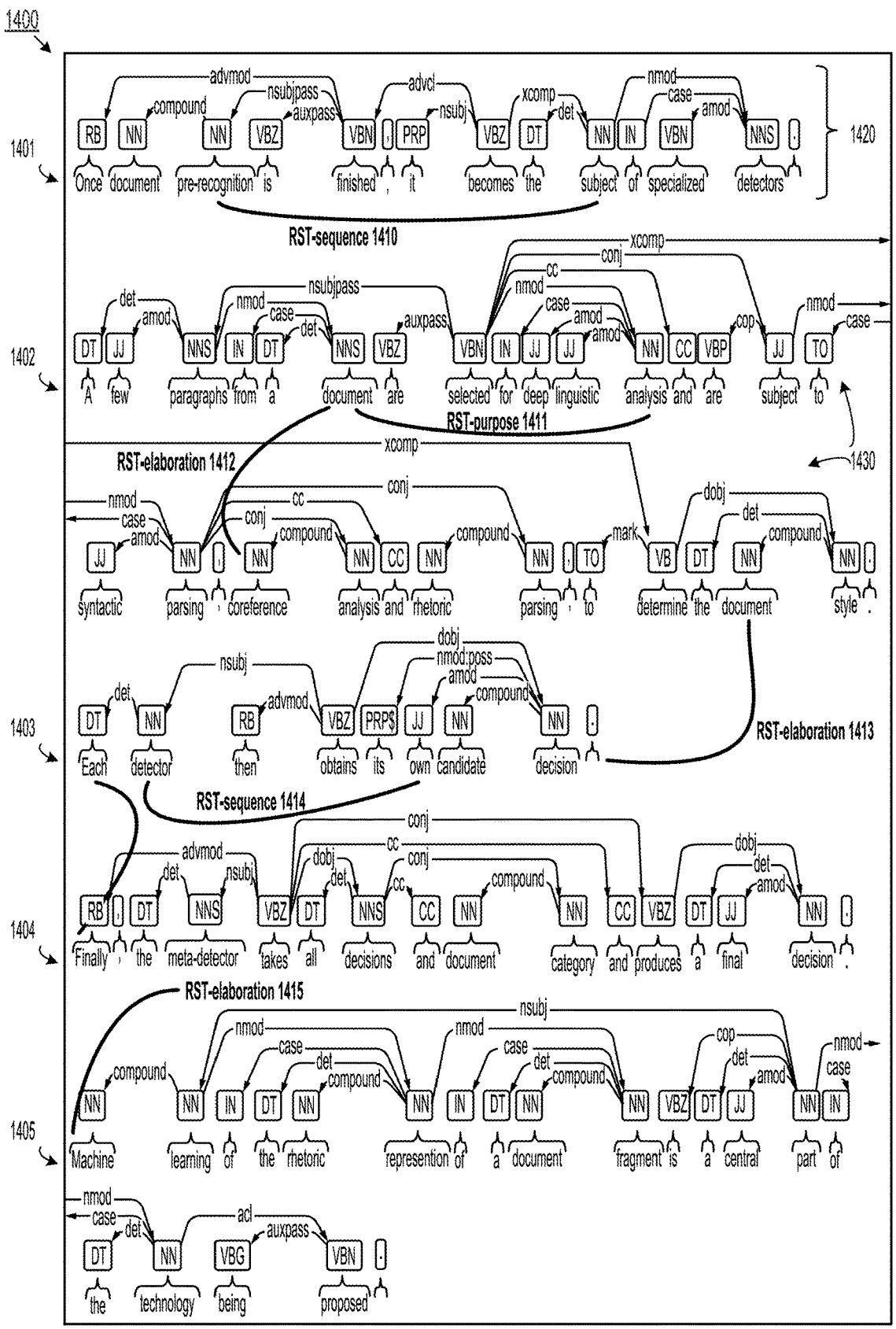
FIG. 14 illustrates the rhetoric structure of an engineering document, in accordance with an aspect.

FIG. 14 illustrates the rhetoric structure of an engineering document, in accordance with an aspect. FIG. 14 includes rhetoric structure diagram 1400, sentences 1401-1405, relationships 1410-1415, discourse tree 1420, and discourse tree 1430.

Rhetoric structure diagram 1400 represents sentences 1401-1405 and the rhetoric agreement between the sentences. Sentence 1401 reads: "Once document pre-recognition is finished, it becomes the subject of specialized detectors." Sentence 1402 reads: "A few paragraphs from a document are selected for deep linguistic analysis and are subject to syntactic parsing, coreference analysis, and rhetoric parsing, to determine the document style." Sentence 1403 reads: "Each detector then obtains its own candidate decision." Sentence 1404 reads: "Finally, the meta detector takes all decisions and document category and produces a final decision." Sentence 1405 reads: "Machine learning of the rhetoric representation of a document fragment is a central part of the technology being proposed."

Discourse tree 1420 corresponds to sentence 1401 and discourse tree 1430 corresponds to sentence 1402. As can be seen, discourse trees 1420 and 1430 include standard discourse structures such as labels identifying nouns, verbs, etc.

Relationship 1410 illustrates a sequence rhetorical relationship between the sentence fragment "once document pre-recognition is finished" and "it becomes the subject of specialized detectors." Relationship 1411 a purpose rhetorical relationship between "A few paragraphs from a document are selected" and "for deep linguistic analysis and are subject to . . . " Relationship 1412 illustrates that "coreference analysis and rhetoric parsing" elaborates on "A few paragraphs from a document are selected." Relationship 1413 illustrates that "each detector then obtains its own candidate decision" elaborates on "to determine the document style." Relationship 1414 illustrates a sequence between "each detector then obtains" and "its own candidate decision." Finally, relationship 1415 indicates an elaboration between "machine learning of . . . the technology" and "Finally, the metadetector . . . "

Figure 15:
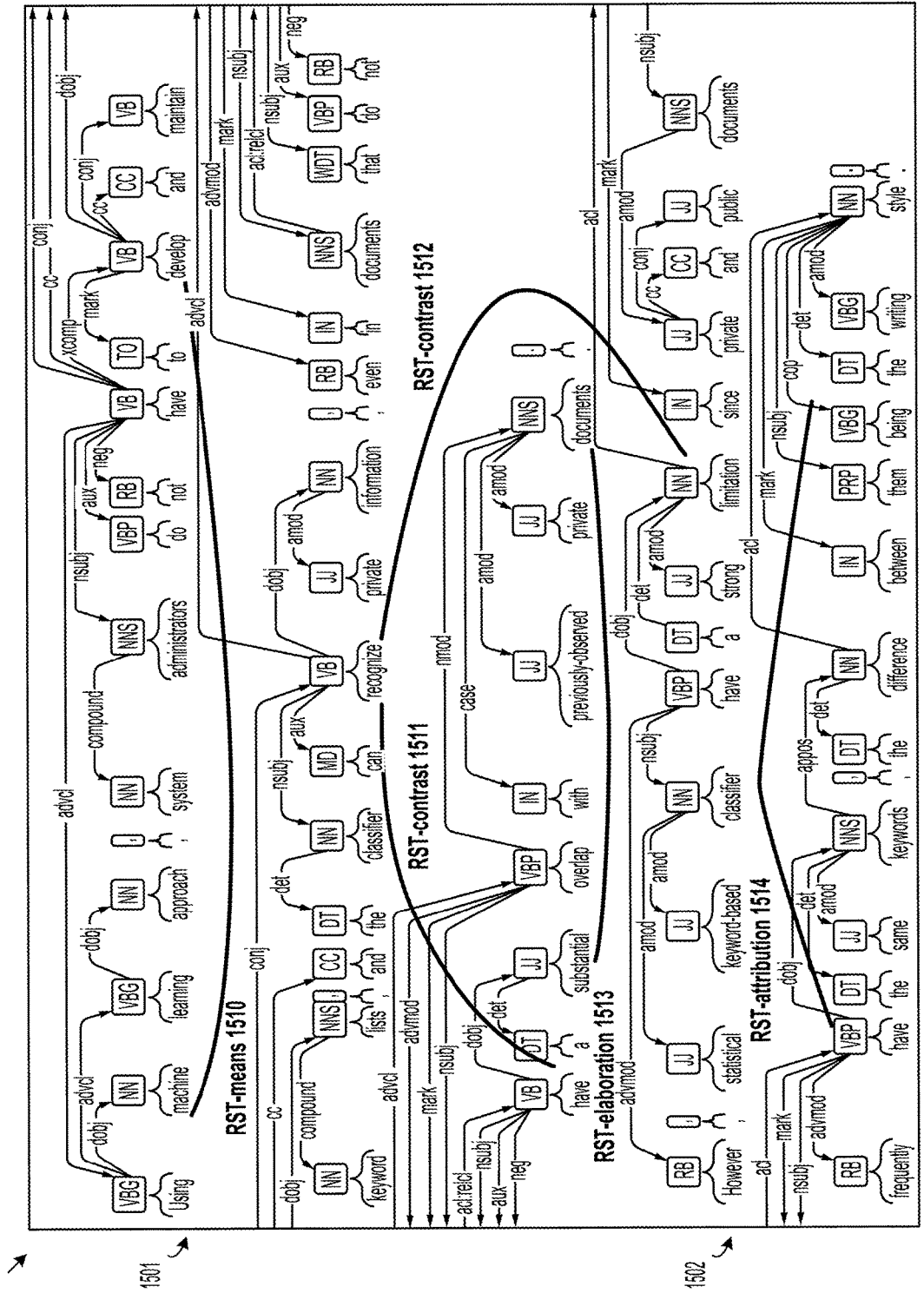
FIG. 15 illustrates the rhetoric structure of a scientific document, in accordance with an aspect.

FIG. 15 illustrates the rhetoric structure of a scientific document, in accordance with an aspect. FIG. 15 includes rhetoric structure diagram 1500, sentences 1501 and 1502, and relationships 1510-1514.

Sentence 1501 reads: "Using machine learning approach, system administrators do not have to develop and maintain keyword lists, and the classifier can recognize private information, even in documents that do not have a substantial overlap with previously-observed private documents. Sentence 1502 reads "However, statistical keyword-based classifiers have a strong limitation because private and public documents frequently have the same keywords, the difference between them being the writing style."

Relationship 1511 identifies a contrast between the "recognize" fragment from sentence 1501 and the "have" fragment in sentence 1502. Relationship 1512 identifies a contrast between the "recognize" fragment from sentence 1501 and the "limitation" fragment from sentence 1502. Relationship 1513 identifies an elaboration between the "substantial" fragment and the "documents" fragment in sentence 1501. Relationship 1514 identifies an attribution between "have" and "being" in sentence 1502.

In the text depicted in FIG. 14, the rhetoric structure of the engineering text includes relations of sequence, purpose and elaboration. In contrast, the text depicted in FIG. 15, which is typical of scientific text outlining an state of knowledge in a given domain such as that depicted in FIG. 15, includes contrast and attribution, which is typical for a scientific discourse. Using these distinctions, document classification application 102 can distinguish between such documents.

Building Communicative Discourse Trees

Figure 16:
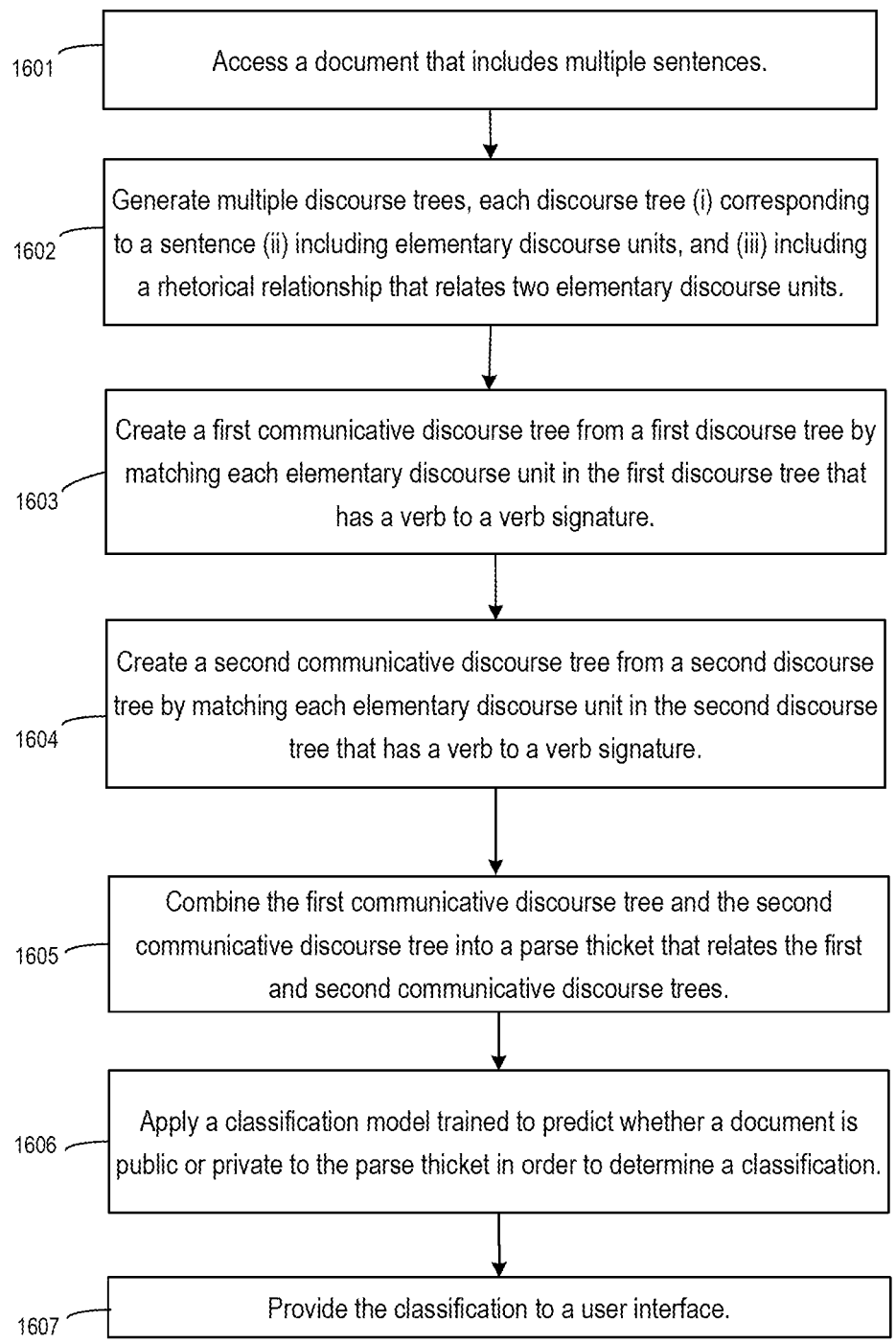
FIG. 16 illustrates an exemplary process for using communicative discourse trees to determine a classification of a document, in accordance with an aspect.

FIG. 16 illustrates an exemplary process 1600 for using communicative discourse trees to determine a classification of a document, in accordance with an aspect. Document classification application 102 can implement process 1600. Process 1600 is described in conjunction with FIG. 14 for illustrative purposes, but can be applied to any document.

At block 1601, process 1600 involves accessing a document that includes multiple sentences. A document can have one or more paragraphs or be subdivided in another manner such as with a text box, column, or other divider. For example, document classification application 102 accesses the text depicted in FIG. 14.

Each sentence includes a fragment. Fragments can include a verb and words. Each word includes a role of the word within the fragment and each fragment is an elementary discourse unit. For example, document classification application 102 accesses sentence 1401 and sentence 1402. Using sentence 1401 as an example, a fragment could be "it becomes the subject."

At block 1602, process 1600 involves generating multiple discourse trees, each discourse tree (i) corresponding to a sentence (ii) including elementary discourse units, and (iii) including a rhetorical relationship that relates two elementary discourse units. Continuing the example, document classification application 102 creates discourse tree 1420 that corresponds to sentence 1401 and discourse tree 1430 that corresponds to sentence 1403. Example rhetorical relationships between discourse tree 1420 and discourse tree 1430 include RST-sequence 1410 and RST-purpose 1411.

At block 1603, process 1600 involves creating a first communicative discourse tree from a first discourse tree by matching each elementary discourse unit in the first discourse tree that has a verb to a verb signature. Continuing the example, document classification application 102 accesses discourse tree 1420. Parse thicket generator 115 matches each elementary discourse unit, or fragment, from sentence 1401 that includes a verb to a particular verb signature.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly."

Each verb signature includes thematic roles. A thematic role refers to the role of the verb in the sentence fragment. Document classification application 102 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic. To match fragments to verb signatures, document classification application 102 accesses multiple verb signatures, for example, from VerbNet.

Continuing the example, parse thicket generator 115 matches each verb in each fragment to a particular verb. Each verb matches or is related to the verb of the fragment. For example, the first fragment of sentence 1401 contains the verb "'recognize(classifier, information(private))'" Accordingly, parse thicket generator 115 accesses a list of verb signatures that relate to the verb "are." Parse thicket generator 115 continues this process for all verbs.

Parse thicket generator 115 selects a particular verb signature from the verb signatures based on the particular verb signature having a highest number of matches. Parse thicket generator 115 then associates the selected verb signature with the fragment.

At block 1604, process 1600 involves creating a second communicative discourse tree from a second discourse tree by matching each elementary discourse unit in the second discourse tree that has a verb to a verb signature. At block 1604, parse thicket generator 115 performs substantially similar operations as performed on at block 1603, but on a second sentence.

Parse thicket generator 115 can continue with all the sentences in a document, or a subset of the sentences. For example, document classification application 102 can randomly select a number of sentences from each paragraph, or region of the document and create communicative discourse trees for each sentence, and provide the selected sentences to parse thicket generator 115.

In an aspect, parse thicket generator 115 can generate a simplified set of communicative discourse trees called extended discourse trees. Parse thicket generator 115 receives, from document classification application 102, (1) a set of parse trees T, and (2) a set of relations R, which includes relations $R_{ijk}$ between the nodes of $T_i$ and $T_j$: $T_i \in T$, $T_j \in T$, $R_{ijk} \in R$. Index k is used to iterate over multiple relations between the nodes of parse tree for a pair of sentences. Parse thicket generator 115 outputs an exhaustive set of extended trees E. An exemplary process follows.

Set E=Ø;
For each tree i=1:|T|
    For each relation $R_{ijk}$, k=1:|R|
    Obtain $T_j$
    Form the pair of extended trees $T_i * T_j$;
    Verify that each of the extended trees do not have a super-tree in E
    If verified, add to E:
Return E.

Figure 17:
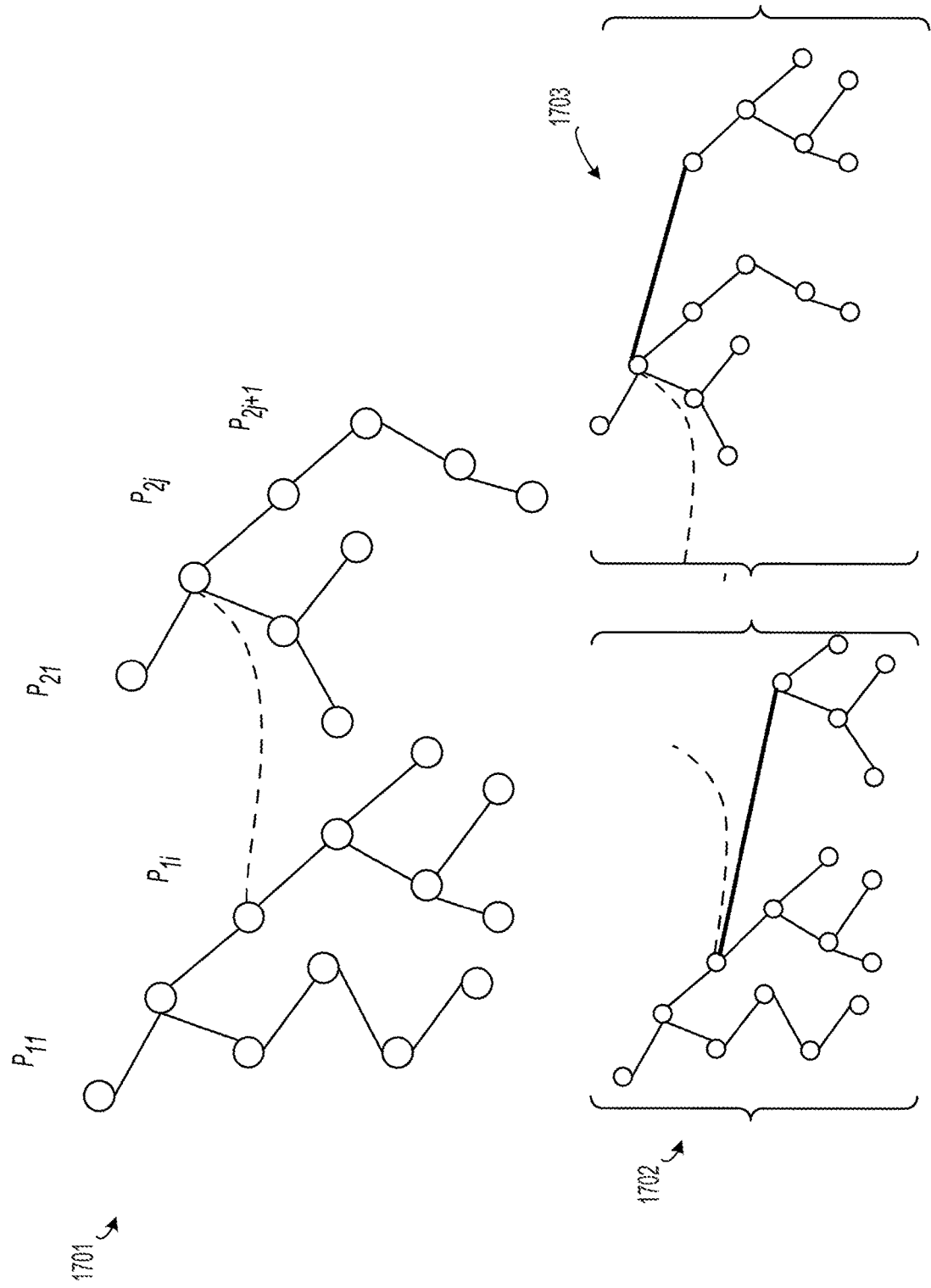
FIG. 17 illustrates an arc connecting two parse trees and a derived set of extended trees, in accordance with an aspect.

For example, FIG. 17 illustrates an arc connecting two parse trees 1701 and a derived set of extended trees (1702 and 1703), in accordance with an aspect. For every arc that connects two parse trees, parse thicket generator 115 derives the extension of these trees, extending branches according to the arc. Such trees are simplification of a set of parse trees connected with discourse relations depicted, for example, in FIG. 14.

In this manner, for a given parse tree, parse thicket generator 115 obtains an extension of a tree. By representing the extensions, the machine learning model 112a will receive many extensions, instead of just a single tree. As the number of sentences grows, the number of extension trees grows rapidly, but can be reduced by subsumption. Subsumption is a generalization of a relation tree-subtree, graph-subgraph, set-subset, parse thicket—sub parse thicket, discourse tree—sub discourse tree.

Returning to FIG. 16, to obtain the inter-sentence links, parse thicket generator 115 obtains conferences, for example by using Stanford NLP. See Recasens, M., de Marneffe M-C, and Potts, C. 2013. The Life and Death of Discourse Entities: Identifying Singleton Mentions. In *Proceedings of NAACL*.; Lee et al 2013). Parse thicket generator 115 uses a rhetoric relation extractor based on our rule-based approach to finding relations between elementary discourse units. See Galitsky, B., Usikov, D., and Kuznetsov S. O. 2013. *Parse Thicket Representations for Answering Multisentence questions*. 20th International Conference on Conceptual Structures, ICCS 2013. Parse thicket generator 115 combines rules with automatically learned rules derived from the available discourse corpus by means of syntactic generalization.

At block 1605, process 1600 involves combining the first communicative discourse tree and the second communicative discourse tree into a parse thicket that relates the first and second communicative discourse trees. A parse thicket is a combination of parse trees for sentences with discourse-level relationships between words and parts of the sentence in one graph. Accordingly, parse thicket generator 115 combines the first and second communicative discourse trees by determining relationships between the first and second discourse trees.

At block 1606, process 1600 involves applying a classification model trained to predict whether a document is public or private to the parse thicket in order to determine a classification. For example, document classification application 102 provides the parse thicket to an appropriate public-private classifier 111*a-n* (for example, as determined using a process such as the one described with respect to FIG. 18).

Document classification application 102 can use support vector machines (SVMs) and can use tree kernel learning. Tree kernel learning allows a tree such as a parse tree to be provided directly to a classification model without the need to generate a feature vector. Alternatively, document classification application 102 can determine a feature vector from the parse thicket, then provide the feature vector to appropriate public-private classifier 111*a-n*. The classifier then outputs the document class.

Document classification application 102 can continue to adjust a particular public-private classifier 111*a-n* over time. For example, document classification application 102 can receive feedback that a particular classification was erroneous or was successful, and a public-private classifier 111*a-n* accordingly. In this manner, document classification model 120 improves with each iteration. Adjustment can include minimizing a loss function that is calculated based on a difference between a probability of a particular document classification determined by document classification model 120 and an expected probability of a classification as received by user feedback or a training data pair.

For example, document classification application uses public-private classifier 111*a*. Public-private classifier 111*a* can use kernel methods, which are a large class of learning algorithms based on inner product vector spaces. Support vector machines (SVMs) are mostly well-known algorithms. The main idea behind SVMs is to learn a hyperplane, e.g.: $H(\vec{x}) = \vec{w} \cdot \vec{x} + b = 0_1$, where $\vec{x}$ is the representation of a classifying object o as a feature vector, while $\vec{w} \in \Re^n$ (indicating that $\vec{w}$ belongs to a vector space of n dimensions built on real numbers) and $b \in \Re$ are parameters learned from training examples by applying the Structural Risk Minimization principle. See Vapnik, V. 1995. *The Nature of Statistical Learning Theory*, Springer-Verlag. Object o is mapped into $\vec{x}$ via a feature function $\phi$: $\mathcal{O} \rightarrow \Re^n$, where $\mathcal{O}$ is the set of objects; o is categorized in the target class only if $H(\vec{x}) \geq 0$.

The decision hyperplane can be rewritten as:

$$H(\vec{x}) = (\Sigma_{i=1,\ldots,} y_i x_i \vec{x}_i) \cdot \vec{x} + b = \Sigma_{i=1,\ldots,} y_i x_i \vec{x}_i \cdot \vec{x} + b = \Sigma_{i=1,\ldots,} y_i x_i \phi(O_i) \cdot \phi(O) + b,$$

where $y_i$ is equal to 1 for positive examples and to −1 for negative examples and where:
$x_i \in \Re$ (with $x_i \geq 0$, $o_i \forall i \in \{1, \ldots, 1\}$ are the training instances and $K(o_i, o) = <\phi(o_i) \cdot \phi(o)>$ is the kernel function associated with the mapping $\phi$.

Convolution kernels as a measure of similarity between trees compute the common sub-trees between two trees $T_1$ and $T_2$. Convolution kernel does not have to compute the whole space of tree fragments. Let the set $T=\{t_1, t_2, \ldots, t_{|T|}\}$ be the set of sub-trees of an extended parse tree, and $c_i(n)$ be an indicator function which is equal to 1 if the subtree $t_i$ is rooted at a node n, and is equal to 0 otherwise. A tree kernel function over trees $T_1$ and $T_2$ is $TK(T_1 T_2) = \Sigma_{n_1 \in N_{T1}} \Sigma_{n_2 \in N_{T2}} \Delta(n_1 n_2)$, (3), where $N_{T1}$ and $N_{T2}$ are the sets of $T_1$'s and $T_2$'s nodes, respectively and $\Delta(n_1 n_2) = \Sigma_{i=1}^{|T|} x_i(n_1) x_i(n_2)$ calculates the number of common fragments with the roots $n_1$ and $n_2$ nodes.

Document classification application 102 receives the classification, e.g., public or private, from public-private classifier 111a.

At block 1607, process 1600 involves providing the classification to a user interface. For example, document classification application 102 can provide the classification to a screen on which a user or system administrator can view the result. The result can be text, such as "the document may be sent outside the organization," or "sending this document outside of the organization is prohibited." Document classification application 102 can send an email or a message to a system administrator indicating that an attempt occurred to send a private document outside the organization.

Training the Public-Private Classifier

In an aspect, document classification application 102 uses training data 125a-n to train a machine learning model 112a-n as part of a public-private classifier 111a-n. In this manner, public-private classifier 111a-n is trained to determine a similarity public and private parse thickets or communicative discourse trees. This is a classification problem. Training data 125 can include a public training set and a private training set.

Each training data set includes a set of training pairs. Each training pair includes a first parse thicket that has an expected classification of private and second parse thicket that has an expected classification of public. By using an iterative process, document classification application 102 provides a training pair to a machine learning model 112a-n and receives, from the model, a level of complementarity. Document classification application 102 calculates a loss function by determining a difference between the determined level of complementarity and an expected level of complementarity for the particular training pair. Based on the loss function, document classification application 102 adjusts internal parameters of the classification model to minimize the loss function.

Figure 18:
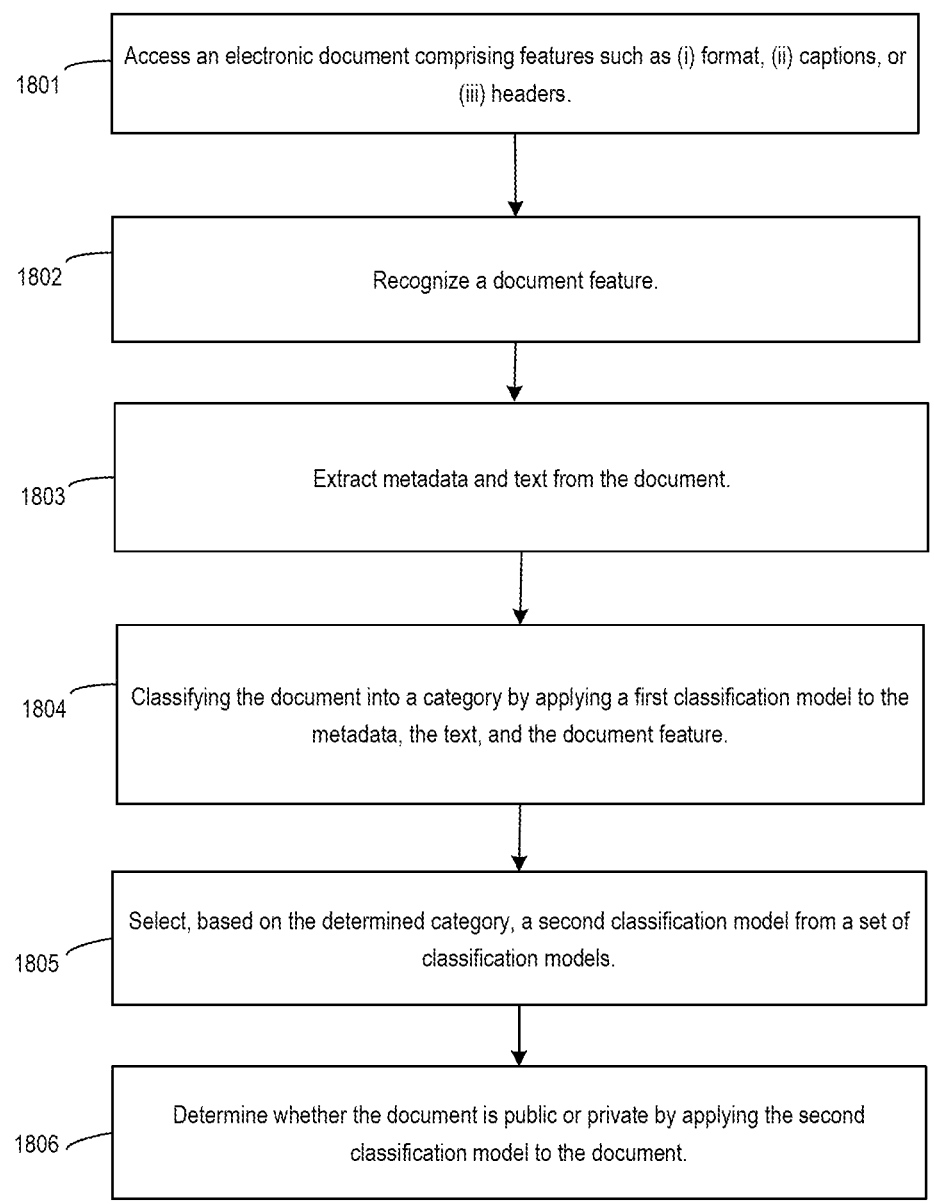
FIG. 18 illustrates an exemplary process for using communicative discourse trees to determine a classification of a document using two stages of classification, in accordance with an aspect.

FIG. 18 illustrates an exemplary process for using communicative discourse trees to determine a classification of a document using two stages of classification, in accordance with an aspect. FIG. 18 depicts process 1800, which can be used by document type classifier 130 to determine an appropriate public-private classifier 111a-n based on a determined document type.

At block 1801, process 1800 involves accessing an electronic document comprising features such as (i) format, (ii) captions, or (iii) headers. Document type classifier 130 uses a parser or other document analysis tools.

At block 1802, process 1800 involves recognizing a document feature. For example, document type classifier 130 isolates a particular format feature such as a header.

At block 1803, process 1800 involves extracting metadata and text from the document. Document type classifier 130 extracts metadata features such as features embedded in the document such as time stamps, authors, organization name, etc. Document type classifier 130 analyzes the text in the document, such as the sentences in each paragraph.

At block 1804, process 1800 involves classifying the document into a category by applying a first classification model to the metadata, the text, and the document feature. Document type classifier 130 provides the metadata, text, and the document feature to a machine learning model. The machine learning model is trained to predict document type, e.g., to be able to distinguish between an engineering document and a legal document.

At block 1805, process 1800 involves selecting based on the determined category, a second classification model from a set of classification models. Based on the determination, document type classifier 130 selects an appropriate public-private classifier 111a-n.

At block 1806, process 1800 involves determining whether the document is public or private by applying the second classification model to the document. At block 1806, document classification application 102 and the appropriate public-private classifier 111a-n perform substantially similar steps as described in process 1600.

Rule Post-Processing to Reduce False Alerts

In an aspect, document classification application 102 can assign different risk values to different types of documents, document sources, or document destinations. Such configurations could be client or employee specific. For example, a rule could be created that communications outside known organizations should be more heavily analyzed for potential data loss. Rules can be created for different expectations. For example, public relations employees are expected to give press releases, new product designs, new financial disclosures to a fixed list of external news organizations. Similarly, human resources and payroll are expected to communicate with payroll services, manage payroll, deductions for benefits, insurance enrollments and so on. Legal department employees and executives will be involved in confidential legal contracts for mergers and acquisitions. Technical security professionals may be communicating with offsite backup vendors, external data centers for roll over in cases of disaster. Banks with an investment division and a retail bank division may have specified limitations on communications and data sharing, even though the email domain may be the same.

Roles and rules may control who can edit, send, or delete communications inside a company. See Ferraiolo, D. F. & Kuhn, D. R. Role-Based Access Control. 15th National Computer Security Conference: 554-563. 1992. For example, role based tags can control which people are allowed which kinds of communications outside of the company. For example, given a table of all employees, with their email, additional attributes can be added for roles such as: public relations, health insurance, payroll, contracts, secure tech, retail banking, investment banking. The role attributes may have true or false values, or represent a security degree level, such as confidential, classified, highly classified. To ease the configuration of this DLP software system, to more easily get a list of employees in their departments, large companies typically have existing LDAP Zeilenga, K. Lightweight Directory Access Protocol (LDAP) Read Entry Controls. IETF. RFC 4527. 2006. access controls already defined. This DLP system can start by reading any existing LDAP files.

A table of email domains would contain the company name and attributes indicating the suitability for communication with employees acting in a given role (one column per role), with true/false or security level values. Some organizations may be listed here with all false values—in effect creating black list enforcement—such as with primary competitors or news leak concerns. Using the DLP subject detectors, the employee roles and email domain roles, then company policy rules can be specified with rules, such as the following:

IF (financialServices_DLP) and
  ((alert_confidential) or (alert_signature)) and
    (undesired_person_co_communication) THEN
ALERT confidential_financialServicesDoc
IF (healthcare_DLP) and
  ((alert_confidential) or (alert_signature)) and
  (undesired_person_co_communication) THEN
ALERT confidential_healthcareDoc
IF (legalDoc_DLP) and
  ((alert_confidential) or (alert_signature)) and
    (undesired_person_co_communication) THEN
ALERT confidential_legalDoc
IF (designDoc_DLP) and
  (undesired_person_co_communication) THEN
ALERT confidential_designDoc Alternatively, alert counter aggregation may be incremented in the above rules, if the policy is to detect a certain number of alerts over a certain time period.

The job and company role related rules, to reduce false alerts would be placed after the other rules, to "turn off" alerts on expected behavior.

For Marketing, Public relations and related job functions:
IF (employee.is_PublicRelations) AND
  (email.sendToDomain_vettedNews) THEN
    ALERT=FALSE For HR, any internal personal trainer or nurse
IF (employee. is_healthCare) AND
  (email.sendToDomain_vettedHealthCare) THEN
    ALERT=FALSE
For Finance, Mergers and Acquisitions, Sales, Purchasing, Legal
IF (employee. is_contracts) AND
  (email.sendToDomain_vettedContracts) THEN
    ALERT=FALSE
For IT employee involved in DevOps or SOC or other high security
IF (employee. is_secureTech) AND
  (email.sendToDomain_vettedTechSecure) THEN
    ALERT=FALSE
For ALWAYS ALERT, or High Alert (if there is different severity)
IF (email.sendToDomain_is_competitor) OR
  (email.sendToDomain_is_avoidNews) THEN
    ALERT=TRUE
    HIGH_ALERT=TRUE.

Evaluation

For design documents, we built a web mining utility which searched for public design documents on the web in a number of engineering and science domains. We use the following keywords to add to a query for design document: material, technical, software, pharmaceutical, bio, biotech, civil engineering, construction, microprocessor, c++, python, java, hardware, processor, architectural, creative, web. As a result we formed a set of 1200 documents, it turned out we had 90% of non-design engineering documents of the classes we want to exclude (meta-documents) and 10% of genuine design documents.

TABLE 1

Classifying text into metalanguage and language-object

| | | | Design document, % | | | Financial and Legal, % | | |
|---|---|---|---|---|---|---|---|---|
| Method | Precision | Recall | F-measure | Standard deviation | Precision | Recall | F-measure | Standard deviation |
| Nearest neighbor classifier-tf*idf based | 55.8 | 61.4 | 58.47 | 2.1 | 51.7 | 54.0 | 52.82 | 3.4 |
| Naive Bayesian classifier (WEKA) | 57.4 | 59.2 | 58.29 | 3.2 | 52.4 | 50.4 | 51.38 | 4.2 |
| Manual keyword-based rule selection | 93.1 | 97.5 | 95.25 | 1.3 | 88.1 | 90.3 | 89.19 | 1.3 |
| Manual parse-tree based rules | 95.3 | 97.8 | 96.53 | 1.2 | N/A | N/A | N/A | 1.2 |
| Tree kernel-regular parse trees | 73.4 | 77.6 | 75.44 | 2.8 | 65.7 | 67.3 | 66.49 | 3.8 |
| Tree kernel SVM-extended trees for anaphora | 77.0 | 79.3 | 78.13 | 3.1 | 67.1 | 67.8 | 67.45 | 4.4 |

TABLE 1-continued

Classifying text into metalanguage and language-object

| | | | Design document, % | | | Financial and Legal, % | | |
| --- | --- | --- | --- | --- | --- | --- | --- | --- |
| Method | Precision | Recall | F-measure | Standard deviation | Precision | Recall | F-measure | Standard deviation |
| Tree kernel SVM-extended trees for RST | 78.3 | 81.5 | 79.87 | 2.6 | 69.3 | 72.4 | 70.82 | 3.7 |
| Tree kernel SVM-extended trees for both anaphora & RST | 82.1 | 85.2 | 83.62 | 2.7 | 70.8 | 73.0 | 71.88 | 4.2 |

TF*IDF Nearest Neighbor approach finds a document in the training set which is the closest to the given one being recognized. Nearest Neighbor feature is implemented via the search in inverse index of Lucene. See Croft, B., Metzler, D., Strohman, T. 2009. *Search Engines—Information Retrieval in Practice*. Pearson Education. North America. The search result score is computed based on TF*IDF model. See Salton, G. and Buckley, C. 1988. Term-weighting approaches in automatic text retrieval. Information. Processing & Management 24 (5): 513-23. ("Salton and Buckley 1988"). The query is formed from each sentence of the documents being classified as a disjunctive query including all words except stop-words. The resultant classes along with their TF*IDF scores are weighted and aggregated on the basis of a majority vote algorithm such as Moore and Boyer 1991. See Moore, J S and Boyer R S. 1991. MJRTY—A Fast Majority Vote Algorithm, In R. S. Boyer (ed.), Automated Reasoning: Essays in Honor of Woody Bledsoe, Automated Reasoning Series, Kluwer Academic Publishers, Dordrecht, The Netherlands, 1991, pp. 105-17.

A Naive Bayes classifier is a simple probabilistic classifier based on applying Bayes' theorem (from Bayesian statistics) with strong (naive) independence assumptions. This classifier assumes that the presence (or absence) of a particular feature of a class is unrelated to the presence (or absence) of any other feature. For example, a fruit may be considered to be an apple if it is red, round, and about 4" in diameter. Even if these features depend on each other or upon the existence of the other features, a naive Bayes classifier considers all of these properties to independently contribute to the probability that this fruit is an apple. Depending on the precise nature of the probability model, naive Bayes classifiers can be trained very efficiently in a supervised learning setting. In many practical applications, parameter estimation for naive Bayes models uses the method of maximum likelihood. WEKA classifier is based on John and Langley. See John G. H. and Langley, P. 1995. Estimating Continuous Distributions in Bayesian Classifiers. In *Eleventh Conference on Uncertainty in Artificial Intelligence*, San Mateo, 338-45.

We report the standard deviation of F-measure over five folds achieved by different methods. Table 1 shows evaluation results for the both domains, Design document and Literature. Each row shows the results of a particular classification method.

Keyword statistic-based methods, including Nearest-Neighbor classification and Naïve Bayes, produced rather poor results. Conversely, a manual rule-based system produces a very high accuracy result, especially when manually formed rules go beyond the keywords/phrases and take into account part-of-speech information.

An increase in accuracy by a few percent is achieved in design documents by using human comprehension of which expressions are used in engineering design text vs scientific and marketing text. These rules also included regular expressions relying on specific document formatting including a table of content and structure of sections. In the literature domain, that was not possible. Manual rule performance is shown by grayed rows.

Performance of tree kernel based methods improves as the sources of linguistic properties expand. For both domains, there is a few percent improvement by using RST relations compared with baseline tree kernel SVM which relies on parse trees only.

The results of detectors are subject to ROC curve optimization. For a user of DLP system, the false positive rate is critical. The following additional considerations are applied:

Sensitive document needs to be pre-categorized into major classes. To be a sensitive financial report, a document first needs to be categorized as financial, for example.

Only bursts of sensitive documents trigger an alert, not an individual one. Usually, if leaks are intentional, multiple documents are attempted to be shared.

Aggregate detection results for at the level of a department. In case of unintentional leaks, the category of document will usually stand out, such as engineering document shared by a human resources department or finance document shared by engineering.

As a result of applying these considerations, having above 80% style recognition rate, we achieve:

Detection rate of above 90%

False positive rate of below 0.1%.

Hence using deep linguistic analysis to recognize style in a document, in additional to traditional machine learning of keyword statistics, is a key to successful DLP system The Hart classifier had a false negative rate of less than 3.0% and a false discovery rate of less than 1.0% on all our tests. See M Hart, Pratyusa Manadhata, and Rob Johnson. Text Classification for Data Loss Prevention—SPIN 2013—Stony Brook Privacy Enhancing Technologies. Volume 6794 of the series Lecture Notes in Computer Science pp 18-37. It means that the overall detector in a real world environment can identify more than 97% of information leaks while raising at most 1 false alarm every 100th time. In our case, F-measure of our classifier in a vertical domain such as finance is about 15% higher. As a result, using additional criteria other than document style, we achieve comparable false negative rate and substantially lower false positive rate. This improved performance is the key for adoption of the style-based document classification DLP system by system administrators.

In our previous studies we considered the following sources of relations between words in sentences: coreferences, taxonomic relations such as sub-entity, partial case, predicate for subject etc., rhetoric structure relations and speech acts (Galitsky 2013). We demonstrated that a number of NLP tasks including search relevance can be improved if search results are subject to confirmation by parse thicket generalization, when answers occur in multiple sentences. In this study we employed coreferences and rhetoric relation only to identify correlation with the occurrence of general style for 'how to write' in text. Although phrase-level analysis allows extraction of weak correlation with the presence of sensitive data in texts, ascend to discourse structures makes this correlation more explicit.

Traditionally, machine learning of linguistic structures is limited to keyword forms and frequencies. At the same time, most theories of discourse are not computational, they model a particular set of relations between consecutive states. In this work we attempted to achieve the best of both worlds: learn complete parse tree information augmented with an adjustment of discourse theory allowing computational treatment.

If documents are encrypted, linguistic analysis would not help, but such documents should never be shared in a corporate environment without manual approval. Encrypted documents can be detected by tools which extracts metadata and text from over various file types such as Apache Tika.

Aspects described herein use extended parse trees instead of regular ones, leveraging available discourse information, for text classification. This work describes one of the first applications of tree kernel to industrial scale NLP tasks. The advantage of this approach is that the manual thorough analysis of text can be avoided for complex text classification tasks where the classes are rather abstract. The feasibility of suggested approach to classification lays in the robustness of statistical learning algorithms to unrelated and unreliable features inherent in NLP.

Corpora for training DLP text classification system are becoming available. The current study is believed to be the first relying on and sharing the dataset for domain-specific DLP detectors. The training/testing datasets, code for detectors and the overall DLP framework is available at http://code.google.com/p/relevance-based-on-parse-trees.

Figure 19:
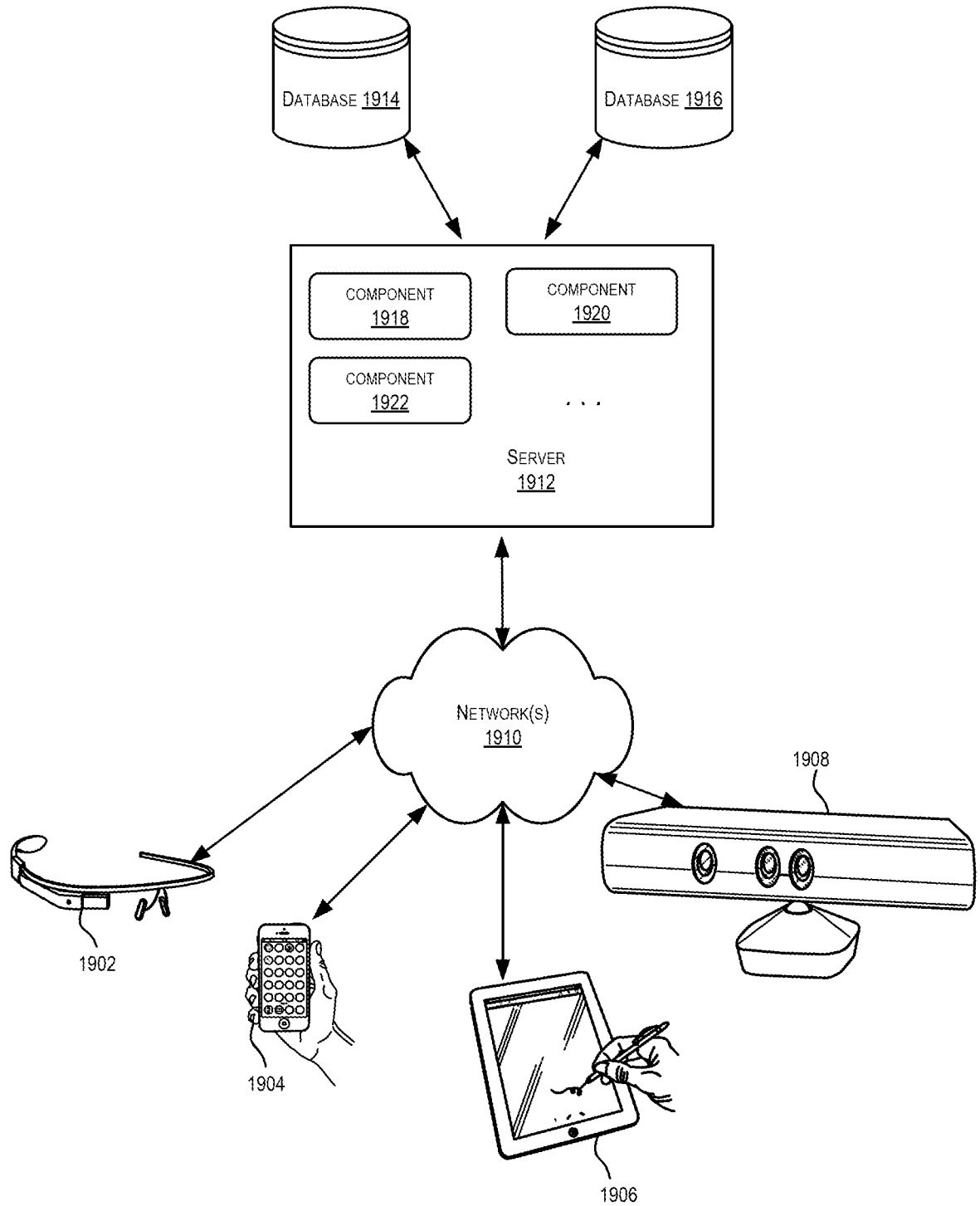
FIG. 19 depicts a simplified diagram of a distributed system for implementing one of the aspects.

FIG. 19 depicts a simplified diagram of a distributed system 1900 for implementing one of the aspects. In the illustrated aspect, distributed system 1900 includes one or more client computing devices 1902, 1904, 1906, and 1908, which are configured to execute and operate a client application such as a web browser, proprietary client (e.g., Oracle Forms), or the like over one or more network(s) 1910. Server 1912 may be communicatively coupled with remote client computing devices 1902, 1904, 1906, and 1908 via network 1910.

In various aspects, server 1912 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (Saas) model to the users of client computing devices 1902, 1904, 1906, and/or 1908. Users operating client computing devices 1902, 1904, 1906, and/or 1908 may in turn utilize one or more client applications to interact with server 1912 to utilize the services provided by these components.

In the configuration depicted in the figure, the software components 1918, 1920 and 1922 of distributed system 1900 are shown as being implemented on server 1912. In other aspects, one or more of the components of distributed system 1900 and/or the services provided by these components may also be implemented by one or more of the client computing devices 1902, 1904, 1906, and/or 1908. Users operating the client computing devices may then utilize one or more client applications to use the services provided by these components. These components may be implemented in hardware, firmware, software, or combinations thereof. It should be appreciated that various different system configurations are possible, which may be different from distributed system 1900. The aspect shown in the figure is thus one example of a distributed system for implementing an aspect system and is not intended to be limiting.

Client computing devices 1902, 1904, 1906, and/or 1908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1902, 1904, 1906, and 1908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1910.

Although exemplary distributed system 1900 is shown with four client computing devices, any number of client computing devices may be supported. Other devices, such as devices with sensors, etc., may interact with server 1912.

Network(s) 1910 in distributed system 1900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1910 can be a local area network (LAN), such as one based on Ethernet, Token-Ring and/or the like. Network(s) 1910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.19 suite of protocols, Bluetooth®, and/or any other wireless protocol); and/or any combination of these and/or other networks.

Server 1912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1912 can include one or more virtual machines running virtual operating systems, or other computing architectures involving virtualization. One or more flexible pools of logical storage devices can be virtualized to maintain virtual storage devices for the server. Virtual networks can be controlled by server 1912 using software defined networking. In various aspects, server 1912 may be adapted to run one or more services or software applications described in the foregoing disclosure. For example, server 1912 may correspond to a server for performing processing described above according to an aspect of the present disclosure.

Server 1912 may run an operating system including any of those discussed above, as well as any commercially available server operating system. Server 1912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1912 may include one or more applications to analyze and consolidate data feeds and/or event updates received from users of client computing devices 1902, 1904, 1906, and 1908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1912 may also include one or more applications to display the data feeds and/or real-time events via one or more display devices of client computing devices 1902, 1904, 1906, and 1908.

Distributed system 1900 may also include one or more databases 1914 and 1916. Databases 1914 and 1916 may reside in a variety of locations. By way of example, one or more of databases 1914 and 1916 may reside on a non-transitory storage medium local to (and/or resident in) server 1912. Alternatively, databases 1914 and 1916 may be remote from server 1912 and in communication with server 1912 via a network-based or dedicated connection. In one set of aspects, databases 1914 and 1916 may reside in a storage-area network (SAN). Similarly, any necessary files for performing the functions attributed to server 1912 may be stored locally on server 1912 and/or remotely, as appropriate. In one set of aspects, databases 1914 and 1916 may include relational databases, such as databases provided by Oracle, that are adapted to store, update, and retrieve data in response to SQL-formatted commands.

Figure 20:
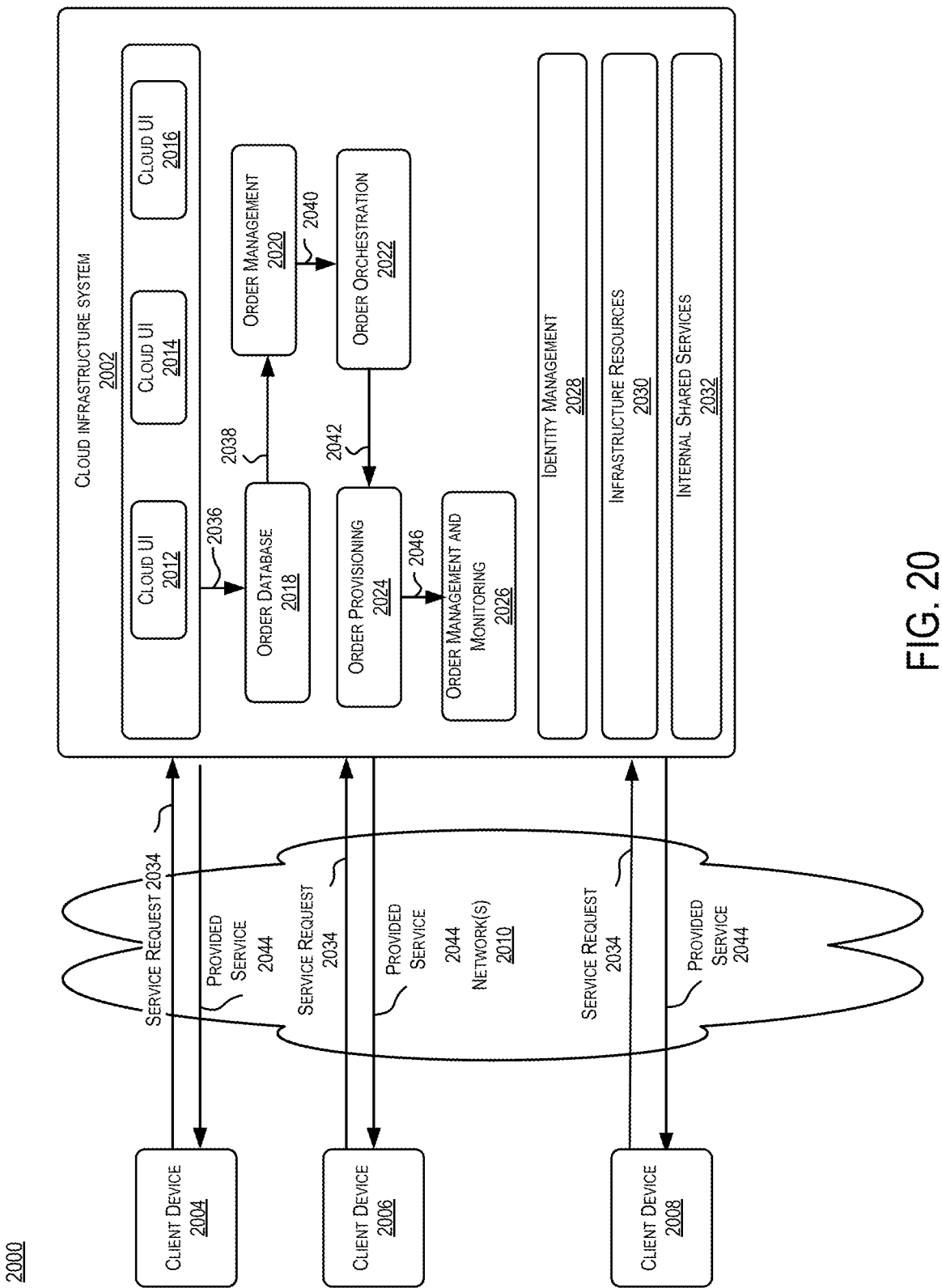
FIG. 20 is a simplified block diagram of components of a system environment by which services provided by the components of an aspect system may be offered as cloud services in accordance with an aspect.

FIG. 20 is a simplified block diagram of one or more components of a system environment 2000 by which services provided by one or more components of an aspect system may be offered as cloud services, in accordance with an aspect of the present disclosure. In the illustrated aspect, system environment 2000 includes one or more client computing devices 2004, 2006, and 2008 that may be used by users to interact with a cloud infrastructure system 2002 that provides cloud services. The client computing devices may be configured to operate a client application such as a web browser, a proprietary client application (e.g., Oracle Forms), or some other application, which may be used by a user of the client computing device to interact with cloud infrastructure system 2002 to use services provided by cloud infrastructure system 2002.

It should be appreciated that cloud infrastructure system 2002 depicted in the figure may have other components than those depicted. Further, the aspect shown in the figure is only one example of a cloud infrastructure system that may incorporate an aspect of the invention. In some other aspects, cloud infrastructure system 2002 may have more or fewer components than shown in the figure, may combine two or more components, or may have a different configuration or arrangement of components.

Client computing devices 2004, 2006, and 2008 may be devices similar to those described above for 1902, 1904, 1906, and 1908.

Although exemplary system environment 2000 is shown with three client computing devices, any number of client computing devices may be supported. Other devices such as devices with sensors, etc. may interact with cloud infrastructure system 2002.

Network(s) 2010 may facilitate communications and exchange of data between clients 2004, 2006, and 2008 and cloud infrastructure system 2002. Each network may be any type of network familiar to those skilled in the art that can support data communications using any of a variety of commercially-available protocols, including those described above for network(s) 2010.

Cloud infrastructure system 2002 may comprise one or more computers and/or servers that may include those described above for server 1912.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 2002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 2002 may be adapted to automatically provision, manage and track a customer's subscription to services offered by cloud infrastructure system 2002. Cloud infrastructure system 2002 may provide the cloud services via different deployment models. For example, services may be provided under a public cloud model in which cloud infrastructure system 2002 is owned by an organization selling cloud services (e.g., owned by Oracle) and the services are made available to the general public or different industry enterprises. As another example, services may be provided under a private cloud model in which cloud infrastructure system 2002 is operated solely for a single organization and may provide services for one or more entities within the organization. The cloud services may also be provided under a community cloud model in which cloud infrastructure system 2002 and the services provided by cloud infrastructure system 2002 are shared by several organizations in a related community. The cloud services may also be provided under a hybrid cloud model, which is a combination of two or more different models.

In some aspects, the services provided by cloud infrastructure system 2002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2002. Cloud infrastructure system 2002 then performs processing to provide the services in the customer's subscription order.

In some aspects, the services provided by cloud infrastructure system 2002 may include, without limitation, application services, platform services and infrastructure services.

In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 2002 may also include infrastructure resources 2030 for providing the resources used to provide various services to customers of the cloud infrastructure system. In one aspect, infrastructure resources 2030 may include pre-integrated and optimized combinations of hardware, such as servers, storage, and networking resources to execute the services provided by the PaaS platform and the SaaS platform.

In some aspects, resources in cloud infrastructure system 2002 may be shared by multiple users and dynamically re-allocated per demand. Additionally, resources may be allocated to users in different time zones. For example, cloud infrastructure system 2002 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 2032 may be provided that are shared by different components or modules of cloud infrastructure system 2002 and by the services provided by cloud infrastructure system 2002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 2002 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 2002, and the like.

In one aspect, as depicted in the figure, cloud management functionality may be provided by one or more modules, such as an order management module 2020, an order orchestration module 2022, an order provisioning module 2024, an order management and monitoring module 2026, and an identity management module 2028. These modules may include or be provided using one or more computers and/or servers, which may be general purpose computers, specialized server computers, server farms, server clusters, or any other appropriate arrangement and/or combination.

In exemplary operation 2034, a customer using a client device, such as client computing device 2004, 2006 or 2008, may interact with cloud infrastructure system 2002 by requesting one or more services provided by cloud infrastructure system 2002 and placing an order for a subscription for one or more services offered by cloud infrastructure system 2002. In certain aspects, the customer may access a cloud User Interface (UI), cloud UI 2012, cloud UI 2014 and/or cloud UI 2016 and place a subscription order via these UIs. The order information received by cloud infrastructure system 2002 in response to the customer placing an order may include information identifying the customer and one or more services offered by the cloud infrastructure system 2002 that the customer intends to subscribe to.

After an order has been placed by the customer, the order information is received via the cloud UIs, 2012, 2014 and/or 2016.

At operation 2036, the order is stored in order database 2018. Order database 2018 can be one of several databases operated by cloud infrastructure system 2018 and operated in conjunction with other system elements.

At operation 2038, the order information is forwarded to an order management module 2020. In some instances, order management module 2020 may be configured to perform billing and accounting functions related to the order, such as verifying the order, and upon verification, booking the order.

At operation 2040, information regarding the order is communicated to an order orchestration module 2022. Order orchestration module 2022 may utilize the order information to orchestrate the provisioning of services and resources for the order placed by the customer. In some instances, order orchestration module 2022 may orchestrate the provisioning of resources to support the subscribed services using the services of order provisioning module 2024.

In certain aspects, order orchestration module 2022 enables the management of business processes associated with each order and applies business logic to determine whether an order should proceed to provisioning. At operation 2042, upon receiving an order for a new subscription, order orchestration module 2022 sends a request to order provisioning module 2024 to allocate resources and configure those resources needed to fulfill the subscription order. Order provisioning module 2024 enables the allocation of resources for the services ordered by the customer. Order provisioning module 2024 provides a level of abstraction between the cloud services provided by cloud infrastructure system 2000 and the physical implementation layer that is used to provision the resources for providing the requested services. Order orchestration module 2022 may thus be isolated from implementation details, such as whether or not services and resources are actually provisioned on the fly or pre-provisioned and only allocated/assigned upon request.

At operation 2044, once the services and resources are provisioned, a notification of the provided service may be sent to customers on client devices 2004, 2006 and/or 2008 by order provisioning module 2024 of cloud infrastructure system 2002.

At operation 2046, the customer's subscription order may be managed and tracked by an order management and monitoring module 2026. In some instances, order management and monitoring module 2026 may be configured to collect usage statistics for the services in the subscription order, such as the amount of storage used, the amount data transferred, the number of users, and the amount of system up time and system down time.

In certain aspects, cloud infrastructure system 2000 may include an identity management module 2028. Identity management module 2028 may be configured to provide identity services, such as access management and authorization services in cloud infrastructure system 2000. In some aspects, identity management module 2028 may control information about customers who wish to utilize the services provided by cloud infrastructure system 2002. Such information can include information that authenticates the identities of such customers and information that describes which actions those customers are authorized to perform relative to various system resources (e.g., files, directories, applications, communication ports, memory segments, etc.) Identity management module 2028 may also include the management of descriptive information about each customer and about how and by whom that descriptive information can be accessed and modified.

Figure 21:
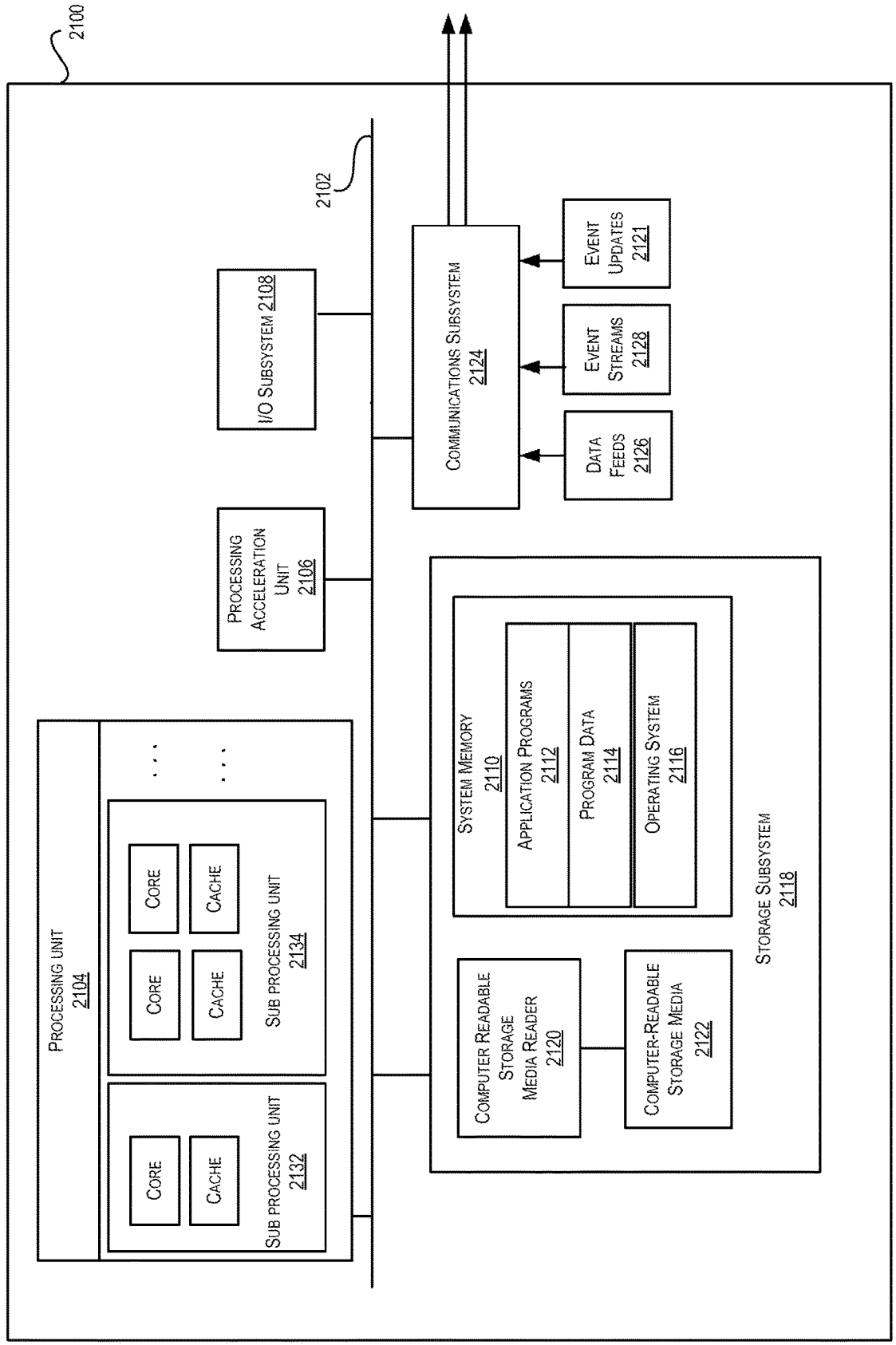
FIG. 21 illustrates an exemplary computer system, in which various aspects of the present invention may be implemented.

FIG. 21 illustrates an exemplary computer system 2100, in which various aspects of the present invention may be implemented. The system 2100 may be used to implement any of the computer systems described above. As shown in the figure, computer system 2100 includes a processing unit 2104 that communicates with a number of peripheral subsystems via a bus subsystem 2102. These peripheral subsystems may include a processing acceleration unit 2106, an I/O subsystem 2108, a storage subsystem 2118 and a communications subsystem 2124. Storage subsystem 2118 includes tangible computer-readable storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative aspects of the bus subsystem may utilize multiple buses. Bus subsystem 2102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P2186.1 standard.

Processing unit 2104, which can be implemented as one or more integrated circuits (e.g., a conventional microprocessor or microcontroller), controls the operation of computer system 2100. One or more processors may be included in processing unit 2104. These processors may include single core or multicore processors. In certain aspects, processing unit 2104 may be implemented as one or more independent processing units 2132 and/or 2134 with single or multicore processors included in each processing unit. In other aspects, processing unit 2104 may also be implemented as a quad-core processing unit formed by integrating two dual-core processors into a single chip.

In various aspects, processing unit 2104 can execute a variety of programs in response to program code and can maintain multiple concurrently executing programs or processes. At any given time, some or all of the program code to be executed can be resident in processor(s) 2104 and/or in storage subsystem 2118. Through suitable programming, processor(s) 2104 can provide various functionalities described above. Computer system 2100 may additionally include a processing acceleration unit 2106, which can include a digital signal processor (DSP), a special-purpose processor, and/or the like.

I/O subsystem 2108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2100 may comprise a storage subsystem 2118 that comprises software elements, shown as being currently located within a system memory 2110. System memory 2110 may store program instructions that are loadable and executable on processing unit 2104, as well as data generated during the execution of these programs.

Depending on the configuration and type of computer system 2100, system memory 2110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2104. In some implementations, system memory 2110 may include multiple different types of memory, such as static random access memory (SRAM) or dynamic random access memory (DRAM). In some implementations, a basic input/output system (BIOS), containing the basic routines that help to transfer information between elements within computer system 2100, such as during start-up, may typically be stored in the ROM. By way of example, and not limitation, system memory 2110 also illustrates application programs 2112, which may include client applications, Web browsers, mid-tier applications, relational database management systems (RDBMS), etc., program data 2114, and an operating system 2116. By way of example, operating system 2116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2118 may also provide a tangible computer-readable storage medium for storing the basic programming and data constructs that provide the functionality of some aspects. Software (programs, code modules, instructions) that when executed by a processor provide the functionality described above may be stored in storage subsystem 2118. These software modules or instructions may be executed by processing unit 2104. Storage subsystem 2118 may also provide a repository for storing data used in accordance with the present invention.

Storage subsystem 2118 may also include a computer-readable storage media reader 2120 that can further be connected to computer-readable storage media 2122. Together and, optionally, in combination with system memory 2110, computer-readable storage media 2122 may comprehensively represent remote, local, fixed, and/or removable storage devices plus storage media for temporarily and/or more permanently containing, storing, transmitting, and retrieving computer-readable information.

Computer-readable storage media 2122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 2100.

By way of example, computer-readable storage media 2122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2100.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to connect to one or more devices via the Internet. In some aspects, communications subsystem 2124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 2124 can provide wired network connectivity (e.g., Ethernet) in addition to or instead of a wireless interface.

In some aspects, communications subsystem 2124 may also receive input communication in the form of structured and/or unstructured data feeds 2126, event streams 2128, event updates 2121, and the like on behalf of one or more users who may use computer system 2100.

By way of example, communications subsystem 2124 may be configured to receive unstructured data feeds 2126 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2124 may also be configured to receive data in the form of continuous data streams, which may include event streams 2128 of real-time events and/or event updates 2121, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2124 may also be configured to output the structured and/or unstructured data feeds 2126, event streams 2128, event updates 2121, and the like to one or more databases that may be in communication with one or more streaming data source computers coupled to computer system 2100.

Computer system 2100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for classifying documents, the method comprising:

generating a discourse tree from a sentence of a document, wherein the discourse tree comprises elementary discourse units, comprises a rhetorical relationship that relates two of the elementary discourse units, and comprises a plurality of nodes, each nonterminal node of the nodes of the discourse tree representing one of the rhetorical relationships and each terminal node of the nodes of the discourse tree associated with one of the elementary discourse units;

creating a communicative discourse tree from the discourse tree by matching, in the discourse tree, each elementary discourse unit that has a verb to a verb signature, wherein each verb signature comprises a respective verb of a respective elementary discourse unit and a sequence of thematic roles, and wherein each thematic role describes a relationship between the verb and related words;

combining the communicative discourse tree into a parse thicket that comprises discourse relationships between the sentences represented by the communicative discourse tree;

applying a machine learning model to the parse thicket to determine a classification, wherein the machine learning model is trained to classify text as public or private based on discourse relationships; and providing the classification to a user interface.

2. The method of claim 1, wherein applying the machine learning model comprises generating a feature vector from the parse thicket and providing the feature vector to the machine learning model.

3. The method of claim 1, wherein the machine learning model is a support vector machine (SVM) and uses tree kernel learning.

4. The method of claim 1, wherein the document is trained classified using one or more rules that specify individuals with access to the document and wherein the machine learning model determines the classification based on the one or more rules.

5. The method of claim 1, further comprising:
determining a set of keywords from the document;
executing a query for the document, wherein the query comprises the set of keywords; and
responsive to receiving a result of the query that indicates that the document is public, updating the classification to public.

6. The method of claim 1, further comprising one or more of: (i) responsive to determining that the document is classified as public, permitting a transmission of the document over a data network or (ii) responsive to determining that the document is classified as private, preventing the transmission of the document over the data network.

7. The method of claim 1, further comprising:
accessing a set of training data comprising a set of training data pairs, wherein each training data pair comprises a training parse thicket corresponding to training sentences from a training document and a respective classification and wherein the set of training data includes (i) a first training data pair that has the respective classification of private and (ii) a second training data pair that has the respective classification of public; and training the machine learning model by iteratively:
providing one of the training data pairs to the machine learning model;

receiving, from the machine learning model, a determined classification;
calculating a loss function by calculating a difference between the determined classification and the respective classification; and
adjusting internal parameters of the machine learning model to minimize the loss function.

8. A system comprising:
a non-transitory computer-readable medium storing computer-executable program instructions; and
a processing device communicatively coupled to the non-transitory computer-readable medium for executing the computer-executable program instructions, wherein executing the computer-executable program instructions configures the processing device to perform operations comprising:

generating a discourse tree from a sentence of a document, wherein the discourse tree comprises elementary discourse units, comprises a rhetorical relationship that relates two of the elementary discourse units, and comprises a plurality of nodes, each nonterminal node of the nodes of the discourse tree representing one of the rhetorical relationships and each terminal node of the nodes of the discourse tree associated with one of the elementary discourse units;

creating a communicative discourse tree from the discourse tree by matching, in the discourse tree, each elementary discourse unit that has a verb to a verb signature, wherein each verb signature comprises a respective verb of a respective elementary discourse unit and a sequence of thematic roles, and wherein each thematic role describes a relationship between the verb and related words;

combining the communicative discourse tree into a parse thicket that comprises discourse relationships between the sentences represented by the communicative discourse tree;

applying a machine learning model to the parse thicket to determine a classification, wherein the machine learning model is trained to classify text as public or private based on discourse relationships; and providing the classification to an external device.

9. The system of claim 8, wherein applying the machine learning model comprises generating a feature vector from the parse thicket and providing the feature vector to the machine learning model.

10. The system of claim 8, wherein the machine learning model is a support vector machine (SVM) and uses tree kernel learning.

11. The system of claim 8, wherein the document is classified using one or more rules that specify individuals with access to the document and wherein the machine learning model determines the classification based on the one or more rules.

12. The system of claim 8, wherein executing the computer-executable program instructions further configures the processing device to perform operations comprising:
determining a set of keywords from the document;
executing a query for the document, wherein the query comprises the set of keywords; and
responsive to receiving a result of the query that indicates that the document is public, updating the classification to public.

13. The system of claim 8, wherein executing the computer-executable program instructions further configures the processing device to perform operations comprising one or more of: (i) responsive to determining that the document is classified as public, permitting a transmission of the document over a data network or (ii) responsive to determining that the document is classified as private, preventing the transmission of the document over the data network.

14. The system of claim 8, wherein executing the computer-executable program instructions further configures the processing device to perform operations comprising:
  accessing a set of training data comprising a set of training data pairs, wherein each training data pair comprises a training parse thicket corresponding to training sentences from a training document and a respective classification and wherein the set of training data includes (i) a first training data pair that has the respective classification of private and (ii) a second training data pair that has the respective classification of public; and
  training the machine learning model by iteratively:
    providing one of the training data pairs to the machine learning model;
    receiving, from the machine learning model, a determined classification;
    calculating a loss function by calculating a difference between the determined classification and the respective classification; and
    adjusting internal parameters of the machine learning model to minimize the loss function.

15. A non-transitory computer-readable medium storing computer-executable program instructions that when executed by a processor, perform operations comprising:
  generating a discourse tree from a sentence of a document, wherein the discourse tree comprises elementary discourse units, comprises a rhetorical relationship that relates two of the elementary discourse units, and comprises a plurality of nodes, each nonterminal node of the nodes of the discourse tree representing one of the rhetorical relationships and each terminal node of the nodes of the discourse tree associated with one of the elementary discourse units;
  creating a communicative discourse tree from the discourse tree by matching, in the discourse tree, each elementary discourse unit that has a verb to a verb signature, wherein each verb signature comprises a respective verb of a respective elementary discourse unit and a sequence of thematic roles, and wherein each thematic role describes a relationship between the verb and related words;
  combining the communicative discourse tree into a parse thicket that comprises discourse relationships between the sentences represented by the communicative discourse tree;
  applying a machine learning model to the parse thicket to determine a classification, wherein the machine learning model is trained to classify text as public or private based on discourse relationships; and
  providing the classification to a user interface.

16. The non-transitory computer-readable medium of claim 15, wherein the machine learning model is a support vector machine (SVM) and uses tree kernel learning.

17. The non-transitory computer-readable medium of claim 15, wherein the document is classified using one or more rules that specify individuals with access to the document and wherein the machine learning model determines the classification based on the one or more rules.

18. The non-transitory computer-readable medium of claim 15, wherein the operations further comprise:
  determining a set of keywords from the document;
  executing a query for the document, wherein the query comprises the set of keywords; and
  responsive to receiving a result of the query that indicates that the document is public, updating the classification to public.

19. The non-transitory computer-readable medium of claim 15, wherein the operations further comprise one or more of: (i) responsive to determining that the document is classified as public, permitting a transmission of the document over a data network or (ii) responsive to determining that the document is classified as private, preventing the transmission of the document over the data network.

20. The non-transitory computer-readable medium of claim 15, wherein the operations further comprise:
  accessing a set of training data comprising a set of training data pairs, wherein each training data pair comprises a training parse thicket corresponding to a plurality of training sentences from a training document and a respective classification and wherein the set of training data includes (i) a first training data pair that has the respective classification of private and (ii) a second training data pair that has the respective classification of public; and
  training the machine learning model by iteratively:
    providing one of the training data pairs to the machine learning model;
    receiving, from the machine learning model, a determined classification;
    calculating a loss function by calculating a difference between the determined classification and the respective classification; and
    adjusting internal parameters of the machine learning model to minimize the loss function.

* * * * *

UNITED STATES PATENT AND TRADEMARK OFFICE
CERTIFICATE OF CORRECTION

PATENT NO. : 12,141,177 B2
APPLICATION NO. : 17/338295
DATED : November 12, 2024
INVENTOR(S) : Galitsky Page 1 of 1

It is certified that error appears in the above-identified patent and that said Letters Patent is hereby corrected as shown below:

On the Title Page

On page 4, Column 2, under Item (56) Other Publications, Line 26, delete "ov" and insert -- on --, therefor.

On page 8, Column 2, under Item (56) Other Publications, Line 9, delete "Dia-logue," and insert -- Dialogue, --, therefor.

In the Specification

In Column 3, Line 46, delete "memory" and insert -- memory. --, therefor.

In Column 23, Line 25, delete "$R_{ijk} \in R$." and insert -- $R_{ijk} \in R$. --, therefor.

In Column 23, Line 37, delete "E:" and insert -- E; --, therefor.

In Column 30, Line 60, delete "system" and insert -- system. --, therefor.

In Column 32, Line 6, delete "(Saas)" and insert -- (SaaS) --, therefor.

In the Claims

In Column 43, Line 37, in Claim 4, after "is" delete "trained".

Signed and Sealed this
First Day of April, 2025

Coke Morgan Stewart
*Acting Director of the United States Patent and Trademark Office*